United States Patent
Ishii et al.

(10) Patent No.: US 6,546,188 B1
(45) Date of Patent: Apr. 8, 2003

(54) EDITING SYSTEM AND EDITING METHOD

(75) Inventors: Makoto Ishii, Kanagawa (JP); Takeshi Kanda, Tokyo (JP); Tadashi Katagiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/229,816

(22) Filed: Jan. 13, 1999

(30) Foreign Application Priority Data

Jan. 16, 1998 (JP) .......................... 10-006345

(51) Int. Cl.⁷ .......................... G11B 27/00; H04N 5/93
(52) U.S. Cl. .......................... 386/52; 386/55
(58) Field of Search .......................... 386/52, 55, 46, 386/4, 1, 53, 54, 64, 69, 95, 96, 104; 345/723; 360/13; G11B 27/00; H04N 5/93

(56) References Cited

U.S. PATENT DOCUMENTS

| | | | |
|---|---|---|---|
| 2,668,162 A | 2/1954 | Lowe | 260/78.3 |
| 2,683,136 A | 7/1954 | Higgins | 260/78.3 |
| 2,703,316 A | 3/1955 | Schneider | 260/78.3 |
| 2,758,987 A | 8/1956 | Salzberg | 260/78.3 |
| 3,225,766 A | 12/1965 | Baptist et al. | 128/335.5 |
| 3,268,486 A | 8/1966 | Klootwijk | 260/78.3 |
| 3,268,487 A | 8/1966 | Klootwijk | 260/78.3 |
| 3,297,033 A | 1/1967 | Schmitt | 128/335.5 |
| 3,422,181 A | 1/1969 | Chirgwin | 264/345 |
| 3,442,871 A | 5/1969 | Schmitt | 260/78.3 |
| 3,463,158 A | 8/1969 | Schmitt | 128/334 |
| 3,468,853 A | 9/1969 | Schmitt | 260/78.3 |
| 3,531,561 A | 9/1970 | Trenu | 264/210 |
| 3,565,869 A | 2/1971 | Deprospero | 264/78.3 |
| 3,597,449 A | 8/1971 | Deprospero | 260/340.2 |
| 3,620,218 A | 11/1971 | Schmitt | 128/334 R |
| 3,626,948 A | 12/1971 | Glick | 128/335.5 |
| 3,636,956 A | 1/1972 | Schneider | 128/335.5 |
| 3,733,919 A | 5/1973 | Rupp, II | 74/242.16 |
| 3,736,646 A | 6/1973 | Schmitt et al. | 29/458 |
| 3,739,773 A | 6/1973 | Schmitt et al. | 128/92 BC |
| 3,744,365 A | 7/1973 | Kordula | 128/335.5 |
| 3,772,420 A | 11/1973 | Glick et al. | 264/102 |
| 3,781,349 A | 12/1973 | Ramsey et al. | 260/535 |
| 3,784,585 A | 1/1974 | Schmitt et al. | 260/861 |
| 3,792,010 A | 2/1974 | Wasserman et al. | 260/32.2 R |
| 3,797,499 A | 3/1974 | Schneider | 128/334 R |
| 3,839,297 A | 10/1974 | Wasserman et al. | 260/78.3 R |
| 3,846,382 A | 11/1974 | Ramsey et al. | 260/78.3 R |
| 3,867,190 A | 2/1975 | Schmitt et al. | 117/138.3 R |

(List continued on next page.)

FOREIGN PATENT DOCUMENTS

| | | |
|---|---|---|
| GB | 779291 | 7/1957 |
| GB | 1332505 | 10/1973 |
| GB | 1414600 | 11/1975 |
| GB | 2102827 | 2/1983 |

OTHER PUBLICATIONS

Gilding et al, Biodegradable Polymers For Use In Surgery-Polyglycolic/Poly (Lactic Acic) Homo–AndCopolymers: *Polymer*, vol. 20, pp. 1459–1464 (1979).

*Biocompatability Of Clinical Implant Materials*, vol. II, chapter 9: "Biodegradable Polymers" D.F. Wiiliams (ed.) (1981).

*Primary Examiner*—Robert Chevalier
(74) *Attorney, Agent, or Firm*—Frommer Lawrence & Haug LLP; William S. Frommer; Glenn F. Savit

(57) ABSTRACT

Video signals input to a hybrid recorder are output to the main unit of a computer as video signals. The hybrid recorder records the video signals in a built-in hard disk, and also replays the signals from the hard disk, the signals being output to a picture effects device as video signals. The picture effects device applies certain effects to the video signals, which are then output to the main unit as video signals. The main unit displays the image of the video signals and the image of the video signals on a monitor. Thus, editing can be performed easily and speedily, while adding effects.

23 Claims, 64 Drawing Sheets

U.S. PATENT DOCUMENTS

| | | | |
|---|---|---|---|
| 3,875,937 A | 4/1975 | Schmitt et al. | 128/156 |
| 3,878,284 A | 4/1975 | Schmitt et al. | 264/184 |
| 3,896,802 A | 7/1975 | Williams | 602/43 |
| 3,902,497 A | 9/1975 | Casey | 128/296 |
| 3,937,223 A | 2/1976 | Roth | 128/325 |
| 3,982,543 A | 9/1976 | Schmitt et al. | 128/335.5 |
| 3,987,937 A | 10/1976 | Coucher | 222/193 |
| 4,033,938 A | 7/1977 | Augurt et al. | 260/78.3 R |
| 4,045,418 A | 8/1977 | Sinclair | 260/78.3 R |
| 4,057,537 A | 11/1977 | Sinclair | 260/78.3 |
| 4,060,089 A | 11/1977 | Noiles | 128/325 |
| 4,137,921 A | 2/1979 | Okuzumi et al. | 128/335.5 |
| 4,157,437 A | 6/1979 | Okuzumi et al. | 528/354 |
| 4,243,775 A | 1/1981 | Rosensaft et al. | 525/415 |
| 4,246,904 A | 1/1981 | Kaplan | 128/335.5 |
| 4,273,920 A | 6/1981 | Nevin | 528/361 |
| 4,275,813 A | 6/1981 | Noiles | 206/339 |
| 4,279,249 A | 7/1981 | Vert et al. | 128/92 D |
| 4,300,565 A | 11/1981 | Rosensaft et al. | 128/335.5 |
| 4,744,365 A | 5/1988 | Kaplan et al. | 128/335.5 |
| 5,471,577 A | * 11/1995 | Lightbody et al. | |
| 5,568,275 A | * 10/1996 | Norton et al. | |

* cited by examiner

FIG. 8

| DATA CONTENTS | BYTES |
|---|---|
| POINTER TO DATA LINKED TO BEFORE | 4 |
| POINTER TO DATA LINKED TO BEHIND | 4 |
| HORIZONTAL SIZE FOR ONE PAGE | 2 |
| VERTICAL SIZE FOR ONE PAGE | 2 |
| POSITION OF DISPLAY ON SCREEN | 2 |
| LEAD POSITION FOR DISPLAY | 2 |
| TOTAL NUMBER OF LINKS | 2 |

FIG. 9

| DATA CONTENTS | BYTES |
|---|---|
| POINTER TO DATA LINKED TO BEFORE | 4 |
| POINTER TO DATA LINKED TO BEHIND | 4 |
| ATTRIBUTE | 1 |
| CLIP IMAGE DATA HANDLE | 4 |
| CLIP TYPE | 2 |
| TIME CODE DATA | 4 |
| INDEX NO. OF CLIP IMAGE DATA | 4 |

FIG. 10

| DATA CONTENTS | BYTES |
|---|---|
| POINTER TO DATA LINKED TO BEFORE | 4 |
| POINTER TO DATA LINKED TO BEHIND | 4 |
| ATTRIBUTE | 1 |
| EVENT NO. | 2 |
| TITLE | 16 |
| SUB-TITLE | 20 |
| CLIP IMAGE DATA HANDLE AT IN POINT | 4 |
| CLIP TYPE AT IN POINT | 2 |
| TIME CODE DATA AT IN POINT | 4 |
| INDEX NO. OF CLIP IMAGE DATA AT IN POINT | 4 |
| CLIP IMAGE DATA HANDLE AT OUT POINT | 4 |
| CLIP TYPE AT OUT POINT | 2 |
| TIME CODE DATA AT OUT POINT | 4 |
| INDEX NO. OF CLIP IMAGE DATA AT OUT POINT | 4 |
| SLOW TYPE | 2 |
| SYMBOL TYPE | 2 |
| TIME CODE DATA OF SYMBOL | 4 |

FIG. 11

| DATA CONTENTS | BYTES |
|---|---|
| POINTER TO DATA LINKED TO BEFORE | 4 |
| POINTER TO DATA LINKED TO BEHIND | 4 |
| ATTRIBUTE | 1 |
| EFFECTS IMAGE SELECTION DATA | 4 |
| EFFECTS TYPE | 2 |
| EFFECTS NO. | 2 |
| EFFECTS DIRECTION | 2 |
| EFFECTS TIME | 4 |
| SPECIFY BORDER | 1 |
| BORDER WIDTH | 2 |
| BACKGROUND COLOR VALID FLAG | 5 |
| BACKGROUND COLOR | 20 |
| X-POSITION COORDINATES | 2 |
| Y-POSITION COORDINATES | 2 |
| Z-POSITION COORDINATES | 2 |
| AUXILIARY PARAMETERS FOR EFFECTS | 8 |
| FADER POSITION | 2 |
| RE-SETTING AVAILABLE FLAG | 1 |

FIG. 12

| DATA CONTENTS | BYTES |
|---|---|
| POINTER TO DATA LINKED TO BEFORE | 4 |
| POINTER TO DATA LINKED TO BEHIND | 4 |
| ATTRIBUTE | 1 |
| EFFECTS IMAGE SELECTION DATA | 4 |
| EFFECTS TIME | 4 |
| FADER POSITION | 2 |
| FADER INVERSION VALID FLAG | 1 |
| BORDER SPECIFICATION | 1 |
| BORDER TYPE | 1 |
| BORDER POSITION | 1 |
| BORDER COLOR | 4 |
| KEY INVERSION SPECIFICATION | 1 |
| CLIP VALUE | 2 |
| GAIN VALUE | 2 |
| MASK SPECIFICATION | 1 |
| MASK INVERSION SPECIFICATION | 1 |
| MASK RECTANGLE AREA | 8 |
| SOLID FLAG | 1 |

FIG. 13

| MARKING | IN | IN | OUT | IN | IN | IN | OUT | IN | OUT | IN | IN | OUT |
|---|---|---|---|---|---|---|---|---|---|---|---|---|
| INDEX NO. | 1 | 2 | 3 | 4 | 5 | 6 | 7 | 8 | 9 | 10 | 11 | 12 |
| CLIP NO. | 1 | | | 4 | 5 | | | | | 10 | | |
| EVENT NO. | | 1 | 1 | | | 2 | 2 | 3 | 3 | | 4 | 4 |

FIG. 14

| | | | | | |
|---|---|---|---|---|---|
| PROGRAM 30 | 002 / INDEX NO. 6 / IN | wipe 0001 / EFFECT NO. 1 | 001 / INDEX NO. 2 / IN | wipe 0010 / EFFECT NO. 2 | 003 / INDEX NO. 8 / IN |
| EVENT 29 | 001 / INDEX NO. 2 / IN | 002 / INDEX NO. 6 / IN | 003 / INDEX NO. 8 / IN | 004 / INDEX NO. 11 / IN | |
| CLIP 28 | 001 / INDEX NO. 1 / IN | 004 0001 / INDEX NO. 4 / IN | 005 / INDEX NO. 5 / IN | 010 / INDEX NO. 10 / IN | |

FIG. 21

| FRAME DATA (TIME CODE) | | SPEED DATA N |
|---|---|---|
| 00:00:00:01 | (IN POINT) | 64 |
| 00:00:00:02 | | 64 |
| 00:00:00:03 | | 64 |
| 00:00:00:04 | | 64 |
| 00:00:00:05 | | 60 |
| 00:00:00:06 | | 52 |
| 00:00:00:07 | | 40 |
| 00:00:00:08 | | 32 |
| 00:00:00:09 | | 32 |
| 00:00:00:10 | | 32 |
| 00:00:00:11 | | 32 |
| 00:00:00:12 | | 24 |
| 00:00:00:13 | | 16 |
| 00:00:00:14 | | 6 |
| 00:00:00:15 | | 0 |
| 00:00:00:16 | | 0 |
| 00:00:00:17 | | 0 |
| 00:00:00:18 | | 0 |
| ⋮ | | ⋮ |
| 00:00:05:11 | (OUT POINT) | 64 |

30a1  30a2  30a3

FIG. 60A
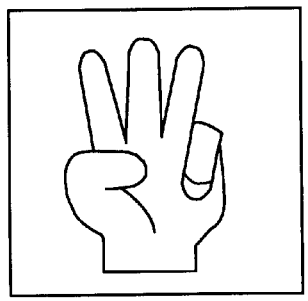
FIG. 60B
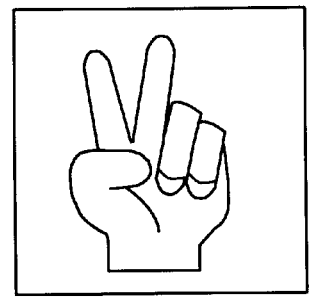
FIG. 60C
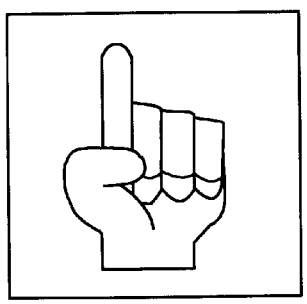
FIG. 60D
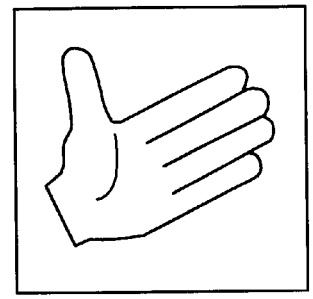
FIG. 61
| | "BEEP" | "BEEP" | "BEEP" | IN/OUT POINT |
|---|---|---|---|---|
| | −3 sec. | −2 sec. | −1 sec. | |

NUMBERS IN PARENTHESIS ( )
INDICATE RELATIVE INTERNAL
TRANSFER RATE BY ZONE
WITH ZONE 1 SET AT 100

TOTAL RECORDING TIME
  NTSC : 88 min. 03 sec. 11 GOP
  PAL  : 92 min. 27 sec. 12 GOP

EDITING SYSTEM AND EDITING METHOD

BACKGROUND OF THE INVENTION

1. Field of the Invention

The present invention relates to an editing system and an editing method, and more particularly to an editing system and an editing method suitably applied to an editing system which handles editing materials that require prompt broadcasting such as sports or news.

2. Description of the Related Art

Regarding known editing systems of such types, systems which use a video tape recorder (VTR) as the recording means for recording the material to be edited have been proposed. Such editing systems sequentially record live images such as sports or news with a VTR, and edit the program by reading and using the recorded images as material.

However, when handling live images such as sports or news, an editing system should be able to carry out editing operations in a prompt and speedy manner, in order to provide audiences with images with greater appeal and presence. However, with the known editing system such as described above, a VTR tape is used for the recording medium, and it takes time to run a tape to the beginning of a clip, or fast-forward or rewind. Accordingly, VTR operations continue right up to the instant before airing, which has been problematic in that speedy editing operations cannot be performed.

Also, with the known editing system, various types of equipment are necessary for editing, such as multiple monitors being necessary to confirm the image which is to be recorded, and to confirm the editing image. Consequently, the system configuration ends up being large-scale. Further, various types of equipment need to be operated, so operations become complicated, as well.

In this way, known editing systems have not been well thought out for efficient editing operations in a limited environment on location, and neither have such known editing systems been well thought out for handling materials which require real-time elements, such as sports live casting and news broadcasts. In other words, such known systems are still insufficient regarding useability. Particularly, it has been extremely difficult to provide special effects in a real-time manner.

SUMMARY OF THE INVENTION

The present invention has been made in light of the above problems, and it is an object thereof to provide an editing system with improved useability, which realizes special effects while also realizing high-speed real-time editing.

To this end, an editing system according to a first aspect of the present invention for editing source video data, comprises: a recording/replaying device for recording the source video data onto a randomly accessible recording medium, and replaying the source video data recorded onto the recording medium; an effects device for generating effect video data by means of applying effects specified by the editing operator to the replayed video data output from the recording/replaying means; and a computer which is programmed by user interface means and the editing operator with editing software, the computer displaying a graphical user interface corresponding with the editing software program on a display; wherein the computer generates desired editing programs by re-arranging in a desired order a plurality of clip images representing a plurality of editing events and clip images representing the effects on the display, based on editing processing by the editing operator; and wherein a final edited video program is generated by controlling the recording/replaying device and the effects device, based on the editing programs.

The computer may be programmed to display the following windows on the display: a video display window for displaying video data replayed from the recording/replaying device as a dynamic image; a program display window for displaying a plurality of clip images representing the plurality of editing events and a plurality of clip images representing the plurality of effects, and also generating the editing program by means of re-arranging the clip images in a desired order; and an effects set-up window for setting effects parameter values relating to the effects.

This editing system may be arranged such that, in the event of inserting effects set in the effects set-up window between editing events displayed on the program display window, the computer is programmed to point to the insertion position of the effects by changing the form of a pointing device displayed on the display.

In this case, the computer may be programmed to insert effects between the events by dragging and dropping buttons representing the effects between the events.

Preferably, the computer is programmed to determine the insertion position of the effects according to the position for dropping the cursor representing the effects in the clip image display area where the events of the effects are displayed.

In this case, a plurality of effect buttons for setting desired effects may be provided in the effects set-up window.

When such a plurality of effect buttons are used, in a specific form of the invention, the arrangement may be such that, in the event that desired effect parameter values differing from the default values are to be set for effects displayed in the effects set-up window, the computer opens an effects set-up dialog box for setting detailed effect parameter values relating to the specified effects on the display; and wherein the effect parameter values set in the effects set-up dialog box are stored in storing means; and wherein the effects device is controlled based on the recorded effect parameter values.

Alternatively, the arrangement may be such that, in the event that desired effect parameter values are to be set for effects displayed in the effects set-up window, the computer sets the effects position in the video display window; and wherein effect parameter values corresponding to the set effects position are stored in storing means; and wherein the effects device is controlled based on the recorded effect parameter values.

Preferably, in the specific form of the invention set forth above, the computer is programmed to appropriate the effect parameter values stored in the storing means to user buttons other than the certain effect buttons, and call desired effect parameter values stored in the storing means by selecting the user buttons.

In this case, the computer may be programmed to appropriate the effect parameter values stored in the storing means to user buttons other than the certain effect buttons, by dragging and dropping the certain effect buttons on the user buttons.

In the specific form of the invention set forth above, the computer may be programmed to appropriate a plurality of effect parameter values that have been set in the past by the effects set-up dialog box to user buttons other than the certain effect buttons displayed in the effects set-up window, and call desired effect parameter values stored in the storing means by selecting the user buttons.

In this case, the computer may have management record data for managing clip image data displayed in the program display area.

In this case, the arrangement may be such that, in the event of changing the display order of clip images displayed in the program display area, the computer does not change the storage address of the clip image displayed in the program display area, but rather changes the management record data corresponding with the changed clip image.

Preferably, the computer manages the clip images displayed on the program display area by using a link structure for linking the plurality of pieces of management record data.

In this case, the management record data preferably includes management record data having information relating to the editing events, and management record data having information relating to the effects.

In this case, the arrangement may be such that, the management record data relating to the editing events has time code for editing points of the editing events, storing addresses which store clip images of the editing points, and pointer data pointing to management records linking to management record data relating to the editing events; and wherein the management record data relating to the effects has effect types indicating the type of the effects, effect times representing the execution time of the effects, and pointer data pointing to management records linking to management record data relating to the editing events; and wherein the computer controls the recording/replaying device and the effects device according to the parameters set in the management record data relating to the editing events and the management record data relating to the effects.

Preferably, in the event that a first editing event, a second editing event, and a first effect inserted between the first and second editing events are set on the program display area, the editing device the recording/replaying device and the effects device so as to: replay video data relating to the first editing event from the recording/replaying device based on the time code data of the IN-point set in the management record data corresponding to the first editing event; control the effects processing timing for the video data relating to the first editing event according to the time code data of the OUT-point set in the management record data corresponding to the first editing event, and according to the effects time set in the management record data corresponding to the first effect; control the effects processing timing for the video data relating to the second editing event according to the time code data of the IN-point set in the management record data corresponding to the first editing event, and according to the effects time set in the management record data corresponding to the first effect; and ending the replaying of video data relating to the first editing event from the recording/replaying device based on the time code data of the OUT-point set in the management record data corresponding with the first recording event.

In accordance with a second aspect of the present invention, an editing method for editing the source video data uses an editing system including: recording/replaying means for recording the source video data onto a randomly accessible recording medium, and replaying the source video data recorded onto the recording medium; and a computer which controls the recording/replaying means to perform editing operations for generating a final video program by editing the source video data; wherein the computer generates desired editing programs by re-arranging in a desired order a plurality of clip images representing a plurality of editing events and clip images representing the effects on the display, based on editing processing by the editing operator; and wherein a final edited video program is generated by controlling the recording/replaying device and the effects device, based on the editing programs.

According to a third aspect of the present invention, an editing device for editing source video data recorded in a recording/replaying device and source audio data corresponding to the source video data comprises: means for setting a start point and stop point for performing voice-over to the source audio data; means for replaying source video data and source audio data for at least a period including the voice-over period defined by the start point and stop point of the voice-over processing; and control means for lowering the level of the source audio data replayed from the recording/replaying means from a certain time before the start point of the voice-over processing to a certain time after the end point of the voice-over processing, and also recording voice-over audio data supplied as audio data subjected to voice-over processing for the source video data with the recording/replaying device.

In the editing device of the present inventions, the arrangement may be such that during the replaying of the source video data and source audio data, the control means displays the timing of the start point and stop point for performing voice-over processing on the display.

In accordance with a fourth aspect of the present invention, an editing method for editing source video data recorded in a recording/replaying device and source audio data corresponding to the source video data comprises the steps of: setting a start point and stop point for performing voice-over to the source audio data; replaying source video data and source audio data for at least a period including the voice-over period defined by the start point and stop point of the voice-over processing; and lowering the level of the source audio data replayed from the recording/replaying means from a certain time before the start point of the voice-over processing to a certain time after the end point of the voice-over processing, and also recording voice-over audio data supplied as audio data subjected to voice-over processing for the source video data with the recording/replaying device.

BRIEF DESCRIPTION OF THE DRAWINGS

FIG. 8 is a diagram describing first management record data;

FIG. 9 is a diagram describing second management record data for clip data;

FIG. 10 is a diagram describing second management record data for event data and program data;

FIG. 11 is a diagram describing second management record data for effects data;

FIG. 12 is a diagram describing second management record data for DSK data;

FIG. 13 is a diagram describing index No., clip No., and event No.;

FIG. 14 is a diagram illustrating an example of each display area;

FIG. 21 is a diagram describing the storage format of speed data;

FIG. 60A–FIG. 60D are diagram illustrating examples of display in steps S342, S344, S346, and S348 in FIG. 58;

FIG. 61 is a diagram illustrating examples of output of audio in steps S342, S344, and S346 in FIG. 58;

DETAILED DESCRIPTION OF THE PREFERRED EMBODIMENTS

Description will now be made of an embodiment of the present invention with reference to the drawings. In the present description, the term "system" shall refer to the equipment in whole comprised of a plurality of devices.

<Overall Configuration of the Editing System>

Figure 1:
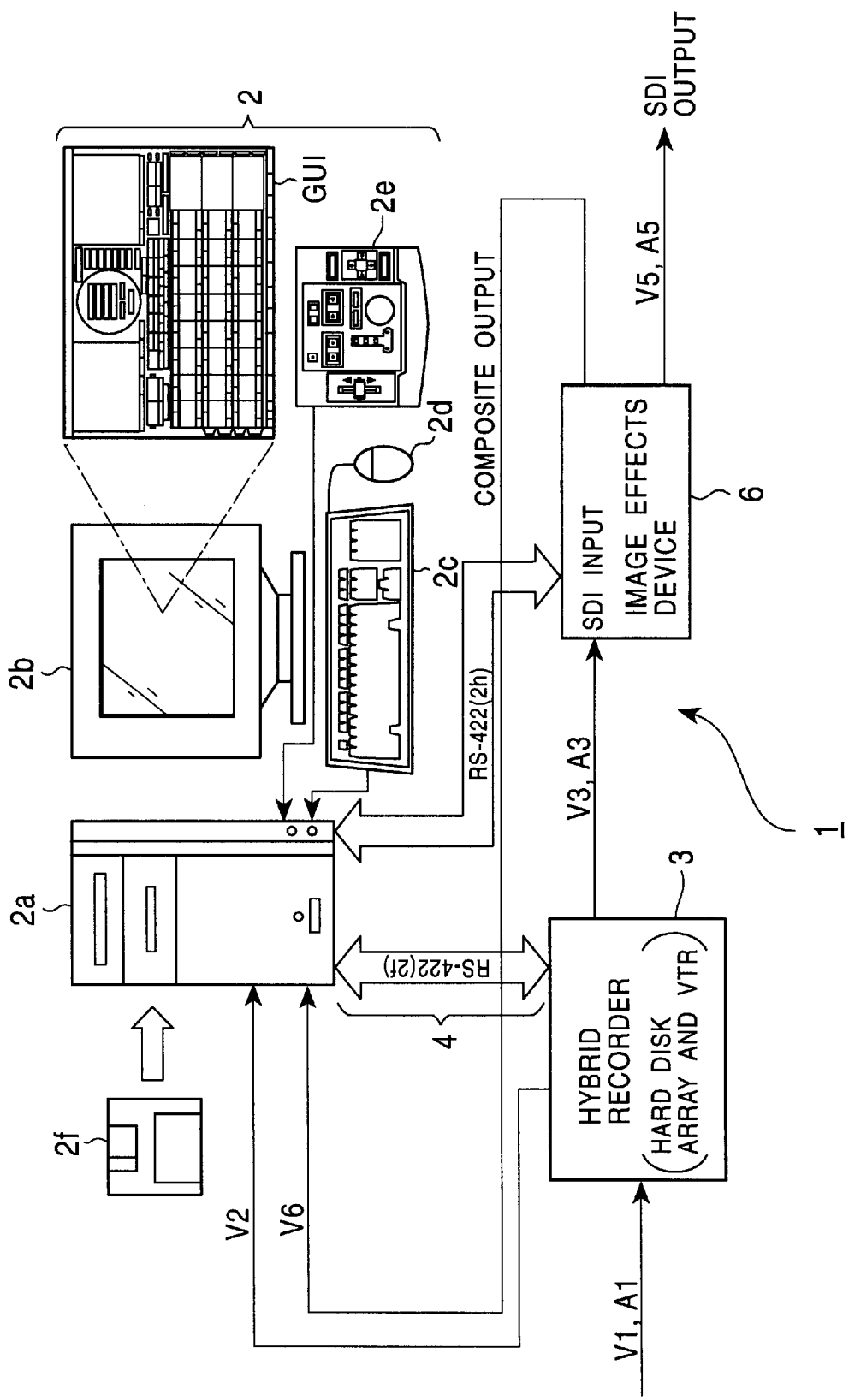
FIG. 1 is a block diagram illustrating an example of the configuration of an editing system according to a first embodiment of the present invention.

In FIG. 1, reference numeral 1 denotes the overall editing system to which the present invention has been applied, which can be generally broken down into a computer 2, a hybrid recorder 3, and an image effects device (effector) 6. The computer 2 is comprised of a CPU, various processing circuits, a floppy disk drive for driving a floppy disk 2f, a main unit 2a having a hard disk and so forth, a monitor 2b connected to the main unit 2a, a keyboard 2c, a mouse 2d, and a dedicated controller 2e. Such a computer 2 has application programs for editing image data installed in the hard disk drive therein beforehand, and the editing system is started up by activating the application programs under the operating system.

Incidentally, the application programs include a GUI (graphical user interface) for generating control commands used for the editing work, and in the event that the application program is started, a graphical display is displayed on the monitor 2b for the GUI.

On the other hand, the hybrid recorder 3 (details to be described later with reference to FIG. 18) is comprised of a hard disk array formed of a plurality of hard disks linked in an array, and a VTR provided for backing up the hard disk array. This hybrid recorder 3 is arranged to sequentially record externally provided SDI (Serial Digital Interface) format source video signals V1 and source audio signals A1. This hybrid recorder 3 performs recording and replay seemingly at the same time, and is arranged so as to record video signals V1 and audio signals A1 and at the same time replay the recorded video signals V1 and audio signals A1 in real-time.

Incidentally, the replayed video signals and audio signals are supplied to the picture effects device 6 as video signals V3 and audio signals A3. Also, out of the signals input, the hybrid recorder 3 outputs video signals V1 without any change as video signals V2, and the output video signals V2 (almost the same as video signals V1, signal-wise) are supplied to the main unit 2a of the computer 2. Now, the video signals V1 and the audio signals A1 input there are composite video signals taken by a video camera or the like or composite video signals sent from a VTR, and corresponding audio signals.

The picture effects device 6 (details described later with reference to FIG. 4) takes the video signals V3 from the video signals V3 and audio signals A3 supplied from the hybrid recorder 3 and subjects these video signals V3 to certain processing, following which these are output to an unshown device as video signals V5. At this time, the corresponding audio signals are delayed by an amount of time corresponding with the processing time of the video signals, and are output in a manner superimposed on the video signals V5. The picture effects device 6 also supplies video signals with special effects applied thereto to the main unit 2a of the computer 2 as composite video signals, in the form of video signals V6.

The main unit 2a of the computer 2 and the hybrid recorder 3, and the main unit 2a and the picture effects device 6, are each connected by communication cables 4 based on the communication format of an RS-422 interface, and are arranged so as to transfer control commands and corresponding responses, via the communication cables. Incidentally, the communication format of the RS-422 interface is a communication format which allows simultaneous transmission/reception of control commands and corresponding response commands.

Now, the operation of this editing system 1 shall be described briefly. First, composite video signals V1 taken by a video camera or the like are input in the hybrid recorder 3, and are sequentially recorded. Also, video signals V2 which pass through the hybrid recorder 3 and are output as is are input to the main unit 2a of the computer 2. The main unit 2a generates a reduced image according to the video signals V23, and displays the image on the monitor 2b. On the other hand, the hybrid recorder 3 encodes the input video signals V1 in real-time, and records these on the hard-disk array and VTR.

The operator of the computer 2 instructs editing points (including editing points for providing certain effects) such as IN points (point to start editing) and OUT points (point to end editing) by means of operating a pointing device such as the mouse 2d connected to the computer 2 while watching the video signals V2 displayed on the monitor 2b which serves as the display means. The operator also uses the GUI displayed on the monitor 2b to generate control commands for editing. These control commands are transferred to the hybrid recorder 3 and the picture effects device 6 as RS-422 control commands. Thus, the replay operation of the hybrid recorder 3 is controlled, and the replayed video signals V3 are provided with effects as necessary at the picture effects device 6, and then supplied to the computer 2 as video signals V6, where they are displayed on the monitor 2b thereof, and also sent out externally as video signals V5.

In this way, the editing system 1 allows the operator to perform work easily by operating a pointing device such as the mouse 2d while watching the monitor 2b. Also, with this editing system 1, editing work can be performed in real-time, by means of using a hybrid recorder 3 with which recording and replaying can be performed almost simultaneously, and a picture effects device 6. Thus, effects can be applied to material such as sports and news broadcasts without interfering with the real-time nature thereof, and thus edit these materials.

Figure 2:
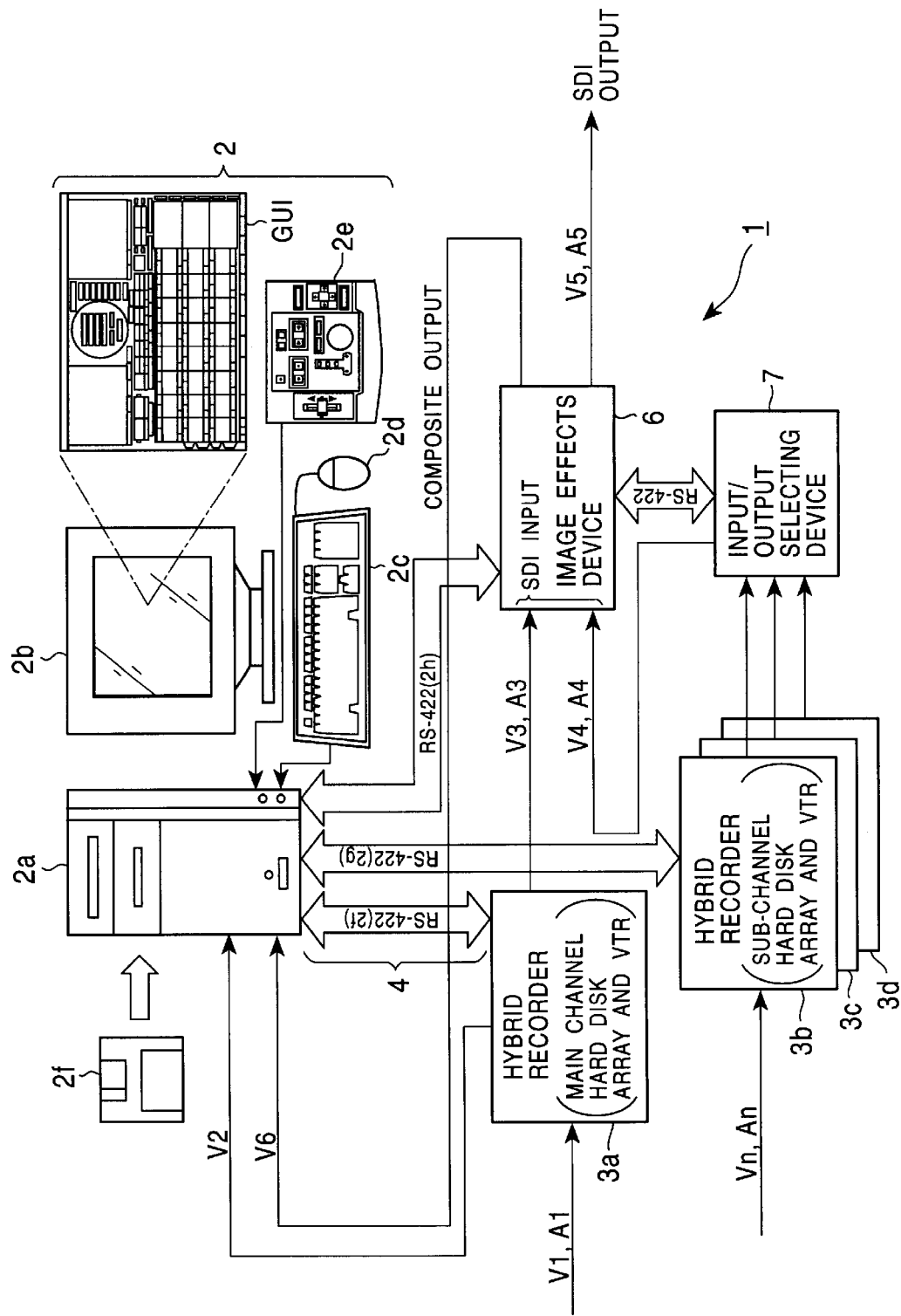
FIG. 2 is a block diagram illustrating another example of the configuration of an editing system according to a first embodiment of the present invention.

FIG. 2 represents another example of the configuration of the editing system 1. In this configuration example, four of the hybrid recorders 3 are provided, namely, hybrid recorder 3a through hybrid recorder 3d. One of these serves as a main-channel hybrid recorder 3a, and another serves as the sub-channel hybrid recorder 3b. The signals output by the main hybrid recorder 3a i.e., video signals V3 and audio signals A3 are input into the picture effects device 6 without any alteration. On the other hand, the video signals and audio signals output by the hybrid recorder 3b through hybrid recorder 3d are input into an input/output selecting device 7, whereby one of these is selected and input to the picture effects device 6 as video signals V4 and audio signals A4. Other configurations of this arrangement are the same as in FIG. 1.

In this case, the picture effects device 6 provides certain effects to the main channel video signals and the video signals selected by the input/output selecting device 7 from the other video signals, following which the signals are output.

In this editing system, images can be synchronized and recorded from a maximum of four places. The picture effects device 6 serves as a so-called A-roll effector, and is capable of taking pictures from two channels as pictures to be subjected to effects. Accordingly, the main channel picture and the picture selected by the input/output selecting device 7 can serve as objects of editing and take the certain effects. The hybrid recorders 3a through 3d have a synchronized time code (i.e., the time code of the picture recorded in the respective HDDs and the recording addresses match), and pictures from four places and by synchronously recorded by means of supplying the same commands to the hybrid recorders 3a through 3d. Then, two pictures can be synchronously replayed therefrom, and output provided with the certain effects.

<Internal Configuration of the Computer>

Figure 3:
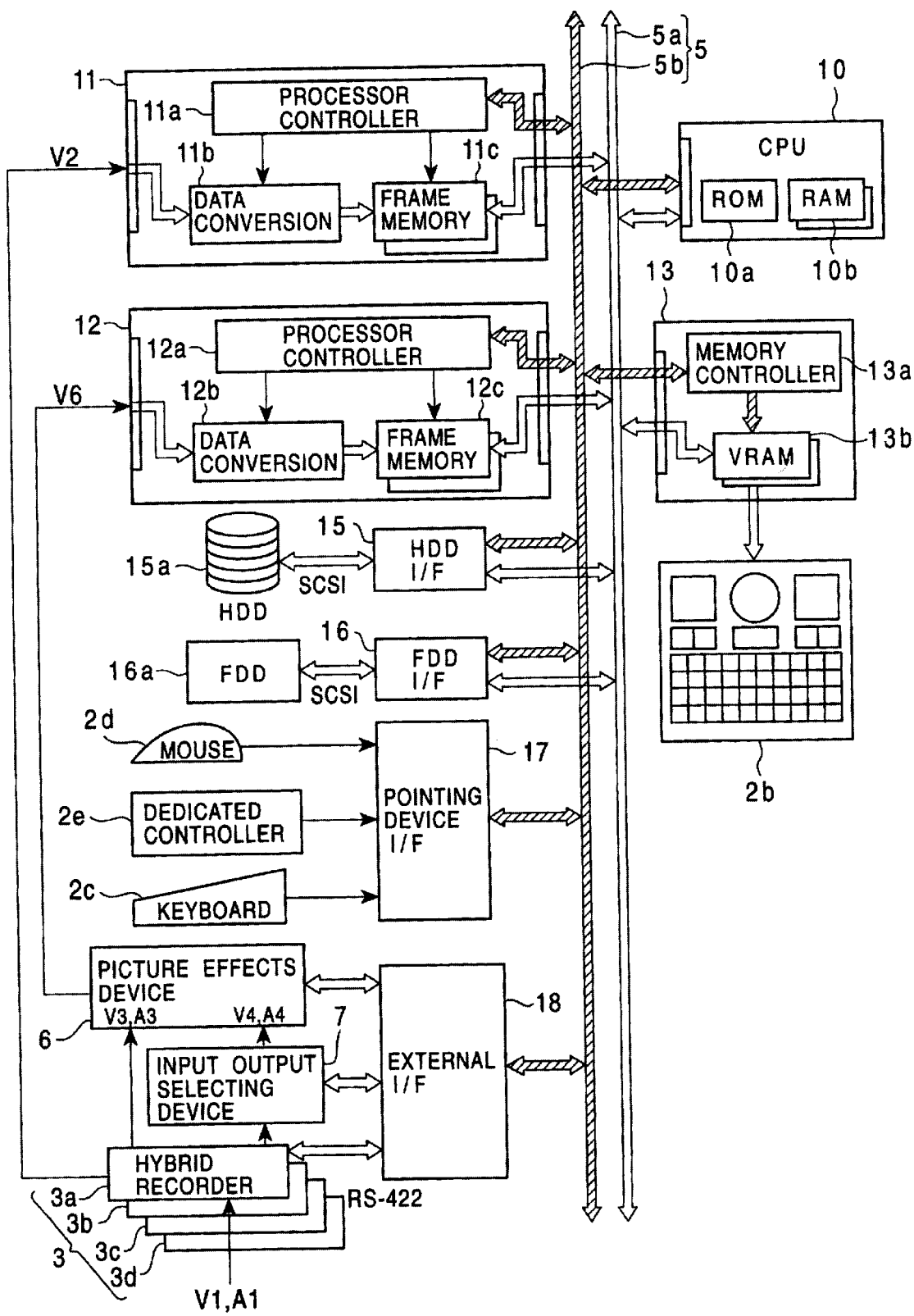
FIG. 3 is a block diagram illustrating the internal configuration of a computer making up the editing system shown in FIG. 1 or FIG. 2.

This section describes the internal configuration of the computer 2 in detail. As shown in FIG. 3, the computer 2 has a system bus for transferring commands and video data, a CPU 10 which controls the entire computer, first and second video processors 11 and 12 which perform image processing and the like for the input video signals, a display controller 13 for managing graphics display for displaying video data and GUI on the monitor 2b, a HDD interface 15 for controlling the local hard disk drive (local HDD), an FDD interface for controlling the floppy disk drive (FDD) 16a for driving the floppy disk 2f, a pointing device interface 17 for generating control commands based on commands from a pointing device such as the mouse (cursor controlling device) 2d, dedicated controller 2e, and keyboard 2c, and an external interface 18 having a software driver for conducting data communication based on the RS-422 communication format between the hybrid recorders 3a through 3d, image effects device 6, and input/output selecting device 7.

The system bus 5 is a bus for performing communication within the computer 2 such as video data and command data, or address data, etc. The system bus 5 is comprised of an image data bus 5a for transferring video data and a command data bus 5b for transferring command data and the like.

Connected to the image data bus 5a is the CPU 10, the first and second video processors 11 and 12, the display controller 13, HDD interface 15, and the FDD interface 16, with the aforementioned first and second video processors 11 and 12, display controller 13, HDD interface 15, and FDD interface 16 being arranged to perform transfer of video data via this image data bus 5a.

On the other hand, connected to the command data bus 5b is the CPU 10, the first and second video processors 11 and 12, the display controller 13, HDD interface 15, the FDD interface 16, the pointing device interface 17, and the external interface 18 (i.e., all internal blocks of the computer 2 are connected thereto), being arranged to perform transfer of command data and address via this command data bus 5b.

The CPU 10 is a block for performing control of the entire computer 2, and has ROM 10a which stores the operating system of the computer 2, and RAM 10b which stores uploaded application programs and the like. In the event of starting up the computer 2, the CPU executes a software program based on the operating system stored in the ROM 10a. In the event of executing an application program under the activated operating system, the CPU 10 first reads the application program stored in the hard disk of the hard disk drive 15a, uploads the application program to the RAM 10b, following which the application program is executed.

The first video processor 11 is a block for receiving a first video signal V2 input to the computer 2, subjecting the first video signal V2 to data conversion, and temporarily backing up that converted video data. More specifically, the first video processor 11 is comprised of a processor controller 11a controlling the entire video processor 11, a data converting unit 11b for converting the received analog composite video signals V2 into digital component video data, and frame memory 11c for temporarily storing several frames of video data sent from the data converting unit 11b.

The processor controller 11a sends control signals to the data converting unit 11b, so as to control the data converting operation of the data converting unit 11b, and also to extract the time code from the composite video signals V2. Also, the processor controller 11a sends control signals to the frame memory 11c so as to control the read/write timing read/write address of the frame memory 11c. Incidentally, regarding read timing, the processor controller 11a controls the read timing of the frame memory 11c so that the time code sent to the display controller and the video data (frame data) correspond.

The data converting unit 11b converts the analog composite video signals V2 into component video signals, based on the control signals from the processor controller 11a, and subsequently converts the analog component video signals into digital video data. Incidentally, the time code is extracted at the point that the analog component video signals are converted into digital video data. The digital-converted video data is sent to the frame memory 11c and the extracted time code is sent to the processor controller 11a.

Here, the time code is encoded and inserted into the two lines 14H and 16h, or 12H and 14H, in the vertical blanking period of the composite video signals V2; i.e., so called VITC (Vertical Interval Time Code). Accordingly, in the event of extracting the time code from the composite video signals V2, the time code can be easily extracted by decoding only the time code from the vertical synchronous period converted into digital. Incidentally, this time code has been added in the hybrid recorder 3 (by the second time code adding unit 312 shown in FIG. 18) at the point of outputting the video signals V2.

The frame memory 11c temporarily stores the video data supplied from the data converting unit 11b. The read/write timing of this frame memory 11c is controlled by the processor controller 11a as described above. This frame memory 11c is comprised of two sets of frame memory, having a total of 4 Megabytes of storage capacity. The video data stored in this frame memory 11c is video data comprised of 1520 pixels by 960 pixels per frame, and the frame memory is arranged so as to be able to store two frames of such video data.

The 1520 pixel by 960 pixel video data stored in the frame memory 11c is read out based on read control from the processor controller 11a. The 1520 pixel by 960 pixel video data read out from the frame memory 11c is video data which has been pruned of data amount, so that it is 350 pixel by 240 pixel video data instead of the 1520 pixel by 960 pixel full-pixel video data. The process of pruning here involves simply reducing the sampling rate of reading the video data from the frame memory 11c to 1/4, so that the amount of read video data is reduced. The 350 pixel by 240 pixel video data thus read is sent to the display controller 13 via the image data bus 5a (this image is then displayed on monitor 2b on the recording video screen 21a shown in FIG. 5, as described later).

The second video processor 12 has exactly the same configuration as the first video processor 11. That is, the second video processor 12 is comprised of a processor controller 12a controlling the entire video processor 12, a data converting unit 12b for converting the received analog composite video signals V6 into digital component video data, and frame memory 12c for temporarily storing several frames of video data sent from the data converting unit 12b. The point in which the first video processor 11 and the second video processor 12 differ is that composite video signals V2 output from the hybrid recorder 3 are input to the first video processor 11, while composite video signals V6 output from the picture effects device 6 are input to the second video processor 12.

The composite video signals V2 here are input video signals V1 which have been superimposed with a time code in the vertical synchronous period within the hybrid recorder, and thus time-wise are the same video signals as the input video signals V1 which are input in real-time. That is, the video data stored in the frame memory 11c is the same video data as the digitized video signals V1. Conversely, the composite video signals V6 are video signals which have been replayed from the hybrid recorder 3 by commands from the computer 2, and provided with effects by the picture effects device 6 as necessary. Accordingly, the composite video signals V6 are video signals which are offset time-wise (off-time) as compared to the input video signals V1.

This point will be dealt with in detail below. When the operator issues commands to the computer 2 to replay certain video data, the computer 2 sends replay commands for that video data to the hybrid recorder 3 (hereafter referred to simply as "hybrid recorder 3" in the event that there is no need to differentiate between the individual hybrid recorders 3a through 3d). The hybrid recorder 3 replays the video data that the operator has specified, according to the replay commands from the computer 2. Also, the hybrid recorder 3 stores time code which matches the video data frame to frame, and replays the time code of the replayed video data based on this correlation.

Then, the hybrid recorder 3 superimposes the replayed time code in the vertical synchronous period of the replayed video data, and converts the video data obtained thus into analog composite video signals V3 so that the video data can be transferred to the picture effects device 6. Consequently, the analog composite video signals V3 are transferred to the picture effects device 6. The picture effects device 6 then provides the video signals V3 with effects according to the commands from the computer 2, and outputs the video signals as composite video signals V6 to the computer 2. The composite video signals V6 are thus video signals replayed according to commands from the operator, and thus are signals asynchronous with the input video signals V1.

In the same manner as the composite video signals V2 supplied to the first video processor 11, the composite video signals V6 supplied to the second video processor 12 are subjected to certain signal processing via the data converting unit 12b and the frame memory 12c, and transferred to the display controller 13 as 380 pixel by 240 pixel digital video data (this image is then displayed on the monitor 2b on the recording video screen 21a shown in FIG. 5, as described later).

The display controller 13 is a control block for controlling data displayed on the monitor 2b. The display controller 13 has a memory controller 13a and VRAM (Video Random Access Memory) 13b. The memory controller 13a controls the read/write timing of the VRAM 13b, according to the internal cycle of the computer 2. Stored within this VRAM 13b are the video data from the frame memory 11c of the first video processor 11, the video data from the frame memory 12c of the second video processor 12, and image data from the CPU 10, each based on timing signals from the memory controller 13a.

The image data stored in this VRAM 13b is read from the VRAM 13b based on timing control signals from the memory controller 13b according to the internal cycle of the computer 2, and graphics are displayed on the monitor 2b. The graphic display thus displayed on the monitor 2b serves as the graphic display for the GUI. Now, the image data sent from the CPU 10 to the VRAM 13b is image data such as windows, cursors, scroll bars, etc. Displaying these multiple types of image data on the monitor 2b yields the graphic display for the GUI.

The hard disk interface 15 is an interface block for communicating with the local hard disk drive (HDD) 15a provided within the computer 2. The hard disk interface 15 and hard disk drive 15a communicate based on the SCSI (Small Computer System Interface) transfer format.

The hard disk drive 15a has installed therein application programs which start up on the computer 2, and in the event of executing these application programs, the application program is read from the hard disk drive 15a and uploaded to the RAM 10b of the CPU 10. Also, in the event of ending this application program, the work data file created by the editing operation and stored in the RAM 10b is downloaded to the hard disk via the hard disk drive 15a.

The floppy disk interface 16 is an interface block for communication with the floppy disk drive (FDD) 16a provided within the computer 2. The floppy disk interface 16 and the floppy disk drive 16a are arranged so as to conduct communication based on the SCSI transfer format. Also, EDLs (Edit Decision List) and the like indicating the results of editing by the editing operation are recorded in the floppy disk 2f via the floppy disk drive 16a.

The pointing device interface 17 is an interface block for receiving information from the mouse 2d, dedicated controller 2e, and keyboard 2c, which are connected to the computer 2. The pointing device interface 17 receives from the mouse 2d, for example, detection information for a two-dimensional rotary encoder provided to the mouse 2d, and click information from the left and right buttons provided to the mouse 2d, and decodes and outputs received information to the CPU 10. In the same manner, the pointing device interface 17 receives information from the dedicated controller 2e and keyboard 2c, and decodes and outputs received information to the CPU 10.

The external interface 18 is a block for communicating with the hybrid recorder 3, picture effects device 6, and input/output selecting device 7, which are connected externally to the computer 2. The external interface 18 has an RS-422 driver for converting command data generated at the CPU 10 into RS-422 communication protocol, and the external interface 18 performs actions via the RS-422 driver such as sending control commands such as replay commands to the hybrid recorder, sending control commands to cause the input/output selecting device 7 to select a certain signal, and sending control command signals for providing certain effects at the picture effects device 6.

Figure 4:
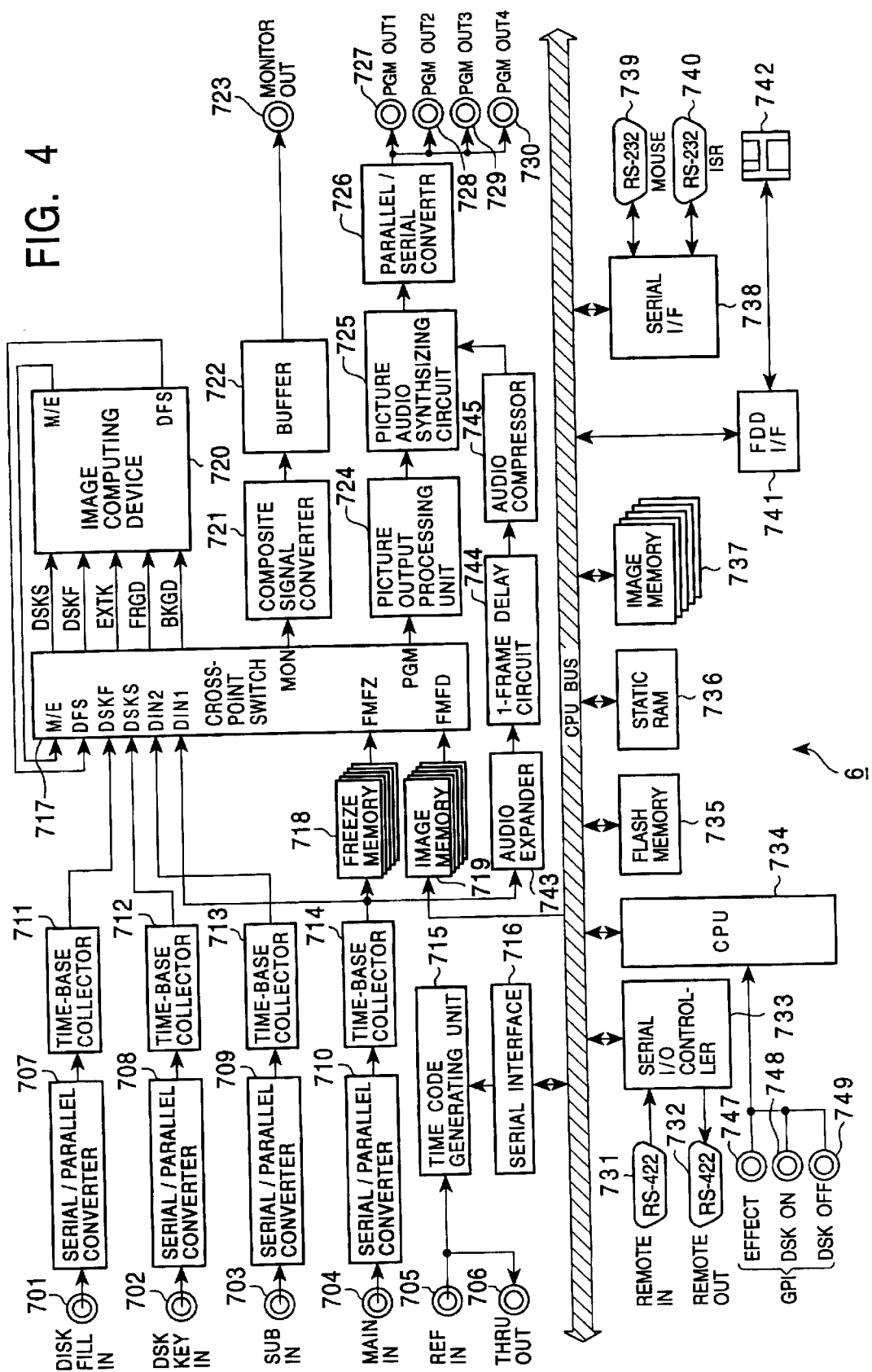
FIG. 4 is a block diagram illustrating an example of the configuration of the picture effects device 6 shown in FIG. 1 or FIG. 2.

FIG. 4 illustrates a configuration example of the picture effects device 6 which serves as an A-roll effector. Input to the terminal 704 are main-channel video signals V3 and audio signals A3 which are output from the hybrid recorder 3a, and input to the terminal 703 are video signals V4 and audio signals A4 which are output from the hybrid recorder which the input/output selecting device 7 has selected from the hybrid recorders 3b through 3d. The video signals V3 and audio signals A3 which are input into the terminal 704 are converted from serial data to parallel data by the serial/parallel converter 710, and then the timing thereof is adjusted by the time-base collector 714. Of the signals output by the time-base collector 714, the video signals are supplied to the freeze memory 718 and stored, and also supplied to the terminal DIN1 of the cross-point switch 717. The picture data stored in the freeze memory 718 is read out therefrom, and supplied to a terminal FMFZ of the cross-point switch 717.

Of the signals output by the time-base collector 714, the audio signals are input to the audio expander 743 and subjected to expanding processing, following which the signals are delayed by one frame, by means of the 1-frame delay circuit 744. This delay time corresponds with the amount of time necessary for the image computing processing in the image computing device 720. The output of the 1-frame delay circuit 744 is input to the audio compressor 745 and compressed, and then supplied to the picture-audio synthesizing circuit 725.

The video signals V4 and audio signals A4 which are input into the terminal 703 are converted from serial data to parallel data by the serial/parallel converter 709, and then input to the time-base collector 713 where the timing thereof is adjusted. Of these signals, the video signals V4 are further input to the terminal DIN2 of the cross-point switch 717.

Input to 701 and 702 are externally supplied DSK (Downstream Keying) fill signals and DSK key signals. The DSK fill signals are converted from serial data to parallel data by the serial/parallel converter 707, the timing thereof is adjusted by the time-base collector 711, and supplied to the terminal DSKF of the cross-point switch 717. The DSK key signals are converted from serial data to parallel data by the serial/parallel converter 708, the timing thereof is adjusted by the time-base collector 712, and supplied to the terminal DSKS of the cross-point switch 717.

The image data on which is based the internal DSK signals read from the floppy disk is supplied to the image memory 737 which serves as a buffer from the FDD interface 741 via the CPU bus 746, and is stored.

The cross-point switch 717 selects a certain one of the picture signals input from the terminals FMFZ, DIN1, or DIN2, and supplies this to the terminal FRGD or BKGD or the image computing device 720. The picture before switching (background video) is supplied to the terminal BKGD, and the picture after switching (foreground video) is supplied to the terminal FRGD.

The terminal DSKS of the image computing device 720 is supplied with key signals selected by the setting of the GUI (i.e., key signals from the terminal 702 or key signals from the floppy disk 742), and the terminal DSKF thereof is supplied with fill signals selected by the GUI (i.e., fill signals from the terminal 701 or matte color signals from the internal generator). Key signals from the terminal 702 are input to the terminal EXTK of the image computing device 720.

The image computing device 720 provides certain effects to the image data input from the terminals, and the image data to which effects have been applied are output from the terminals M/E or DFS. Image data without DSK is output from the terminal M/E, and supplied to the terminal M/E of the cross-point switch 717. Also, image data including DSK processing is output from the terminal DFS of the image computing device 720, and is input to the terminal DFS of the cross-point switch 717.

For example, in the event of switching from the main channel to the sub-channel and putting effects on the sub-channel, the cross-point switch 717 supplies the output of the freeze memory 718 input to the terminal FMFZ to the terminal BKGD of the image computing device 720, and supplies image data that is input to the terminal DIN2 of the cross-point switch 717 from the time-base collector 713 to the terminal FRGD of the image computing device 720. The image computing device 720 switches the image from the image supplied from the terminal FRGD to the image supplied from the terminal BKGD and subjected to effects, outputs the latter image from the terminals M/E and DFS, and provides feedback to the corresponding terminal of the cross-point switch 717.

The cross-point switch 717 selects one of the image data input from the terminal M/E or DFS, and outputs this to the terminal MON or PGM. The image data output from the terminal MON of the cross-point switch 717 is converted into composite video signals by means of the composite signal converter 721, and is output to the computer 2 from the terminal 723 as video signals V6. The video signals v6 are displayed on the replay video screen 23a, later described with reference to FIG. 5.

The video data output from the terminal PGM of the cross-point switch 717 is input to the picture output processing unit 724, and following certain image processing, is input to the picture audio synthesizing circuit 725, and is synthesized with the audio signals input from the audio compressor 745. The signals output from the picture audio synthesizing circuit 725 are converted from parallel data to serial data by the parallel/serial converter 726, and output from the terminals 727 through 730 to an unshown device.

Certain video signals are input to the terminal 705. These signals are output as through signals from the terminal 706 without change to an unshown device, and are also input to the time code generating unit 715. The time code generating unit 715 generates a time code synchronously with the video signals supplied from the terminal 705. The time code is supplied to the appropriate CPU 734 via the serial interface 716 and CPU bus 746. The CPU 734 controls the various members synchronously with this time code. Hence, image effects processing synchronous with externally input video signals can be realized.

The flash memory 735 stores programs to be processed by the CPU 734, and the static ram 736 stores as appropriate various types of data to be processed by the CPU 734.

Connected to the RS-422 terminals 731 and 732 via the communication cables 4 is the personal computer 2. The serial input/output controller 733 executes the interface processing of commands received via the RS-422 terminals 731 and 732.

The CPU 734 is also arranged so as to be able to control from the terminals 747 through 749 of a GPI (General-Purpose Interface). Input to the terminal 747 are signals which control the on/off of effects, input to the terminal 748 are signals which turn the DSK on, and input to the terminal 749 are signals which turn the DSK off.

The mouse is connected to the RS-232 terminal 739, and connected to the terminal 740 is a personal computer having software for monitoring and diagnosing ISR (Interactive Status Reporting) devices such as the picture effects device 6, for example. The serial interface 738 executes interface processing between these terminals 739–740 and the device connected thereto.

<Graphics Display for GUI>

Picture Mode

Two graphics modes are provided to the editing system 1 for GUI purposes, namely, the picture mode wherein the operator watches IN point and OUT point screens of registered events, and rearranges the order of the events to edit the program, and the other is the time-line mode wherein the operator adjusts the length of the program while watching the time-length of the registered events. The operator can easily switch between these two modes by clicking on the mode button 22b shown in FIG. 5 as described later, so the user can select the GUI with greater ease-of-use depending on the object of editing, thereby improving useability in editing work.

In this section, first, the picture mode will be described. In the case of the picture mode, a graphics display is displayed on the monitor 2b, as shown in FIG. 5. As shown in FIG. 5, the graphics display in the picture mode is generally divided into ten areas, namely, the recorded video display area 21, timing display area 22, replay video display area 23, recorded video marking area 24, picture effects set-up area 25, recycle box area 36i, replay video marking area 27, clip display area 28, event display area 29, and program display area 10.

The recorded video display area 21 has a recorded video screen 21a, start recording button 21b, normal button 21c, voice-over button 21d, and drop display portion 21e. The video signals displayed in the recorded video screen 21a are video signals obtained from the composite video signals V2 output from the hybrid recorder 3a, which have been pruned by the computer 2 at the point of being supplied from the frame memory 11c to the VRAM 13b so that the image size thereof is changed to 380 pixels by 240 pixels.

The start recording button 21b is operated when setting the point to start recording on the hard disk (HDD 300 in FIG. 18) of the digital video tape recorder (VTR 301 in FIG. 18) to either the current replay position or the head of the hard disk. The normal button 21c and voice-over button 21d are selectively operated for selecting the respective mode. The drop display portion 21e displays the frame mode for the digital video recorder. (In the case of NTSC video signals, the number of frames per second is not precisely 30, but rather a number with fractions such as 29.xxx, so "drop" or "non-drop" is applied for the time-code counting method for absorbing this margin.)

The tally display area 22a of the timing display area 22 displays the on-air tally according to external signals when on air. The mode button 22b is operated when changing the editing mode of the picture mode and time-line mode. The back-up button 22c is operated when using the VTR (VTR 301 in FIG. 18) as the back-up for the HDD (HDD 300 in FIG. 18). The dubbing button 22d is operated when dubbing from the HDD to the VTR in the hybrid recorder 3, or the reverse. The pre-roll button 22e is operated when setting the pre-roll mode. The delay button 22f is operated when delaying the picture being currently recorded and displayed on the replay video screen 23a of the replay video display area 23. The DMC (Dynamic Motion Controller) button 22g is operated when displaying the replay speed setting area 25A (described later with reference to FIG. 19) and setting the replay speed. The option button 22h is operated when displaying the various option menus. The set button 22i is operated when putting the selected program, event or time-line in a replay stand-by state (on-air mode).

The time display portion 22j displays the current time. The recorded video signal time code display portion 22k displays the time code of the video signals being displayed in the recorded video display area 21. This time code is a time code which the processor controller 11a of the first video processor 11 has extracted from the vertical synchronous period of the composite video signals V2. The recorded video signal time-code display portion 22m displays the time code of the video signals being displayed on the replay video display area 23. This time code is a time code which the processor controller 12a of the second video processor 12 has extracted from the vertical synchronous period of the composite video signals V3.

The storage capacity remaining-time display portion 22n displays the remaining time for the storage capacity of the hard disk of the hybrid recorder 3. The remaining time displayed here can be easily calculated, since the total capacity of the hybrid recorder 3 is known beforehand, so all that is necessary is to subtract from the maximum recording time of the hybrid recorder 3 the value obtained by subtracting the start-recording time from the current time.

Incidentally, the display of these display portions 22j through 22n change according to the settings made from the menu.

Figure 18:
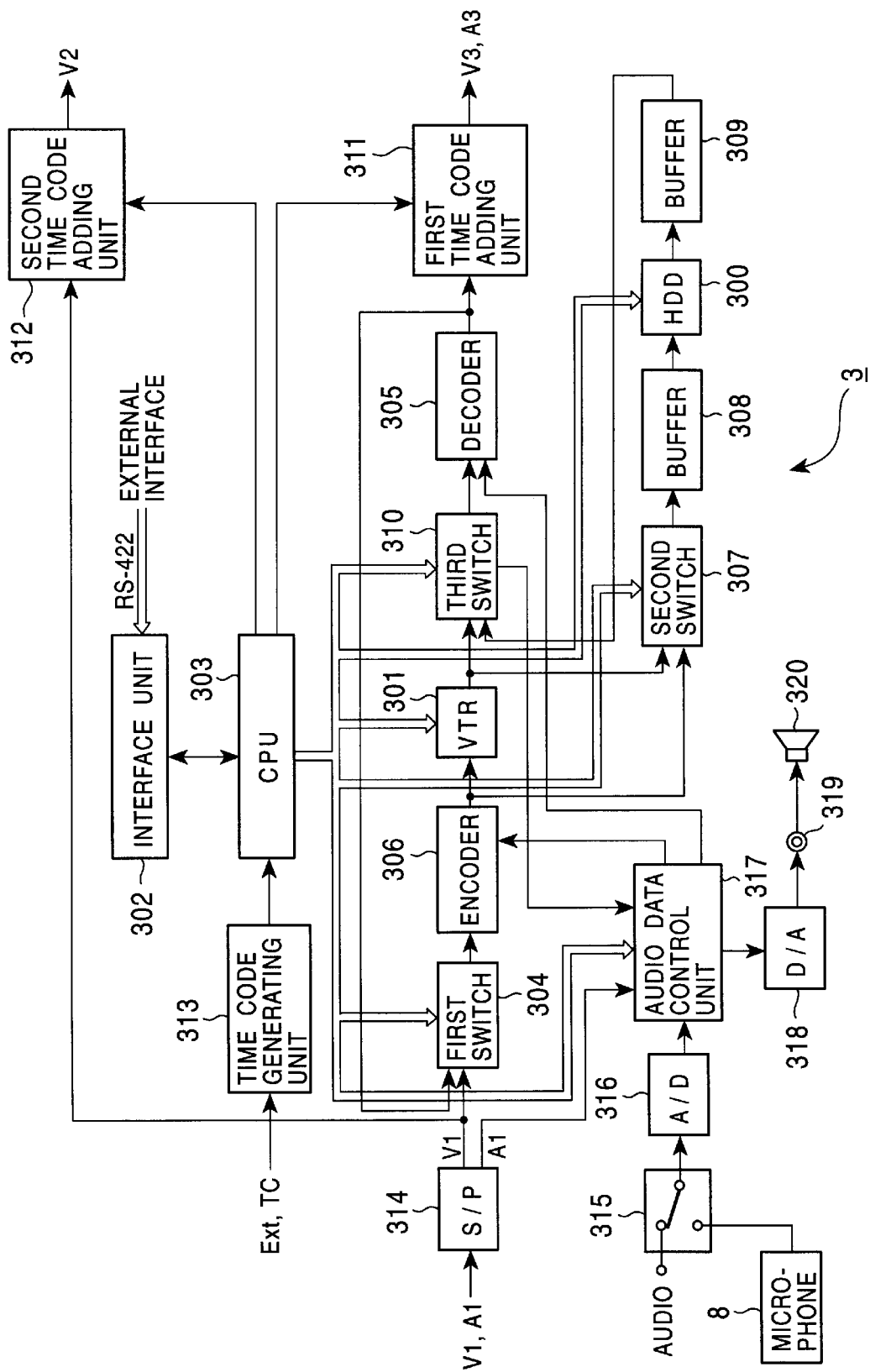
FIG. 18 is a block diagram illustrating the configuration of the hybrid recorded in FIG. 1 or FIG. 2.

The display portion 22o displays the editing mode (full-edit mode (FULL) or loop recording mode (LOOP) of the picture effects device 6, and the object of recording of the hybrid recorder 3 (i.e., either or both of the VTR 301 and hard disk 300 shown in FIG. 18) is displayed on the display portion 22p. The display portion 22q displays the operating state of the VTR.

Figure 67:
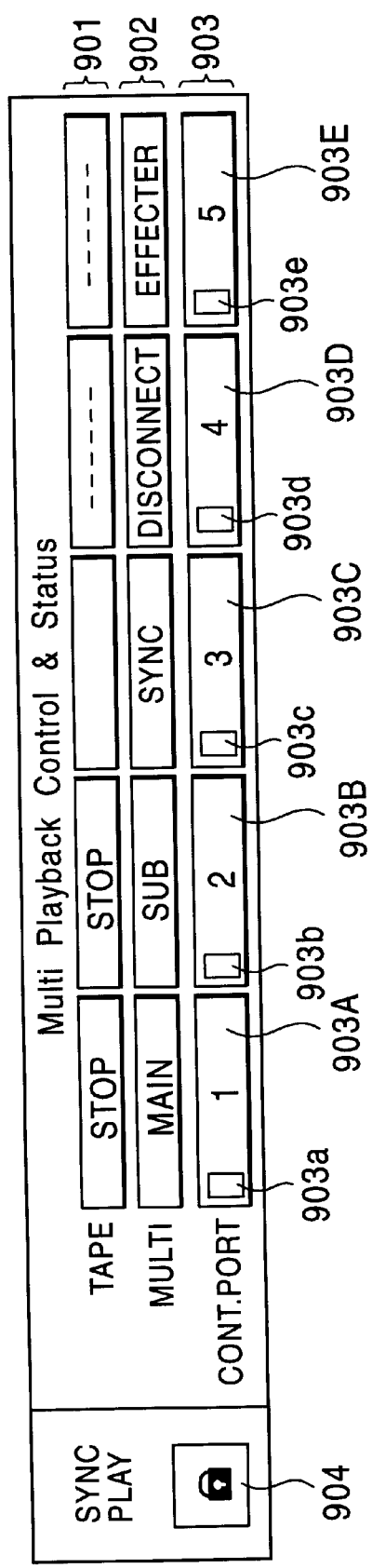
FIG. 67 is a diagram illustrating an example of display of the multi-control panel.

Further, the display portion 22r is displayed when the dubbing speed from the VTR to the hard disk is high-speed, the display portion 22s displays whether or not the picture effects device 6 is connected to the computer 2, and the display portion 22t displays whether or not the plurality of hybrid recorders 3a through 3d are operating synchronously (i.e., whether or not the later-described sync-play button 904 shown in FIG. 67 is turned on or not).

The on-air display portion 22a is a display portion for indicating whether the state is on-air or not, and once tally signals indicating an on-air state are supplied externally, the display color of the on-air display portion 22a turns red. The tally signals indicating the on-air state are composite video signals V6 output from the picture effects device 6 when in the on-air state. Thus, the on-air display portion 22a can be made to change display colors according to the on-air state, so the operator can easily visually grasp the fact that the state is that of on-air.

Figure 5:
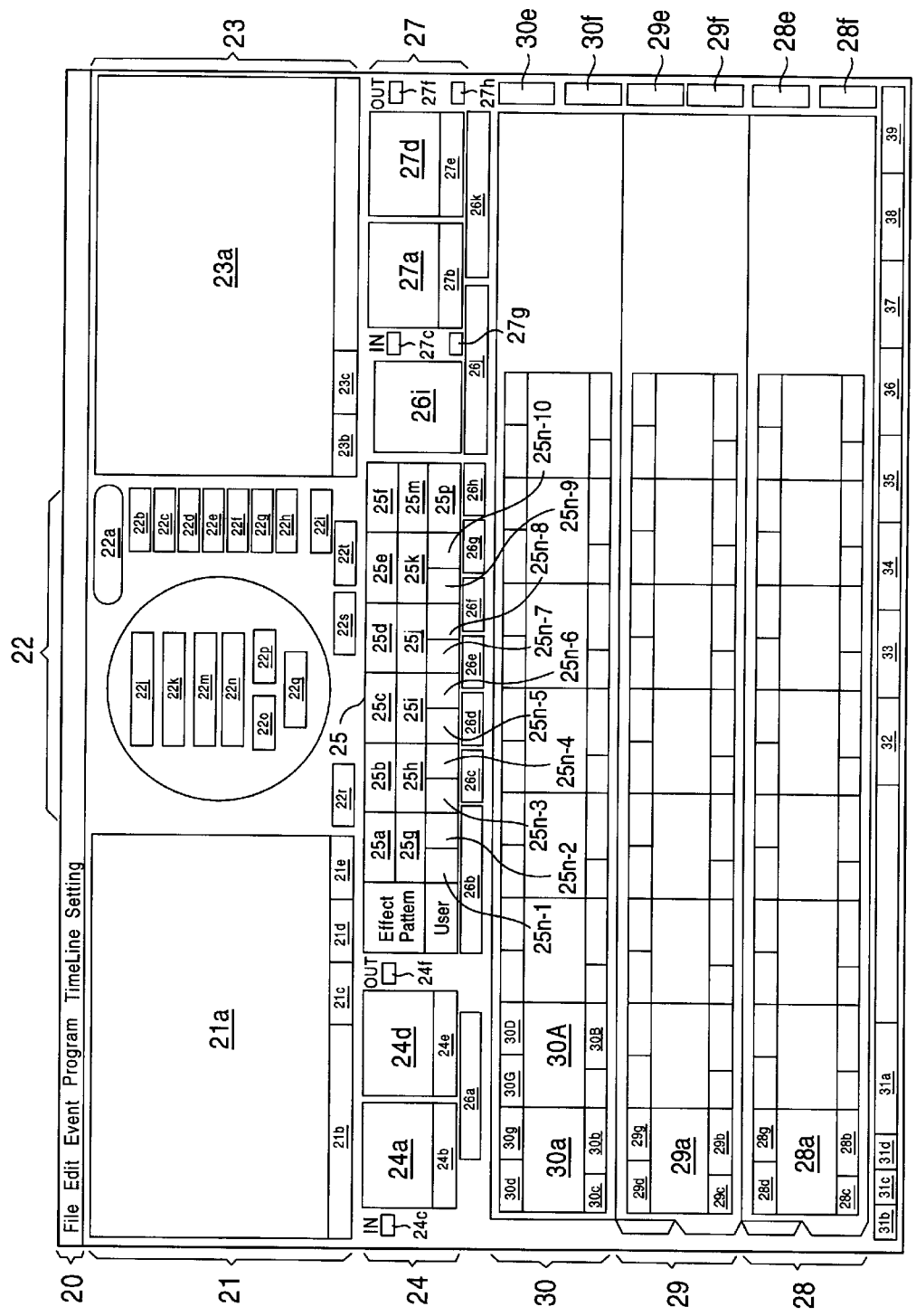
FIG. 5 is a diagram illustrating and example of the GUI when in the picture mode.
Figure 6:
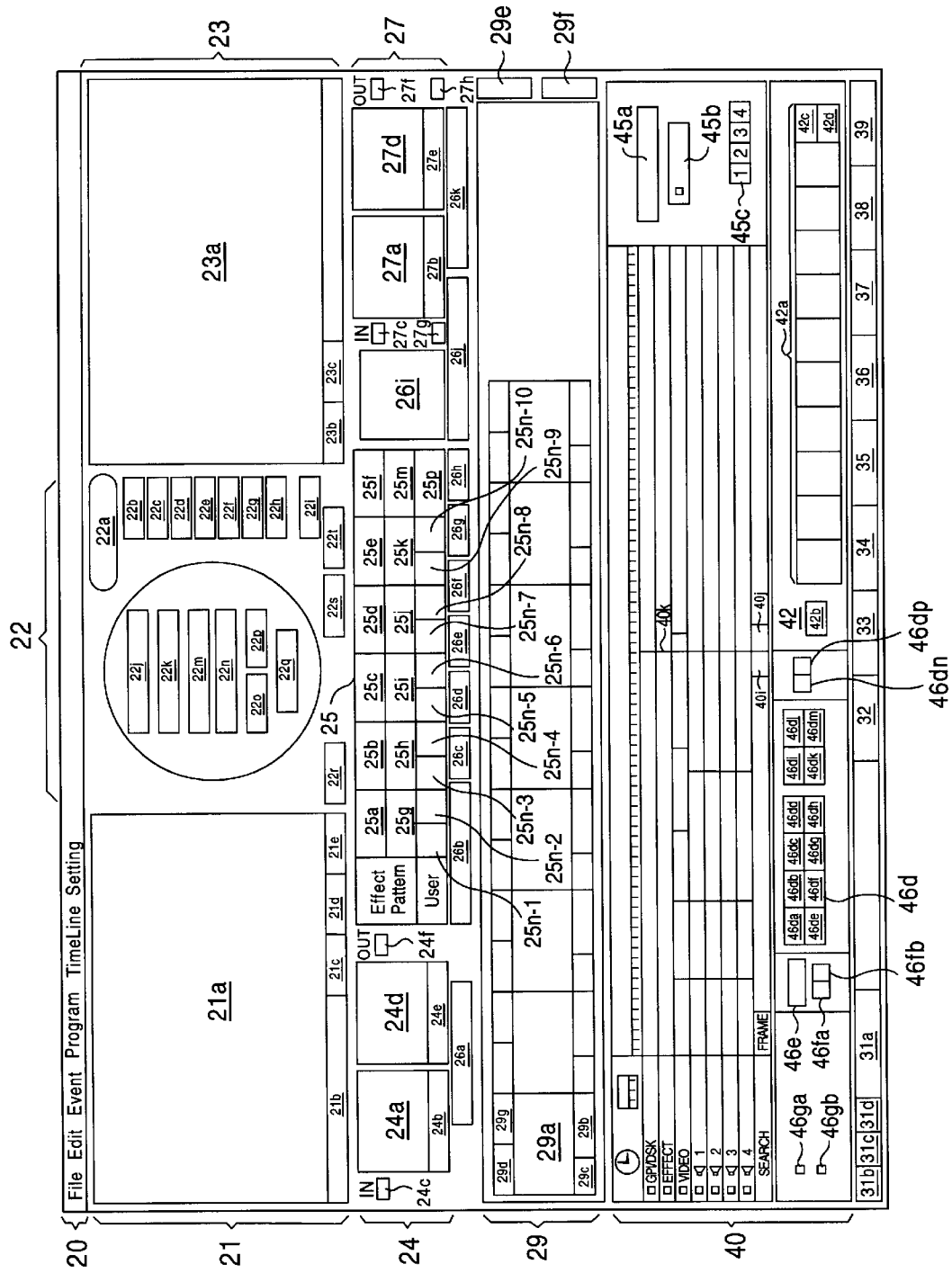
FIG. 6 is a diagram illustrating an example of the GUI when in the time-line mode.

The mode button 22b is a button used for switching between the picture mode shown in FIG. 5 and a later-described time-line mode (FIG. 6). Switching of the mode can be commanded by clicking the mode button 22b with the mouse 2d, thus switching the display mode between the picture mode and time-line mode.

The pre-roll button 22e is a button used for setting the pre-roll mode. Also, the DMC (Dynamic Motion Controller) button 22g is a button used for setting the replay speed of the selected event. These two buttons will be described in detail later.

The replay video display area 23 has a replay video screen 23a, main button 23b, and a sub-button 23c. The video signals displayed on the replay video screen 23a are video signals obtained from the composite video signals V6 replayed by the hybrid recorder 3 and output from the picture effects device 6, which have been pruned at the point of being supplied from the frame memory 12c to the VRAM 13b so that the image size thereof is changed to 380 pixels by 240 pixels.

In the event that the main button 23b is turned on, the output of the main-channel hybrid recorder 3a is displayed on the replay video screen 23a. In the event that the sub-button 23c is turned on, the output of the sub-channel hybrid recorder 3b is displayed on the replay video screen 23a.

The recorded video marking area 24 is an area used for marking IN point or OUT point clip image data from the video displayed on the recorded video screen 21a. The term "marking" here refers to the act of specifying an IN point or OUT point, or setting an IN point or OUT point. Also, the term "clip image" here is synonymous with the term "still image". This recorded video marking area 24 is divided into an IN clip display area 24a, IN point time-code display area 24b, mark-IN button 24c, an OUT clip display area 24d, OUT point time-code display area 24e, and mark-OUT button 24f.

The IN clip display area 24a is an area for displaying the clip image marked as an IN point by the operator clicking on the mark-IN button 24c. The clip image data displayed on the IN clip display area 24a are video signals obtained from the composite video signals V2 output from the picture effects device 6, which have been pruned so that the image size thereof is changed to 95 pixels by 60 pixels.

The time code of the clip image data that is being displayed on the IN clip display area 24a is displayed on the time-code display area 24b. This time code is the time code that the processor controller 11a of the first video processor 11 has extracted from the composite video signals V2 at the point of the operator marking the IN-point by clicking on the mark-IN button 24c.

The mark-IN button 24c is a button for marking an IN-point. The operator watches the video image displayed on the recorded video image 21a and clicks on the mark-IN button 24c at the timing at which the desired image is displayed. Once the mark-IN button 24c is displayed, clip Image data (95 pixels by 60 pixels) corresponding to the video data displayed on the recorded video screen 21a is generated, and the generated clip image data is displayed in the IN-clip display area 24a.

The OUT clip display area 24d is an area for displaying the clip image marked as an OUT point by the operator clicking on the mark-OUT button 24f. The clip image data displayed on the OUT clip display area 24d are video signals obtained from the composite video signals V2 output from the picture effects device 6, which have been pruned so that the image size thereof is changed to 95 pixels by 60 pixels.

The time code of the clip image data that is being displayed on the OUT clip display area 24d is displayed on the time-code display area 24e. This time code is the time code that the processor controller 11a of the first video processor 11 has extracted from the composite video signals V2 at the point of the operator marking the OUT-point by clicking on the mark-OUT button 24f.

The mark-OUT button 24f is a button for marking an OUT-point. The operator watches the video image displayed on the recorded video image 21a and clicks on the mark-OUT button 24f at the timing at which the desired image is displayed. Once the mark-OUT button 24f is displayed, clip image data (95 pixels by 60 pixels) corresponding to the video data displayed on the recorded video screen 21a is generated, and the generated clip image data is displayed in the OUT-clip display area 24d.

The picture effects set-up area 25 is an area which has setting tool buttons used for performing settings for various types of picture effects by inserting clip image data of the effect in a program, in the event that a replay program has been created following cut-editing by means of dragging and dropping event clip image data from the event display area 29 to the program display area 30 in the order of the program to be replayed. This picture effects set-up area 25 will be described in detail later.

The recycle box 26i is an area used for deleting the generated image data. In the event of deleting generated image data, the clip image data is specified using the mouse 2d, and then the specified clip image data is dragged and dropped on the recycle box 26i area, thereby executing the deletion. In the event of resurrecting the deleted clip image data, clicking on the recycle box 26i displays all of the clip image data discarded therein. Clicking on the clip image data therein which the operator wants to resurrect brings back the specified clip image data. Selecting the force-discard processing from the items displayed by clicking deletes the image data located in the recycle box 26i from memory, and that image data cannot be resurrected any more.

The replay video marking area 27 is an area to be used for marking IN-point or OUT-point clip image data from the video image displayed on the replay video screen 23a. This replay video marking area 27 is divided into an IN clip display area 27a, IN-point time-code display unit 27b, mark-IN button 27c, OUT clip display area 27d, OUT-point time-code display unit 27e, mark-OUT button 27f, and cancel buttons 27g and 27h.

The IN clip display area 27a is an area for displaying the clip image marked as an IN point by the operator clicking on the mark-IN button 27c. The clip image data displayed on the IN clip display area 27a are video signals obtained from the composite video signals V6 output from the picture effects device 6, which have been pruned so that the image size thereof is changed to 95 pixels by 60 pixels.

The time code of the clip image data that is being displayed on the IN clip display area 27a is displayed on the time-code display area 27b. This time code is the time code that the processor controller 12a of the second video processor 12 has extracted from the composite video signals V6 at the point of the operator marking the IN-point by clicking on the mark-IN button 27c.

The mark-IN button 27c is a button for marking an IN-point. The operator watches the video image displayed on the replay video image 23a and clicks on the mark-IN button 27c at the timing at which the desired image is displayed. Once the mark-IN button 27c is displayed, clip image data (95 pixels by 60 pixels) corresponding to the video data displayed on the recorded video screen 21a is generated, and the generated clip image data is displayed in the IN-clip display area 27a.

The OUT clip display area 27d is an area for displaying the clip image marked as an OUT point by the operator clicking on the mark-OUT button 27f. The clip image data displayed on the OUT clip display area 27d are video signals obtained from the composite video signals V2 output from the picture effects device 6, which have been pruned so that the image size thereof is changed to 95 pixels by 60 pixels.

The time code of the clip image data that is being displayed on the OUT clip display area 27d is displayed on the time-code display area 27e. This time code is the time code that the processor controller 12a of the second video processor 12 has extracted from the composite video signals V6 at the point of the operator marking the OUT-point by clicking on the mark-OUT button 27f.

The mark-OUT button 27f is a button for marking an OUT-point. The operator watches the video image displayed on the replay video image 23a and clicks on the mark-OUT button 27f at the timing at which the desired image is displayed. Once the mark-OUT button 27f is displayed, clip image data (95 pixels by 60 pixels) corresponding to the video data displayed on the recorded video screen 21a is generated, and the generated clip image data is displayed in the OUT-clip display area 27d.

Clicking the cancel button 27g cancels the IN-point corresponding with the clip image displayed on the IN clip display area 27a. Clicking the cancel button 27h cancels the OUT-point corresponding with the clip image displayed on the OUT clip display area 27d.

The name of a work file is displayed on the display portion 26a, and the name of the program file being displayed on the program display portion 30 is displayed on the display portion 26b when in the picture mode, while the name of the time-line file is displayed on the display portion 26b when in the time-line mode.

The variable-speed replay memory buttons 26c, 26e, and 26g are operated when setting the variable-speed replay speed, or when reading the set variable-speed replay speed. The display portions 26d, 26f, and 26h display the variable-speed replay speed set by the respective variable-speed replay memory buttons 26c, 26e, and 26g, to the left thereof. The display portion 26j displays the words, e.g., "VOICE OVER", in the event that the voice over editing mode is set, for example. The scratch-pad 26k is operated for setting the IN point or OUT point by inputting the time-code using the later-described set IN button 37, set OUT button 38, and set duration button 39.

The clip display area 28 is an area for displaying clip image data marked by successively clicking the mark IN button 24c or mark OUT button 24f provided to the recorded video marking area 24 (e.g., clicking on an IN-point two times in a row, or clicking on an OUT-point two times in a row), or displaying clip image data marked by successively clicking the mark IN button 27c or mark OUT button 27f provided to the replay video marking area 27 (e.g., clicking on an IN-point two times in a row, or clicking on an OUT-point two times in a row). The clip image data displayed on this clip display area 28 is clip image data not being used as an IN-point or OUT-point for an event. In the case that an IN-point and OUT-point are specified as a pair, the images in between comprise an event, and the clip image data specified as the IN-point or OUT-point of that section (event) is displayed on the event display area 29. The clip display area 28 has a clip image data display area 28a, time code display portion 28b, clip type display portion 28c, clip No. display portion 28d, clip title display portion 28g, a forward button 28e, and a back button 28f.

An image displayed on the IN clip display area 24a or the OUT clip display area 24d at the recording side, or the IN clip display area 27a or the OUT clip display area 27d at the replay side, is moved to and displayed on the clip image data display area 28a. The size thereof is 95 pixels by 60 pixels.

The time code of the clip image data displayed on the clip image data display area 28a is displayed on the time code display portion 28b. This time code consists of the contents of the time code display portions 24b, 24e, 27b, or 27e which correspond to the IN clip display area 24a, OUT clip display area 24d, IN clip display area 27a, or the OUT clip display area 27d, and are moved to be displayed on the time code display portion 28b in the same way that the contents of the areas 24a, 24d, 27a, or 27d are moved to be displayed on the clip image data display area 28a.

The clip type display portion 28c displays characters indicating which type of clip image data the clip image data displayed on the clip image data display area 28a is, i.e., IN-point or OUT-point. For example, in the event that the clip image data displayed on the clip image data display area 28a is clip image data obtained from the IN clip display area 24a, the letters "IN" are displayed in red. In the event that the clip image data displayed on the clip image data display area 28a is clip image data obtained from the OUT clip display area 24d, the letters "OUT" are displayed in red. On the other hand, in the event that the clip image data displayed on the clip image data display area 28a is clip image data obtained from the IN clip display area 27a, the letters "IN" are displayed in green. Further, in the event that the clip image data displayed on the clip image data display area 28a is clip image data obtained from the OUT clip display area 27d, the letters "OUT" are displayed in green.

The clip No. display portion 28d displays the clip No. of the clip image data displayed on the clip image data display area 28a. This clip No. is a number automatically appropriated to the clip image data in the order or marking. The title of the clipped data is displayed in the clip title display portion 28g.

The forward button 28e and back button 28f are buttons used for the sending the display of the clip image data on the clip display area 28 forward (to the right in FIG. 5) or backwards (to the left in FIG. 5). In the event that a great number of pieces of clip image data are generated, not all of the pieces of clip image data can be displayed simultaneously, since the size of the clip display area 28 is limited. In such a case, the user can display all of the pieces of clip image data on the monitor by clicking on the forward button 28e or back button 28f to send the clip image data forwards or backwards.

The event display area 29 is an area for displaying clip image data of an event generated by clicking the mark IN button 24c and the mark OUT button 24f provided to the recorded video marking area 24 in order or in reverse order (so as to form a pair), and for displaying clip image data of an event generated by clicking the mark IN button 27c and the mark OUT button 27f provided to the replay video marking area 27 in order or in reverse order (so as to form a pair). Either the clip image data for the IN point or the clip image data for the OUT point is displayed for an event. The event display area 29 has a clip image data display area 29a, time code display portion 29b, clip type display portion 29c, event No. display portion 29d, event title display portion 29g, a forward button 29e, and a back button 29f, in the same manner as the clip display area 28.

The event type display portion 29c displays characters indicating which type of clip. image data the clip image data displayed on the clip image data display area 29a is, i.e., IN-point or OUT-point. For example, in the event that the clip image data displayed is IN-point clip image data, the letters "IN" are displayed. In the event that the operator desired to display OUT-point clip image data instead of INpoint clip image data, clicking on this event type display portion 29c brings up the OUT-point clip image data. Then, each time the event type display portion 29c is clicked, the IN-point clip image data and the OUT-point clip image data are alternately displayed.

The event No. display portion 29d displays the event No. of the event generated. This event No. is a number automatically appropriated in the order of generating, and is completely unrelated to the clip No. The title of the event is displayed in the event title display portion 29g in character letters. This title can be registered by a menu, and each event can be registered separately.

The program display area 30 is an area used for copying events displayed in the event display area 29 and creating programs, and displays a copy of the clip image data of the event displayed in the event display area 29. In the case of re-arranging the order of events to create a program, first, the operator drags and drops a desired one of the pieces of clip image data displayed in the event display area 29 and copies is to the program display area 30. This allows for the operator to freely re-arrange the order of events displayed in the event display area 29 and to create a program. At this time, the events can be further freely re-arranged within the program display area 30, by dragging and dropping one of the pieces of clip image data displayed in the program display area 30 to another location within the program display area 30 again. In this case, the event is moved, not copied.

The program display area 30 has a clip image data display area 30a, time code display portion 30b, clip type display portion 30c, event No. display portion 30d, event title display portion 30g, a forward button 30e, and a back button 30f, in the same manner as the event display area 29. These are basically the same as those in the event display area 29; accordingly, description thereof will be omitted here.

However, there is a case in which effects clip image data is displayed within the program display area 30. In this case, shapes or characters representing the effects are displayed in the effects image data display area 30A, and the effect No. is displayed at the effects No. display portion 30D. Titles of the effects, such as PinP, Wipe, etc. are displayed in the effects title display portion 30G to the left side of the effects No. display portion 30D.

The time code of the position for inserting the effects is displayed in the time code display portion 30B to the lower right of the effects image data display area 30A.

The recording start/stop button 31a is a button for sending control commands to the hybrid recorder 3 and the picture effects device 6 for starting recording (in the event that recording is stopped) or ending recording (in the event that recording has started). Clicking on the recording start/stop button 31a when the recording operation is stopped causes the CPU 10 to detect that the recording start/stop button 31a has been pressed, and the CPU 10 issues a command to the external interface 18 to output a recording start command. The external interface 18 receives this command, and sends a recording start command (REC START command) stipulated by RS-422 to the hybrid recorder 3. The hybrid recorder 3 starts recording of the video signals V1 to hard disk and VTR, according to the received recording start command.

Conversely, clicking on the recording start/stop button 31a when the recording operation is running causes the CPU 10 to detect that the recording start/stop button 31a has been pressed, and the CPU 10 issues a command to the external interface 18 to output a recording stop command. The external interface 18 receives this command, and sends a recording stop command (REC STOP command) stipulated by RS-422 to the hybrid recorder 3. The hybrid recorder 3 stops recording of the video signals V1 to hard disk and VTR, according to the received recording stop command.

The preview button 32 is a button used for previewing (i.e., checking the contents) or selected events or programs. Specifying the event or program displays clip image data of the specified event or program on the replay video screen 23a as a still image. Clicking the preview button 32 in this state causes the CPU 10 to detect that the preview button 32 has been pressed, and the CPU 10 issues a command to the external interface 18 to output a replay start command. The external interface 18 receives this command, and sends a replay start command (PLAY START command) stipulated by RS-422 to the hybrid recorder 3 and the image effects device 6. The hybrid recorder 3 starts playing of the composite video signals V3 from the hard disk (or VTR), according to the received replay start command. The image effects device 6 generates composite video signals V6 by providing the composite video signals V3 with effects according to the command.

The new event button 33 is a button used for creating a new event. This new event button 33 is clicked in the. event of registering an event specified by the operator that has had the IN-point and OUT-point thereof changed, as a new event. The protect button 34 is operated for loop recording, to prevent data from being overwritten. The replace button 35 is used in the event of changing the IN-point and OUT-point of the selected event. The replace button 35 is clicked in the case that the event with the IN-point and OUT-point thereof changed is not to be registered as a new event, but to replace the specified event. The delete button is used to delete selected events or programs. The deleted events and programs are discarded into the recycle bin 26i.

The set-IN button 37 is operated in the event of setting the IN-point with numerical values, and the set-OUT button 38 is operated in the event of setting the OUT-point with numerical values. The set duration button is operated in the case of specifying the period from the IN-point with a numerical value so as to specify an OUT-point, or in the case of specifying the period from the OUT-point with a numerical value so as to specify an IN-point.

The VTR control button 31b is operated in the event of bringing up a pop-up display of the VTR control panel for controlling the VTR. The hard disk controller button 31c is operated in the event of bringing up a pop-up display of the hard disk control panel for controlling the hard disk. The dubbing button 31c is operated in the event of bringing up a pop-up display for the tape/disk dubbing settings control panel for performing dubbing between the VTR and hard disk.

<Time-line Mode>

Next, this section will describe the time-line mode. With the time-line mode, a graphic display such as shown in FIG. 6 is displayed on the monitor 2b. As shown in FIG. 6, the clip display area 28 and event display area 29 shown in FIG. 5 are replaced with a time-line display area 40. The event display area 29 is displayed in the position of the program display area in FIG. 5. Other displays are the same as the picture mode shown in FIG. 5.

Figure 7:
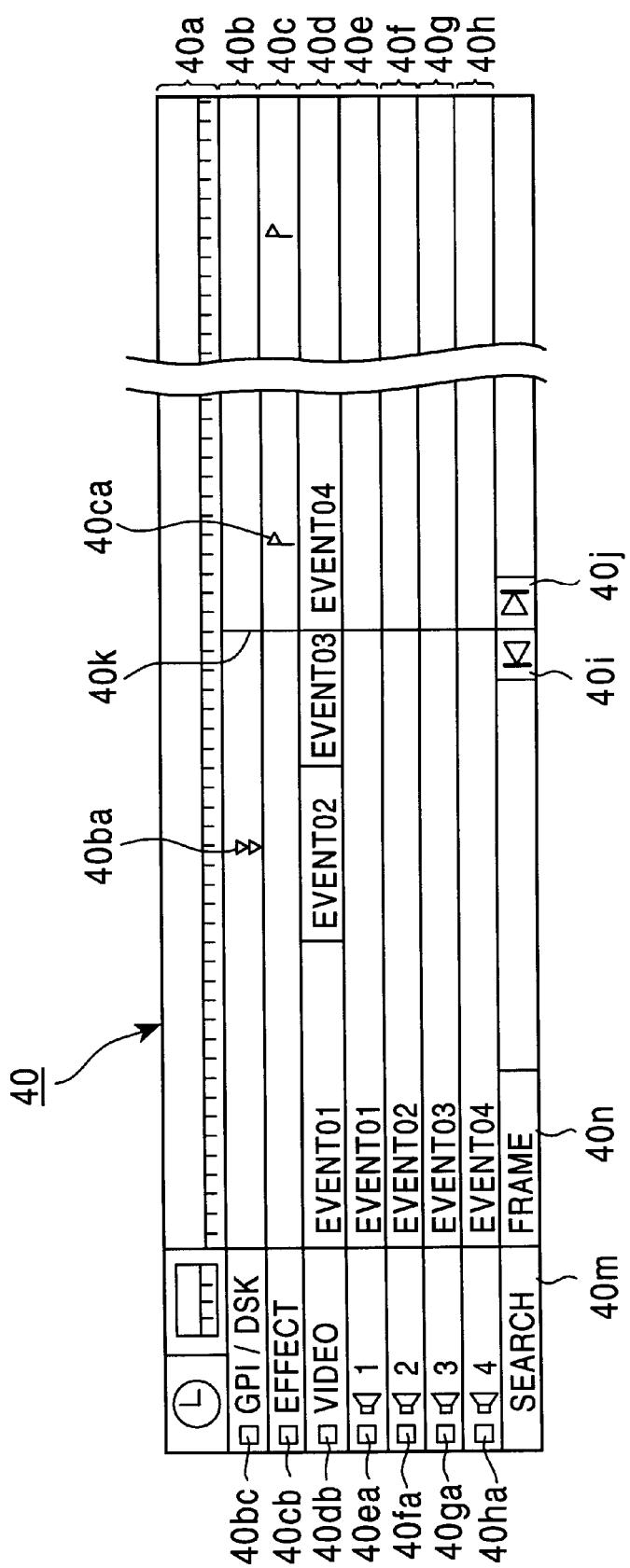
FIG. 7 is a diagram illustrating the configuration of the time-line display area.

The time-line display area 40 is a display area which allows the operator to edit a program while checking the time-wise length of each event. As shown in FIG. 7 in a partial enlargement, the time-line display area 40 has a time-scale display portion 40a, GPI/DSK track 40b, effects track 40c, video track 40d, first through fourth audio tracks 40e through 40h, scroll buttons 40i and 40j, a search button 40m, frame button 40n, and an edit bar 40k.

A time scale is displayed in the time-scale display portion 40a, so as to clearly indicate the time-size length of each event with the time scale serving as a standard reference. This time scale is a scale in increments of frames, and the minimal increment can be set by the user to an arbitrary number of frames.

The GPI/DSK track 40b is an area for specifying the output point of control commands for the GPI (General-Purpose Interface: a common-use interface for outputting control commands for an editing device to control an external device) or DSK. The output point for the GPI or DSK can be set at an arbitrary position, regardless of IN points or OUT points. The GPI can be set using the GPI setting buttons 46dn and 46dp (to be described later). A mark 40ba is displayed at the output point of the GPI or DSK, so the operator can easily recognize the position that he/she specified. Thus, specifying the output point of the GPI or DSK on the GPI/DSK track 40b allows control commands to be output at the specified point, thereby controlling external devices. Incidentally, clicking the GPI/DSK button 40bc makes the GPI or DSK output points specified on the GPI/DSK track 40b valid.

A mark 40ca is displayed at a position on the effects track 40c to which an effect has been set. Thus, the operator can easily recognize the position that he/she specified for effects. Clicking the GPI/DSK button 40bc makes the GPI or DSK output points specified on the GPI/DSK track 40b valid. Clicking the effects button 40cb makes the effects specified on the effects track 40c valid.

The video track 40d is an area for editing the program by re-arranging events dragged from the event display area 29 and so forth. The events displayed on this video track 40d are events dragged from the event display area 29, or events arrayed on the program display area 30 in the picture mode, having been called by the program call button 42b (FIG. 6) of the program view area 42, to be described later.

Also, with the video track 40*d,* clip image data from the IN-points and OUT-points is not displayed as with the picture mode; rather, the event No. and the title given to that event are displayed. However, the size of the display area of each event differs depending on the length thereof, so the length of the event can be compared with the time scale of the time scale display portion 40*a* and thus visually confirmed. Also, the fact that the length of each event can be visually confirmed means that the overall length of the edited program can be visually confirmed as well. Accordingly, the operator can easily tell whether the edited program fits within a certain length.

Also, in the video track 40*d,* the events can be moved to arbitrary positions, and arbitrary events can be inserted into other events, so the events can be arbitrarily re-arranged to produce the desired program. Incidentally, in the event that events are moved or inserted, the connecting portions thereof are joined so there are no gaps in between.

The destination of movement or insertion is specified by the edit bar 40*k* which is the reference position mark. This edit bar 40*k* is fixedly displayed generally at the center position of the screen, so in the event that the destination of movement or insertion is to be specified, the event display is scrolled by operating the scrolling buttons 40*i* and 40*j* so that the edit bar 40*k* lines up with a candidate for moving or insertion. The destination of movement or insertion is thus specified.

Incidentally, in the event of performing operation on the video track 40*d,* clicking the video button 40*db* places the video track 40*d* in an operable state.

The first through fourth audio tracks 40*e* through 40*h* are areas for editing the audio data for the events. In the case of reading audio data into the first through fourth audio tracks 40*e* through 40*h,* the audio buttons 40*ea* through 40*ha* are clicked, and events are dragged from the event display area 29, thereby reading audio data corresponding to that data. Incidentally, an event No. and the title given to that event are displayed for the read audio data.

Regarding the first through fourth audio tracks 40*e* through 40*h,* the audio data for each event can be arbitrarily moved as with the video track 40*d,* and arbitrary audio data can be inserted into audio data of another event. In the event that a candidate position for destination of movement or insertion is to be specified, the audio data is scrolled by operating the scrolling buttons 40*i* and 40*j* as with the case of the video editing, so that the edit bar 40*k* lines up with a candidate for moving or insertion.

Incidentally, a total of four channels of audio data can be edited by means of the first through fourth audio tracks 40*e* through 40*h.*

The scrolling buttons 40*i* and 40*j* are buttons for scrolling the section between the GPI/DSK track 40*b* to the fourth audio track 40*h* in its entirety to the right or the left in increments of scrolls. Clicking on of the scrolling buttons 40*i* and 40*j* in the direction to which the operator wants to go executes scrolling in that direction.

The search button 40*m* is for displaying and confirming on the replay video screen 23*a* an image within an event selected on the time line display area 40 or an image at the connection portion between events. The scroll increment display portion 40*n* displays the increments used when clicking on the scrolling buttons 40*i* and 40*j* and scrolling. The operator can clock on this display portion 40*n* and change the display to any of the following: Frame, Second, Minute, Event, or Top/End. In the event that Top/End is selected, the event is scrolled to the very top or end whenever the scrolling buttons 40*i* or 40*j* are clicked.

As shown in FIG. 6, a display portion 45*a* displaying the overall length of the time-line (i.e., the number of frames) is displayed to the right side of the time-line display area 40, and a preview button 45*b* which is operated when commanding a preview is provided below. Further below that is four channels worth of buttons 45*c* for specifying voice-over.

The edit tool display portion 46*d* displayed below the time-line display area 40 has command buttons for giving commands used for program editing in the time-line display area 40. The event lock button 46*da* is used for simultaneously moving a plurality of tracks for a single event; the buttons for the tracks are first clicked, and then the event lock button 46*da* is clicked. Thus, the selected tracks are linked and can be dragged together. The event moving button 46*db* is clicked in the case of batch moving of the section of events from the event currently selected through the end event. The match-cut button 46*dc* is clicked in the event of splitting events at the position of the edit bar 40*k*. This button is used for purposes such as deleting part of an event. The undo button 46*dd* is operated when canceling operations such as moving editing, deleting, etc.

In the case of clicking the overlay editing button 46*de,* dragging an event from the event display area 29 onto the time-line display area 40 matches the IN-point thereof to the position of the edit bar 40*k* and inserts the event on the time line. In the case that an event is dragged from the event display area 29 onto the time-line display area 40 after clicking the back-time overlay editing button, the OUT-point of the event is matched to the position of the edit bar 40*k* and the event is inserted on the time line. In the case that an event is dragged from the event display area 29 onto the time-line display area 40 after clicking the insert editing button, the IN-point of the event is matched to the position of the edit bar 40*k* and the event is inserted on the time line.

In the event that the overlay editing button 46*de* is operated, and there is already an event at the insertion position on the time line, the event is overwritten, but in the event that this insert editing button 46*dg* is operated, and there is already an event at the insertion position on the time line, the event is split to the right and left with the new event at the center. Clicking the delete button 46*dh* after selecting an event on the time-line allows deletion of the selected event. In the event that the event to be deleted is locked, the multiple locked events are batch-deleted.

The ripple tool button 46*di* is clicked in the event that the operator desires to slide all events following an insertion position or deletion position after an event has been inserted to or deleted from the time-line. The trim tool button 46*dj* is clicked to change the duration of the entire program in the event that the IN or OUT points of an event have been corrected, in accordance with the amount of correction. In the event that the IN-point has been corrected, the OUT-point remains fixed, and the event to the left of the IN-point is moved in the direction of correction. In the same way, in the event that the OUT-point has been corrected, the IN-point remains fixed, and the event to the left of the OUT-point is moved in the direction of correction.

The slide tool button 46*dk* is clicked in the event of changing the IN-point or OUT-point of the time-line and sliding the IN-points of the subsequent events by the same amount. In the event that the IN-point of a selected event is changed and the duration of the event is shortened as a result thereof, The IN-point of the following event slides so that the duration of the following event is extended. The slip tool button 46*dm* is clicked in the event of correcting the IN-point and OUT-point without changing the duration of the event. In the event that one of the IN-point and OUT-point is corrected, the other moves in the same direction, thereby maintaining the duration of the event at a constant.

The GPI buttons 46*dn* and 46*dp* are operated in the case of setting two types (systems) of GPI output points set from the menu.

The display portion 46*e* displays the number of frames comprising one notch on the time-scale displayed on the time-scale display portion 40*a*. This display can be increased or decreased by clocking the + (plus) button 46*fb* or the − (minus) button 46*fa*.

The point preview button 46*ga* is clicked in the event that the operator wishes to view the connection between an event selected on the time-line display area 40 and the event before it. The loop button 46*gb* is clicked in the event that the user desires to repeatedly preview the time-line program.

Next, description will be made regarding the program view area displayed toward the bottom of the time-line display area 40. In the time-line display area 40, the length of the display area of the events is changed basically according to the length of each event, so that the operator can easily visually understand the length of each event. However, clip image data for the events is not displayed, so there is the likelihood that the operator may not be able to tell what sort of image each event is. Accordingly, in the case of the editing system 1, a program view area 42 is provided, so that the operator can tell what sort of image each event is, even in the time-line mode.

The program view area 42 has a view area 42*a*, program call button 42*b*, forward button 42*c*, and back button 42*d*. The view area 42*a* is an area for displaying the clip image data for the IN-point or OUT-point of each event. The order that the clip image data is displayed in this view area 42*a* agrees with the order of the events in the program created in the time-line display area 40. Thus, the order of events in the program created in the time-line display area 40 can be easily confirmed with clip image data, allowing the operator to tell what sort of images are lined up for the program. Incidentally, the clip image data displayed in the view area 42*a* is image data generated by pruning the clip image data in the event display area 29, and the image size thereof is approximately half the size of the clip image data displayed in the event display area 29.

The program call button 42*b* is a button used for making input of a program call command for calling an event displayed on the display area 30 in the picture mode to the time-line display area 40 and the view area 42*a*. Clicking on the program call button 42*b* commands the program to be called, and the event displayed in the program display area 30 can be called to the time-line display area 40 without changing the order of events. In the same manner, the clip image data is called to the view area 42*a* with the same order of events as shown in the program display area 30, and displayed. By means of providing such a program call button 42*b* and enabling calling of programs, programs generated in another mode (picture mode) can be easily called into the time-line mode, and time-matching editing can be easily carried out even for programs generated in another mode.

The forward button 42*c* and back button 42*d* are buttons used for the sending the display of the clip image data in the view area 42*a* forward or backwards. In the event that the created program has a great number of pieces of clip image data, not all of the pieces of clip image data can be displayed in the view area 42*a* simultaneously. In such a case, the user can display all of the pieces of clip image data by clicking on the forward button 42*c* or back button 42*d* to send the clip image data forwards or backwards.

<Management Method for Clip Image Data>

Next, description will be made regarding the storage method for the clip data, event data, and program data. It should be noted here, though, that the term "clip data" as used here includes data for displaying clip image data in the clip display area 28 and data for storing the clip image data. This holds true for the event data and program data, as well.

First, with reference to FIG. 8, description will be made regarding the first management record data for clip data, event data, program data, effect data and DSK data. One set of first management record data is prepared separately each for clip data, event data, program data, effect data, and DSK data. In other words, the first management record data for clip data is data for managing all clip image data displayed within the clip display area 28. Also, the first management record data for event data is data for managing all clip image data displayed within the event display area 29. Further, the first management record data for program data is data for managing all clip image data displayed within the program display area 30. The first management record data for effects data or DSK data is data for managing all clip image data displayed within the program display area 30. In the present embodiment, the first management record data consists of one each of first management record data for clip data, event data, program data, effect data or DSK data.

The first management record data has data regarding pointers linked before, pointers linked behind, the horizontal display size for one page, the vertical display size for one page, the display position on the screen, leading display position, and total number of links.

The term "pointers linked before" means data for indicating a pointer of management record data linked to before this first management record data. In the event that there is no management record data linked to before, the pointer of this management record data is stored here. The term "pointers linked behind" means data for indicating a pointer of management record data linked to behind this first management record data. In the event that there is no management record data linked to behind, the pointer of this management record data is stored here.

The term "horizontal display size for one page" means data indicating the maximum number of pieces of clip image data displayed in the horizontal direction on each of the following display areas: the clip display area 28, event display area 29, and program display area 30. In the present embodiment, the clip display area 28, event display area 29, and program display area 30 can each display ten pieces of clip image data, so data indicating "ten pieces" as the "horizontal display size for one page" is stored in the first management record data for each.

The term "vertical display size for one page" means data indicating the maximum number of pieces of clip image data displayed in the vertical direction on each of the following display areas: the clip display area 28, event display area 29, and program display area 30. In the present embodiment, the clip display area 28, event display area 29, and program display area 30 can each only display one piece of clip image data, so data indicating "one piece" as the "vertical display size for one page" is stored in the first management record data for each.

The "display position on the screen" is data indicating at which display area the clip image data is displayed. In the present embodiment, the following are provided: the clip display area 28 at the bottom tier of the screen, the event display area 29 at the middle tier of the screen, and the program display area 30 at the top tier of the screen. Accordingly, data indicating "bottom tier" is stored for the first management record data for clip data, data indicating "middle tier" is stored for the first management record data for event data, and data indicating "top tier" is stored for the first management record data for program data.

The term "leading display position" means data for indicating from what position in the areas of the clip display area 28, event display area 29, and program display area 30, that display of the clip image data is to be started. In the present embodiment, ten pieces of clip image data are displayed in the clip display area 28, ten pieces in the event display area 29, and ten pieces in the program display area 30, so a total of thirty pieces of clip image data can be displayed. This sequentially appropriates Nos. to all thirty display positions from the top tier on the screen on down, thereby managing the display positions.

For example, the display positions of the program display area 30 are "1" through "10", the display positions of the event display area 29 are "11" through "20, and the display positions of the clip display area 28 are "21" through "30". Accordingly, in the event that the data is first management record data for clip data, data indicating "21" is stored as the leading display position, in the event that the data is first management record data for event data, data indicating "11" is stored as the leading display position, and in the event that the data is first management record data for program data, data indicating "1" is stored as the leading display position.

The total number of links is data indicating the total number of pieces of management record data linked to behind the first management record data.

Next, with reference to FIG. 9, description will be made regarding the second management record data for clip data. This second management record data for clip data is data for managing each piece of clip image data displayed in the clip display area 28 individually. Accordingly, there are as many pieces of second management record data as there are pieces of clip image data.

The second management record data for clip data has data regarding pointers linked before, pointers linked behind, attributes, clip image data handle, time code data, and index Nos. of clip image data.

The term "pointers linked before" means data for indicating a pointer of management record data linked to before this second management record data. There is always a first management record data or second management record data before, so a pointer linked to before is stored here in all cases. The term "pointers linked behind" means data for indicating a pointer of management record data linked to behind this second management record data. In the event that there is no management record data linked to behind, the pointer of this management record data is stored here.

"Attributes" consists of data indicating whether the second management record data is for clip data, event data, or program data. The "clip image data handle" is data indicating an address at which the clip image data is stored (an address on the hard disk of the hybrid recorder 3). Accordingly, the address at which the clip image data is stored can be obtained by making reference to the clip image data handle within the second management record data corresponding to the desired clip image data. "Clip type" is data indicating whether the clip image data being managed by the second management record data is IN-point clip image data or OUT-point clip image data.

"Time code data" is data indicating the time code of the clip image data being managed by the second management record data. The term "index Nos. of clip image data" means index Nos. appropriated to the clip image data. The index Nos. are numbers sequentially appropriated to all pieces of marked clip image data, regardless of IN-point, OUT-point, or event generation. That is, the index No. is the same number as the clip No. displayed in the clip No. display portion 28*d*. All pieces of clip image data are managed by this index No.

Next, with reference to FIG. 10, description will be made regarding the second management record data for event data and program data. The second management record data for event data is data for managing each piece of clip image data displayed in the event display area 29 individually. Accordingly, there are as many pieces of second management record data for event data as there are pieces of clip image data displayed in the event display area 29. In the same way, the second management record data for program data is data for managing each piece of clip image data displayed in the program display area 30 individually. Accordingly, there are as many pieces of second management record data for program data as there are pieces of clip image data displayed in the program display area 30.

The second management record data for event data and program data has data regarding pointers linked before, pointers linked behind, attributes, event No., title, sub-title, IN-point clip image data handle, IN-point clip type, IN-point time code data, index No. for IN-point clip image data, OUT-point clip image data handle, OUT-point clip type, OUT-point time code data, index No. for OUT-point clip image data, slow type, symbol type, and symbol time code data.

The pointers linked before, pointers linked behind, and attributes are the same as those described above in conjunction with the second management record data for clip data, so description here will be omitted. The "event No." is a number appropriated to events in the order that they are generated. This event No. is displayed in the event No. display portion 29*d*. The "title" and "sub-title" are a title and sub-title provided to the registered event beforehand, and is stored in actual characters. Of these, the title is displayed in the title display portion 29*g*.

The "IN-point clip image data handle" is data indicating an address at which the IN-point clip image data is stored. Accordingly, the address at which the IN-point clip image data is stored can be obtained by making reference to the IN-point clip image data handle within the second management record data corresponding to the desired clip image data. "IN-point clip type" is data indicating whether the IN-point clip image data being managed by the second management record data is IN-point clip image data or OUT-point clip image data. Here, all data is IN-point clip image data, so data indicating "IN-point" is stored here.

"IN-point time code data" is data indicating the time code of the IN-point clip image data being managed by the second management record data. The term "index No. of IN-point clip image data" means index Nos. appropriated to the IN-point clip image data. As with the above-described index Nos. within the second management record data for clip data, the IN-point index Nos. are numbers sequentially appropriated to all pieces of marked clip image data, regardless of IN-point, OUT-point, or event generation.

The "OUT-point clip image data handle" is data indicating an address at which the OUT-point clip image data is stored. Accordingly, the address at which the OUT-point clip image data is stored can be obtained by making reference to the OUT-point clip image data handle within the second management record data corresponding to the desired clip image data. "OUT-point clip type" is data indicating whether the OUT-point clip image data being managed by the second management record data is IN-point clip image data or OUT-point clip image data. Here, all data is OUT-point clip image data, so data indicating "OUT-point" is stored here.

"OUT-point time code data" is data indicating the time code of the OUT-point clip image data being managed by the second management record data. The term "index No. of OUT-point clip image data" means index Nos. appropriated to the OUT-point clip image data. As with the above-described index Nos. within the second management record data for clip data, the OUT-point index Nos. are numbers sequentially appropriated to all pieces of marked clip image data, regardless of IN-point, OUT-point, or event generation.

"Slow type" is data indicating whether the replay speed of the event or program being managed by the second management record data is being subjected to control by the replay speed setting area 25A (later described with reference to FIG. 19), or whether the replay speed is normal. "Symbol type" is data indicating whether or not clip image data defined as a symbol exists in the period between the IN-point and OUT-point of event being managed by the second management record data. The term "symbol" here means clip image data representative of that event. The "symbol time code data" is the time code of the clip image data set as a symbol.

FIG. 11 represents the configuration of the second management record data for effects. The second management record data for effects has data regarding pointers linked before, pointers linked behind, attributes, effect picture selection data, effect type, effect No., effect direction, effect time, border specification, border width, background color valid flag, background color, X-position coordinates, Y-position coordinates, z-position coordinates, auxiliary parameters for effects, fader position, and resetting available flag.

The pointers linked before, pointers linked behind, and attributes are the same as those described above in conjunction with the second management record data for event data and program data in FIG. 10, so description here will be omitted. The attribute here shows that the second management record data is for effects. The first nine bytes of data from the head to this position have the same configuration as the second management record data for clip data as shown in FIG. 9, and the second management record data for event data and program data as shown in FIG. 10. Accordingly, even in the event that a new data structure is introduced, the management method does not need to be changed, and the system can handle the addition.

The "effect picture selection data" represents the address of memory storing subsequent data. The "effect type" represents the type (category) of effects patterns, such as picture-in-picture or wipe. The "effect No." is displayed in the effect No. display portion 30D. The "effect direction" indicates whether the direction in which the effect is applied is forward time-wise, or backwards. The "effect time" represents the time (transition) for application of the effects. "Border specification" represents specification of whether or not a border is applied, and "border width" represents the width of the border.

The "background color valid flag" represents whether or not a background color has been specified. The "background color" is the specification of the background color. The "X-position coordinates", "Y-position coordinates", and "Z-position coordinates" respectively indicate the positional coordinates for applying the effects.

The "auxiliary parameters for effects" represents maintaining unique parameters when setting the various effect patterns. The "fader position" represents the fader value (amount of change of effects), and the "resetting available flag" represents whether or not resetting can be made in the program line.

FIG. 12 represents the configuration of the second management record data for DSK data. This data has pointers linked before, pointers linked behind, attributes, effect picture selection data, effect time, fader position, fader inversion valid flag, border specification, border type, border color, key inversion specification, clip value, gain value, mask specification, mask inversion specification, rectangular mask area, and solid flag.

The pointers linked before and pointers linked behind are the same as those described above. The attribute here shows that the second management record data is for DSK data. The first nine bytes of data from the head have the same configuration as the second management record data shown in FIGS. 9 through 11, so even in the event that a new data structure is introduced, the management method does not need to be changed, and the system can handle the addition.

The "effect picture selection data" represents the address of memory storing subsequent data. The "effect time" represents the DSK transition time. The "fader position" represents the fader time (amount of change of effects). The "fader inversion valid flag" represents whether or not to automatically invert the direction of transition during the next DSK execution.

"Border specification" represents specification of the border (frame). The "border type" specifies the type of border. The "border color" specifies the color of the border. "Key inversion specification" specifies whether or not to use key data in an inverted manner. The "clip value" specifies the clip value. The "gain value" specifies the gain value. "Mask specification" specifies whether or not there is mask specification. "Mask inversion specification" specifies whether mask inversion is valid or invalid. The "rectangular mask area" holds the coordinates for the rectangular mask area, and "solid flag" specifies selection of the fill signal.

Next, a specific example will be given with reference to FIGS. 13 through 17 to describe how clip image data is managed using the first management record data and second management record data. First, the line titled MARKING in FIG. 13 indicates whether marking has been performed as IN marking or OUT marking. Here, this shows that marking has been performed 12 times, in the order of IN, IN, OUT, IN, IN, IN, OUT, IN, OUT, IN, IN, OUT, from the left. The line titled INDEX NO. shows the index No. given to the clip image data at the IN-point or OUT-point of marking. The index Nos. are numbers sequentially appropriated to all pieces of marked clip image data, regardless of IN-point or OUT-point. Accordingly, as shown in FIG. 13, index Nos. "1" through "12" are sequentially appropriated to the marked pieces of clip image data.

The line titled CLIP NO. shows the clip No. displayed in the clip No. display area 28d of the clip display area 28. Incidentally, the clip No. displayed in the clip No. display area 28d is the same No. as the index No. The line titled EVENT NO. shows the event No. displayed in the event No. display area 29d of the event display area 29. This event No. is a number automatically appropriated in the order of generating events, and is completely unrelated to the index No. or clip No.

FIG. 14 is a diagram illustrating which clip image data is displayed in the clip display area 28, event display area 29, and program display area 30, in the event that marking has been performed as shown in FIG. 13. The clip display area 28 displays clip image data with the index No. "1", clip image data with the index No. "4", clip image data with the index No. "5", and clip image data with the index No. "10", in that order.

The event display area 29 displays four created events. That is, IN-point clip image data with the index No. "2" is displayed as the event with the event No. "1", IN-point clip image data with the index No. "6" is displayed as the event with the event No. "2", IN-point clip image data with the index No. "8" is displayed as the event with the event No. "3", and IN-point clip image data with the index No. "11" is displayed as the event with the event No. "4", in that order. The OUT-point clip image data for each event (clip image data with the index No. "3", clip image data with the index No. "7", clip image data with the index No. "9", and clip image data with the index No. "12") are not displayed, since the corresponding IN-point clip image data is displayed.

Simply specifying the IN-point and OUT-point does not display the clip image data on the program display area 30. In this example, the four events displayed in the event display area 29 are re-arranged, and a program such as described in FIG. 14 is created. The program is a continuous program in the order or the event with the event No. "2", the event with the event No. "1", and the event with the event No. "3". Accordingly, the program display area 30 displays the clip image data with the index No. "6" which has been registered as the event with the event No. "2", the clip image data with the index No. "2" which has been registered as the event with the event No. "1", and the clip image data with the index No. "8" which has been registered as the event with the event No. "3".

However, in this case, clip image data for the "wipe" effect has been inserted between the event with the event No. "2" and the event with the event No. "1". Further, clip image data for the "wipe" effect has been inserted between the event with the event No. "1" and the event with the event No. "3", as well. Insertion of the clip image data for the "wipe" effect is performed by dragging and dropping the desired effect from the picture effects set-up area 25. Details thereof will be described later with reference to FIG. 34.

Figure 15:
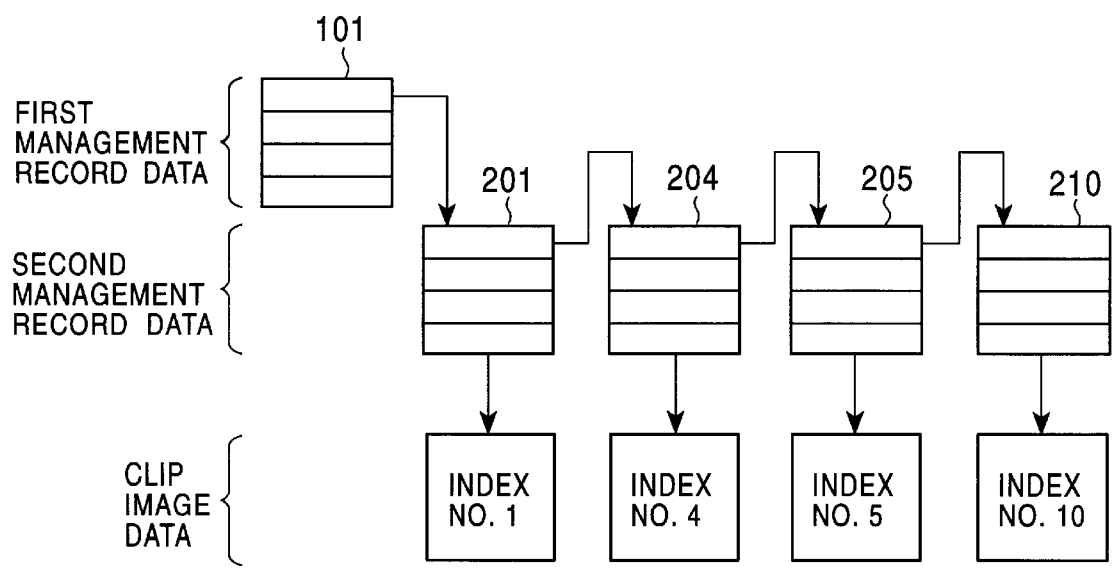
FIG. 15 is a diagram describing the method for managing the clip display area.
Figure 16:
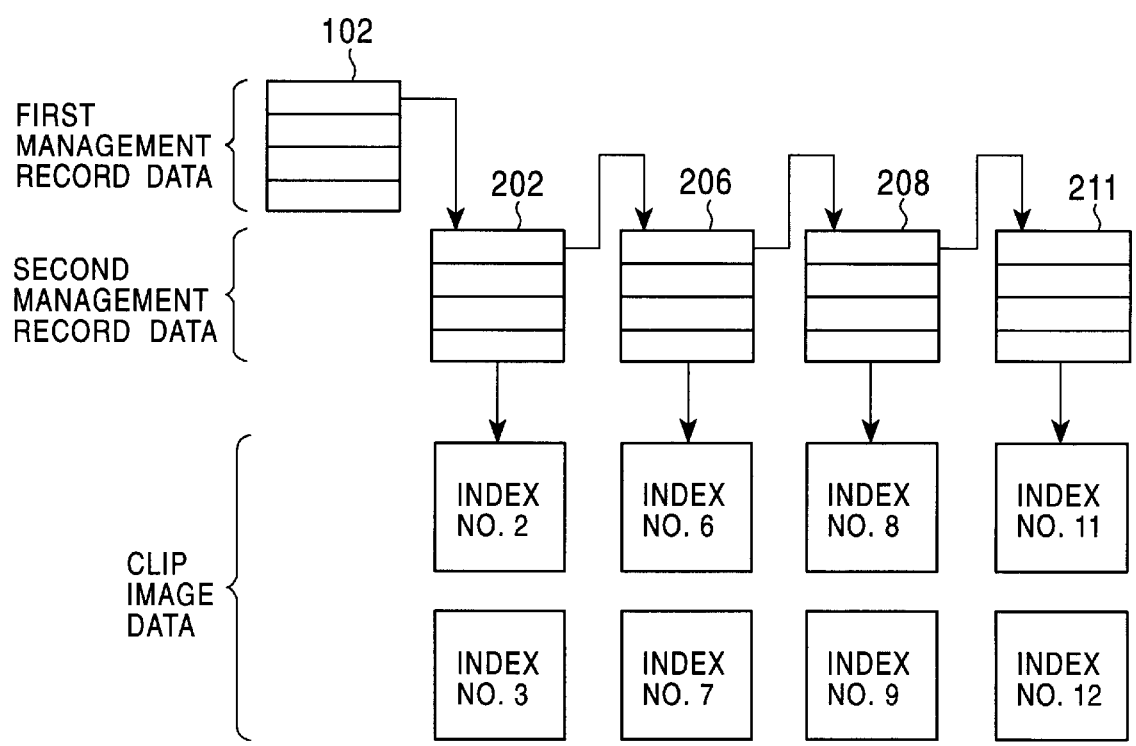
FIG. 16 is a diagram describing the method for managing the event display area.
Figure 17:
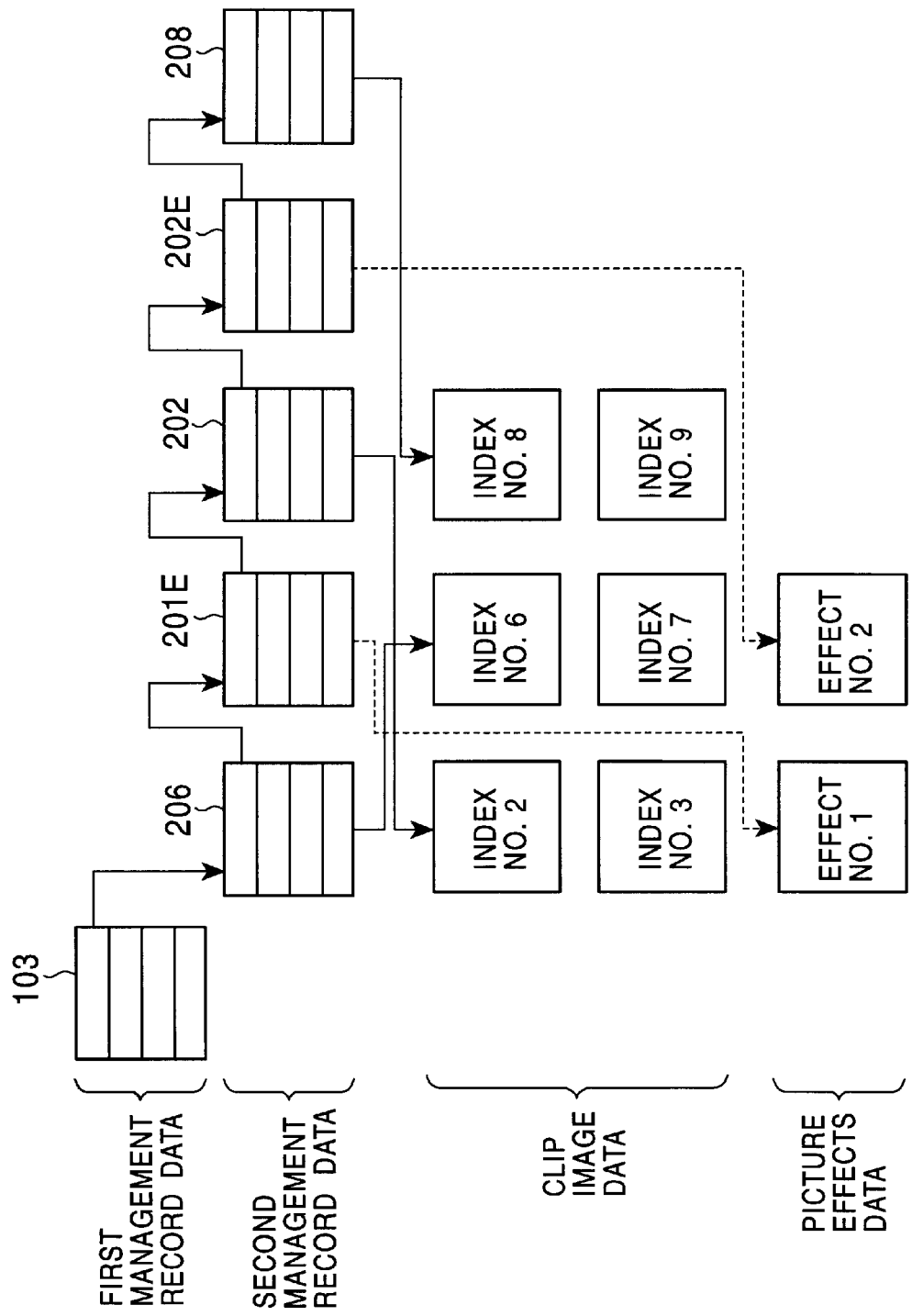
FIG. 17 is a diagram describing the method for managing the program display area.

FIGS. 15 through 17 a diagram illustrating how clip image data is managed by the first management record data and the second management record data.

FIG. 15 shows how the clip image data displayed in the clip display area 28 is managed. The management record data 101 is the first management record data for clip data. As shown in FIG. 8, this first management record data for clip data 101 has data for managing the entire area of the clip display area 28 and the positions of the clip image data displayed in the clip display area 28.

The second management record data 201 linked behind the first management record data 101 is a second management record data for clip data. This second management record data 201 is data for managing the clip image data with the index No. "1". As shown in FIG. 9, the second management record data 201 has a clip image data handle indicating the address at which the clip image data with the index No. "1" is stored.

The management record data 204 linked behind the second management record data 201 is second management record data for clip data. This second management record data 204 is data for managing the clip image data with the index No. "4", and has a clip image data handle indicating the address at which the clip image data with the index No. "4" is stored.

Further, second management record data 205 for managing the clip image data with the index No. "5" is linked behind the second management record data 204, and second management record data 210 for managing the clip image data with the index No. "10" is linked behind the second management record data 205.

FIG. 16 shows how the clip image data displayed in the event display area 29 is managed. The management record data 102 is first management record data for event data. As shown in FIG. 8, this first management record data for event data 102 has data for managing the entire area of the event display area 29 and the positions of the clip image data displayed in the event display area 29.

The second management record data 202 linked behind the first management record data 102 is second management record data for event data. As shown in FIG. 10, this second management record data 202 has data for managing the IN-point clip image data indicated by the index No. "2" and OUT-point clip image data indicated by the index No. "3". Specifically, this second management record data 202 has an IN-point clip image data handle for indicating the address at which the IN-point clip image data indicated by the index No. "2" is stored, and an OUT-point clip image data handle fdr indicating the address at which the OUT-point clip image data indicated by the index No. "3" is stored.

In the same manner, linked behind the second management record data 202 is second management record data 206 for managing the IN-point clip image data with the index No. "6" and the OUT-point clip image data with the index No. "7", linked behind the second management record data 206 is second management record data 208 for managing the IN-point clip image data with the index No. "8" and the OUT-point clip image data with the index No. "9", and linked behind the second management record data 208 is second management record data 211 for managing the IN-point clip image data with the index No. "11" and the OUT-point clip image data with the index No. "12".

FIG. 17 shows how the clip image data displayed in the program display area 30 is managed. The management record data 103 is first management record data for program data. As. shown in FIG. 8, this first management record data for program data 103 has data for managing the entire area of the program display area 30 and the positions of the clip image data displayed in the event display area 30.

Linked behind the first management record data for program data 103 is second management record data 206 for managing the event with the No. "2" that is comprised of the IN-point clip image data with the index No. "6" and the OUT-point clip image data with the index No. "7", and linked behind the second management record data 206 is second management record data 201E for managing effects with the effects No. "1". AS shown in FIG. 11, this second management record data 206 has data for managing the effects data represented by the effects No. "1". Linked behind the second management record data 201E is second management record data 202 for managing the event with the No. "1" that is comprised of the IN-point clip image data with the index No. "2" and the OUT-point clip image data with the index No. "3", and linked behind the second management record data 202 is second management record data 202E for managing effects with the effects No. "2". Then, linked behind the second management record data 202E is second management record data 208 for managing the event with the No. "3" that is comprised of the IN-point clip image data with the index No. "8" and the OUT-point clip image data with the index No. "9".

Now, let us compare FIG. 16 which illustrates management of the event data, and FIG. 17 which illustrates management of the program data. The order of the clip image data with the index No. "2", the clip image data with the index No. "6", and the clip image data with the index No. "8", is exactly the same in FIG. 16 and FIG. 17, except for the fact that effects have been inserted. This means that the storage position of the clip data has not been changed at all. What is different between FIG. 16 and FIG. 17 is that the order of linking the sets of second management record data has been changed. In other words, with the editing system 1, when changing the order in which events are displayed, the storage positions of the clip image data representing the events are not changed; rather, the order of the links of the second management record data directly managing the clip image data is changed. Thus, this editing system 1 can obtain extraordinary effects in that the display order of events can be changed very fast.

Further, this is not limited to changing the display order of events; this holds true regarding display order of clip image data displayed in the clip display area 28, as well. For example, even in the event that the display order of clip image data is changed due to clip image data being deleted or newly added, the storage positions of the clip image data are not actually changed; rather, the link information of the second management record data (i.e., the pointer portions point to the data ahead and behind) is simply altered to change the link order, thereby easily changing the order of display.

This holds true for effects, as well. That is, in the case of this example, picture effects data (effects data) is handled in the same manner as clip image data (accordingly, the picture effects data is also referred to as "effects setting clip image data"). Consequently, change in the order or deletion thereof is processed simply by changing the link order of the corresponding second management record data. Thus, effects can be processed very fast.

Next, the marking operations for the first marking through the twelfth marking will be described in detail, with reference to the action of each circuit block. First, before starting the marking, the first management record data 101 for clip data, the first management record data 102 for event data, and the first management record data 103 for program data have already been generated at the leading address of the area for storing work data which has been secured in the RAM 10*b*. At this point however, none of the sets of first management record data have links to second management record data, so the "pointers to data linked to behind" store their own address.

[First Marking (IN-point)]

When the first marking is performed, a 95 pixel by 60 pixel clip image data is formed by controlling the readout from the frame memory 11*c*. The clip image data thus formed is stored in the empty area of the RAM 10*b* as clip image data with the index No. "1". At the same time as this storing action, clip image data thus formed is displayed on the IN-clip display area 24*a*. The second management record data 201 for managing the clip image data at this time is temporarily stored in the register in the CPU 10, and is not stored in the RAM 10*b*. The reason for this is: at this point, it is still unclear to which management record data that the second management record data will link.

[Second Marking (IN-point)]

When the second marking is performed, clip image data with the index No. "2" is formed in the same manner, and stored in the empty area in the RAM 10*b*. In this case, two consecutive IN-points have been stored, so the clip image data with the index No. "1" displayed in the IN-clip display area 24*a* is not used as an event. Accordingly, the clip image data with the index No. "1" displayed in the IN-clip display area 24*a* is moved to the clip display area 28. Also, as a result of this second marking, it is determined that the second management record data 201 which manages the clip image data with the index No. "1" links to the first management record data 101 for clip data. Consequently, as shown in FIG. 15, the second management record data 201 temporarily stored in the register of the CPU 10 is stored in the RAM 10*b* as having been linked to the first management record data 101.

On the other hand, the clip image data with the index No. "2" generated by this second marking is newly displayed on the IN-clip display area 24*a* instead of the clip image data with the index No. "1". As with the case of the first marking, the second management record data 202 managing the clip image data with the index No. "2" is temporarily stored in the register within the CPU 10.

[Third Marking (OUT-point)]

When the third marking is performed, clip image data with the index No. "3" is formed in the same manner, and stored in the empty area in the RAM 10*b*. This third marking is for an OUT-point, so an event is formed wherein the clip image data with the index No. "2" serves as the IN-point and the clip image data with the index No. "3" serves as the OUT-point. Accordingly, the clip image data with the index No. "2" which is displayed on the IN-clip display area 24*a* is copied to the event display area 29, while remaining displayed on the IN-clip display area 24*a*. Also, as a result of this third marking, it is determined that the second management record data 202 which manages the clip image data with the index No. "2" links to the first management record data 102 for event data. Consequently, as shown in FIG. 16, the second management record data 202 temporarily stored in the register of the CPU 10 is stored in the RAM 10*b* as having been linked to the first management record data 102.

On the other hand, the clip image data with the index No. "3" generated by this third marking is newly displayed on the OUT-clip display area 24*d*. It has been determined that the second management record data 202 which manages the clip image data with the index No. "3" links to the first management record data 102, and thus is not stored in the register within the CPU 10.

[Fourth Marking (IN-point)]

When the fourth marking is performed, clip image data with the index No. "4" is formed in the same manner, and stored in the empty area in the RAM 10*b*. At the same time as this storing action, clip image data thus formed is displayed on the IN-clip display area 24*a*. Also, in the same manner as the first marking, the second management record data 204 for managing the clip image data with the index No. "4" is temporarily stored in the register in the CPU 10. The clip image data with the index No. "3" which had been displayed in the OUT-clip display area 24*d* is already stored, so it is cleared from the OUT-clip display area 24*d*.

[Fifth Marking (IN-point)]

When the fifth marking is performed, clip image data with the index No. "5" is formed in the same manner, and stored in the empty area in the RAM 10*b*. In this case, two consecutive IN-points have been stored, so the clip image data with the index No. "4" displayed in the IN-clip display area 24*a* is moved to the clip display area 28. Also, as a result of this fifth marking, the second management record data 204 stored in the register in the CPU 10 is stored in the RAM 10*b* as having been linked to the second management record data 201, as shown in FIG. 15.

On the other hand, the clip image data with the index No. "5" generated by this fifth marking is displayed on the IN-clip display area 24*a*. As with the case of the fourth marking, the second management record data 205 managing the clip image data with the index No. "5" is temporarily stored in the register within the CPU 10. Subsequent marking actions follow the same process, so description here will be omitted.

Regarding the example shown in FIG. 14, a certain event is copied from the event display area 29, and further, effects are inserted between certain events. Next, the operation in this case will be described with reference to FIG. 17.

That is, by means of carrying out marking as described above, the event display area 29 sequentially displays: clip image data with the index No. "2" which comprises the event with the event No. "1", clip image data with the index No. "6" which comprises the event with the event No. "2", clip image data with the index No. "8" which comprises the event with the event No. "3", and clip image data with the index No. "11" which comprises the event with the event No. "4".

In this state, in the event that the user operates the mouse 2d to drag and drop the clip image data with the index No. "6" onto the program display area 30, second management record data 206 which manages an event comprised of clip image data of the IN-point with the index No. "6" and clip image data of the OUT-point with the index No. "7", is linked to the first management record data 103.

In the same way, in the event that the user drags and drops the IN-point clip image data with the index No. "2" displayed on the event display area 29 to a position behind the index No. "6" on the program display area 30, second management record data 202 which manages an event comprised of clip image data of the IN-point with the index No. "2" and clip image data of the OUT-point with the index No. "3", is linked to the second management record data 206.

Further, in the same way, in the event that the user operates the mouse 2d to drag and drop the IN-point clip image data with the index No. "8" displayed on the event display area 29 to a position behind the clip image data with the index No. "2" on the program display area 30, second management record data 208 which manages an event comprised of clip image data of the IN-point with the index No. "8" and clip image data of the OUT-point with the index No. "9", is linked to the second management record data 202.

In such a state, in the event that the user selects a certain effect from the picture effects set-up area 25 and drags and drops it between the clip image data with the index No. "6" and the clip image data with the index No. "2" on the program display area 30, the link destination after the second management record data 206 is switched from the second management record data 202 to the second management record data 201E which has the effect No. "1". Also, the link destination before the second management record data 202 is switched from the second management record data 206 to the second management record data 201E.

In the same way, in the event that the user selects effect No. "2" from the picture effects set-up area 25 and drags and drops it between the clip image data with the index No. "2" and the clip image data with the index No. "8" on the program display area 30, the link destination after the second management record data 202 is switched from the second management record data 208 to the second management record data 202E which manages the effect No. "2". Also, the link destination before the second management record data 208 is switched from the second management record data 202 to the second management record data 202E.

Thus, picture effects data (effects setting clip image data) is processed in the same manner as normal clip image data.

<Configuration of the Hybrid Recorder>

Next, description will be made regarding the hybrid recorder 3 (3a through 3d) with reference to FIG. 18. As shown in FIG. 18, the hybrid recorder 3 is comprised of a hard disk drive (HDD) 300 formed of a plurality of hard disks linked in an array capable of recording and replay of the input video signals V1 seemingly at the same time, and a video tape recorder (VTR) 301 provided for backing up the recording and replay of the hard disk drive 300. Thus, during sports broadcasting, for example, the picture can be constantly recorded, while allowing decisive plays to be replayed, and at the same time, even in the event that a recording or replay error occurs in the hard disk drive 300, the video tape recorder 301 serves as a backup so that the decisive plays can be recorded and replayed in a sure manner, and not missed.

Specific description shall be made regarding the configuration of such a hybrid recorder 3. First, the hybrid recorder 3 has an interface unit 302 based on RS-422 communications protocol, so as to receive control commands being sent from the external interface 18 of the computer 2, such as start recording commands, start replay commands, stop replay commands, and so forth. This interface unit 302 hands the received control commands to a CPU 303.

The CPU 303 controls the entire hybrid recorder 3, and controls the operation of each portion according to the control commands received from the interface unit 302. Thus, the hybrid recorder 3 can record the input video signals V1 and audio signals A1, and replay the recorded signals to be output as replay video signals V3 and audio signals A3.

First, the video signals V1 and audio signals A1 continuously supplied from a source such as a video camera or the like are converted from serial data into parallel data at a serial/parallel (S/P) converter 314, following which the video signals V1 are input to a first switch 304. This first switch 304 also receives video signals output from a decoder 305. The first switch 304 is for selecting video signals to record to the hard disk drive 300 and video tape recorder (VTR) based on control signals from the CPU 303, and selects either the video signals V1 or the video signals output from the decoder 305 and outputs the selected one to an encoder 306.

Incidentally, generally, the video signals V1 are recorded, so the first switch 304 selects the video signals V1. Also, a situation in which the video signals output from the decoder 305 are selected would be a situation wherein the video signals recorded in the hard disk drive 300 are to be transferred to the video tape recorder 301 and recorded there.

The encoder 306 converts the analog video signals supplied from the first switch 304 into digital video signals, and also compresses and encodes the digitized video signals in increments of frames based on the MPEG (Moving Picture Experts Group) standards.

On the other hand, the audio signals A1 output from the serial/parallel converter 314 are input to the audio data control unit 317. Input of audio signals from a microphone 8 are made to a switch 315, and selection is made of either the audio signals from the microphone 8 or audio signals from other devices, the selected audio signals are. subjected to A/D conversion by an A/D converter 306, and supplied to the audio data control unit 317. The audio data control unit 314 selects either the audio signals input from the serial/parallel control unit 314 or the audio signals input from the A/D converter 316, based on control from the CPU 303, and outputs the selected one to the encoder 306. The encoder 306 compresses the audio data input from the audio data control unit 317 based on MPEG standards, superimposes the audio data on the video data, and outputs it.

Also supplied to the audio data control unit 317 is replay audio data from the HDD 300 or VTR 301 output by the third switch 310. The audio data control unit 317 processes the replay audio data, and supplies it to the decoder 305. Further, the audio data control unit 317 outputs the replayed audio data from the HDD 300 or VTR 301 to the D/A converter 318, where the replayed audio data is subjected to D/A conversion, and then output to a speaker 320 via the audio out terminal 319, so as to cast sound into the air.

Supplied to the second switch 307 is video signals and audio signals from the video tape recorder 301, in addition to encoded video signals and audio signals output from the encoder 306. This second switch 307 is for selecting video signals and audio signals to supply to the hard disk drive 300 based on control signals from the CPU 303, and selects either the encoded video signals and audio signals output from the encoder 306 or the encoded video signals and audio signals output from the video tape recorder. Also, the hard disk drive 300 records encoded video signals and audio signals, so the second switch 307 selects encoded video signals and audio signals. Incidentally, a situation in which the video signals and audio signals output from the video tape recorder 301 are selected would be a situation wherein the video signals and audio signals recorded in the video tape recorder 301 are to be transferred to the hard disk drive 300 and recorded there.

The video signals and audio signals selected by the second switch 307 are input to the input buffer memory 308. The input buffer memory 308 has storage capacity for storing e.g., 15 frames of video signals and audio signals, and stores the input video signals and audio signals temporarily.

The hard disk drive 300 has a hard disk array formed of a plurality of hard disks 300A (described later with reference to FIG. 66) linked in an array, thereby having sufficient storage capacity for video signals and audio signals. When the hard disk drive 300 is commanded by the CPU 303 to perform a recording operation, the video signals and audio signals stored in the input buffer memory 308 are successively read out, and stored in the hard disk array in increments of frames. Also, when the hard disk drive 300 is commanded by control signals from the CPU 303 to perform a replay operation, the video signals and audio signals of the portion specified by the CPU 303 are read out from the hard disk array, and replayed. The replayed video signals and audio signals are output to an output buffer memory 309 which has storage capacity for storing e.g., 15 frames of video signals and audio signals, and stored temporarily. The output buffer memory 309 successively reads out the temporarily stored video signals and audio signals and outputs these to a switch 310.

Now, specific description will be made regarding the recording and replaying operations of the hard disk drive 300. In this hybrid recorder 3, all of the recording and. replaying operations of the hard disk drive 300 are managed by the CPU 303. Based on a time code output from the time-code generating unit 313, the CPU 303 appropriates time code to each video frame of the video signals to be recorded, and also appropriates recording addresses to each video frame of the video signals. The CPU 303 then stores the appropriated time code and the recording addresses as a correlation table.

During the recording operation, the CPU 303 instructs the hard disk drive 300 of a recording address and a recording command upon receiving these, the hard disk drive 300 proceeds to record video signals to the specified recording address.

On the other hand, during the replay operation, when the video signals to be read out are specified by the computer 2 by time code, the CPU 303 makes reference to the aforementioned correlation table and checks where the video frame of the commanded time code is (i.e., checks the recording address). Then, the CPU 303 instructs the hard disk drive 300 of the replay command and the checked recording address. Thus, the hard disk drive 300 replays the video signal from the instructed address (replays the video signals requested by the computer 2). Thus, by the CPU 303 forming a correlation table of the relation between the time code and the recording addresses, the instructed replay position can be speedily replayed event in the case that the replay position has been instructed by time code from the computer 2. Incidentally, audio signals are recorded and replayed in the same manner as the corresponding video signals.

Also, in the event that an external time code (Ext.TC) is to be input externally, the above-described time-code generating unit 313 supplies the external time code to the CPU 303 as the time code, and in the event that an external time code is not to be input, the time-code generating unit 313 supplies its own time code.

Next, the role of the input buffer memory 308 and output buffer memory 309 provided to the input side and output side of the hard disk drive 300 will be described. The two buffer memories 308 and 309 function as buffers for making the recording operation and replaying operation of the hard disk drive 300 seemingly be parallel. This hard disk drive 300 is arranged so as to be capable of conducting recording operation at least twice the speed at which the input buffer memory 308 can take in video signals or faster, and also so as to be capable of conducting replaying operation at least twice the speed at which the output buffer memory 309 can replay video signals or faster. To this end, providing buffer memories 308 and 309 to the input side and output side allows for an arrangement wherein the hard disk drive 300 performs replay operations of storing video signals and audio signals in the output buffer memory 309 while the input buffer memory 308 is taking in video signals and audio signals, and also wherein the hard disk drive 300 performs recording operations of reading video signals and audio signals from the input buffer memory 308 while the output buffer memory 309 is reading video signals and audio signals. Hence, providing buffer memories 308 and 309 to the input side and output side of the hard disk drive 300 allows the hard disk drive 300 to seemingly conduct recording and replay operations simultaneously.

Description of the members will be continued now, returning to FIG. 18. As described above, the encoded video signals and audio signals output from the encoder 306 as described above are also supplied to the video tape recorder 301. The video tape recorder 301 is provided as a backup to the hard disk drive 300, and performs recording or replaying operations according to control signals from the CPU 303. For example, in the event that the hard disk drive 300 is recording, the video tape recorder 301 acts as a recording backup, so the video tape recorder 301 records the video signals and audio signals that are input parallel with the recording actions of the hard disk drive 300, onto video tape. Also, in the event that the hard disk drive 300 is performing replay operations due to a command received from the CPU 303, the video tape recorder 301 acts as a replay backup, so the video tape recorder 301 replays and outputs the same video signals and audio signals that are being replayed by the hard disk drive 300, from video tape.

Incidentally, the recording and replaying operations of the video tape recorder 301 are managed by the CPU 303 in the same manner as the hard disk drive 300, but positions on the video tape cannot be specified by address as with the hard disk drive, so the CPU specifies the time code itself instead of address information. That is, the video tape recorder 301 adds the time code given by the CPU 303 to the material being recorded when conducting recording operations, and reads the time code given by the CPU 303 when replaying in order to confirm the reading position and conduct replaying operations.

The video signals and audio signals replayed from the video tape recorder 301 are input to the third switch 310, as with the vide o signals and audio signals replayed from the hard disk drive 300. This third switch 310 selects the video signals to be output as replay video signals V3, based on the control signals from the CPU 303. That is, the third switch 310 selects either the video signals replayed from the hard disk drive 300 or the video signals replayed from the video tape recorder 301, based on control signals from the CPU 303. Generally, the video signals replayed from the hard disk drive 300 are selected. A situation in which the video signals replayed from the video tape recorder 301 are selected would be a situation wherein an error has occurred in the video signals from the hard disk drive 300.

The video signals selected buy th e third switch 310 are supplied to the decoder 305. The decoder 305 is for decoding the video signals which have been compressed and encoded in increments of frames, and the decoder 305 decodes the input video signals based on the MPEG standard. The decoder 305 also converts the decoded digital video signals into analog video signals, and outputs the video signals to the first time code adding unit 311.

The third switch 310 supplies the selected audio signals to the audio data control unit 317. The audio data control unit 317 subjects the input audio signals to certain processing and then outputs these to the decoder 305. The decoder 305 decodes the audio signals based on the MPEG standards, and superimposes the analog audio signals on the video signals and outputs to the first time code adding unit 311.

The first time code adding unit 311 adds the time code to the vertical synchronous period of the video signals output from the decoder 305, based on the time code supplied from the CPU 303. However, in the event that the video signals output from the decoder 305 are video signals replayed by the video tape recorder, the time code has been added already, so the time code is not added here; the time code is added only to video signals replayed from the hard disk drive 300. Incidentally, the time code to be added to the video signals matches the time code appropriated when recording. The video signals which have received time code by this first time code adding unit 311 are externally output as replay video signals V3 along with the audio signals A3, and also sent to the picture effects device 6.

Also output from the hybrid recorder 3 are video signals V2 which are almost the same as the input video signals V1, besides the replay video signals V3 and audio signals A3. The video signals V2 are video signals created by adding the time code to the video signals V1 with a second time code adding unit 312. In this case, the second time code adding unit 312 adds the time code to the vertical synchronous period of the video signals V1, based on the time code supplied from the CPU 303, and outputs these as the video signals V2. At this time, the second time code adding unit 312 adds the time code to the video signals V1 so that the correlation between the time code and the video frame to which it is being applied agrees with the video signals V3. For example, in the event that a certain video frame has received a time code of "00:01:23:45" from the first time code adding unit 311, the video frame in the video signals V1 corresponding with that video frame also has the time code of "00:01:23:45" applied thereto.

Thus, the hybrid recorder 3 is designed so as to proceed with recording the video signals V1 on the hard disk drive 300, and at the same time replay video signals v3 from the hard disk drive 300, so that the recording operation and replay operation are conducted almost simultaneously. Also, the hybrid recorder 3 also is equipped with a video tape recorder 301 to back up the hard disk drive 300, so even in the case that trouble occurs with the hard disk drive 300, recording and replaying operations can be carried out in a sure manner.

Figure 53:
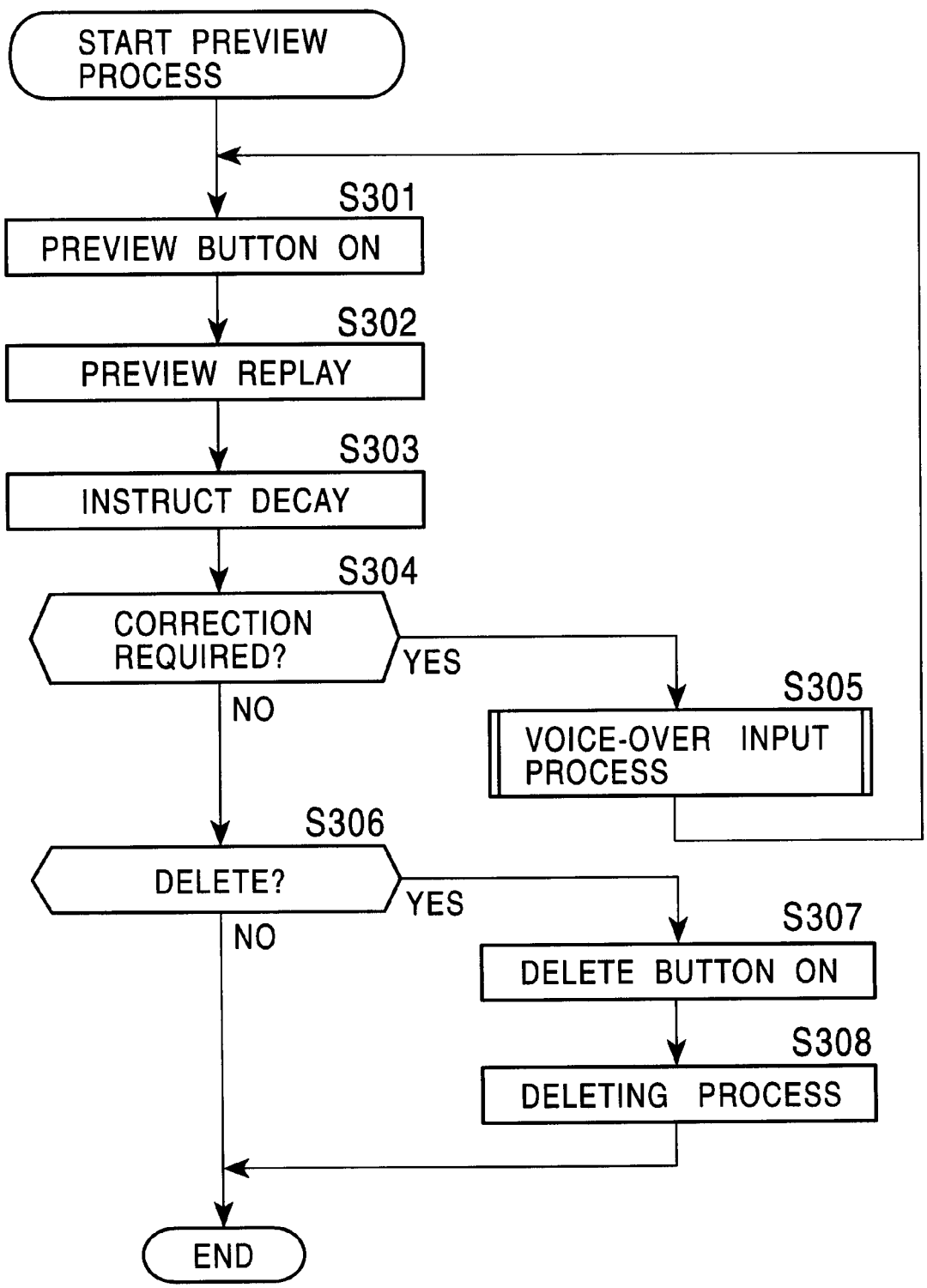
FIG. 53 is a flowchart for describing preview processing.

Further, the audio data control unit 317 supplies replay audio signals to the D/A converter 318 decayed by a certain amount when conducting preview replay at the time of voice-over editing, as later described with reference to FIG. 53, and then output from the speaker 320.

<Setting Replay Speed>

[Replay Speed Setting Area]

Next, description will be given regarding the replay speed setting of an event. This editing system 1 is arranged such that the display of the image effects setting area 25 can be changed to the display of the replay speed setting area 25A in either the picture mode or time-line mode, and thereby use this to set the replay speed of an event in increments of frames. Accordingly, slow replay can be set for an event consisting of, for example, the instant of hitting a home-run in a baseball broadcast. That is, the event consisting of the home-run scene is replayed in slow-motion, thereby providing the audience with a picture of the movement of the batter and the flight of the ball in an even more realistic representation. Also, the replay speed can be set in increments of frames, so a replay might be made wherein the scene in which the pitcher pitches the ball is replayed in relatively fast slow-motion, and the instant that the batter hits the ball is replayed in relatively slow slow-motion. Such setting of differing slow replay speeds within the event provides the audience with a picture with even more impact.

Figure 19:
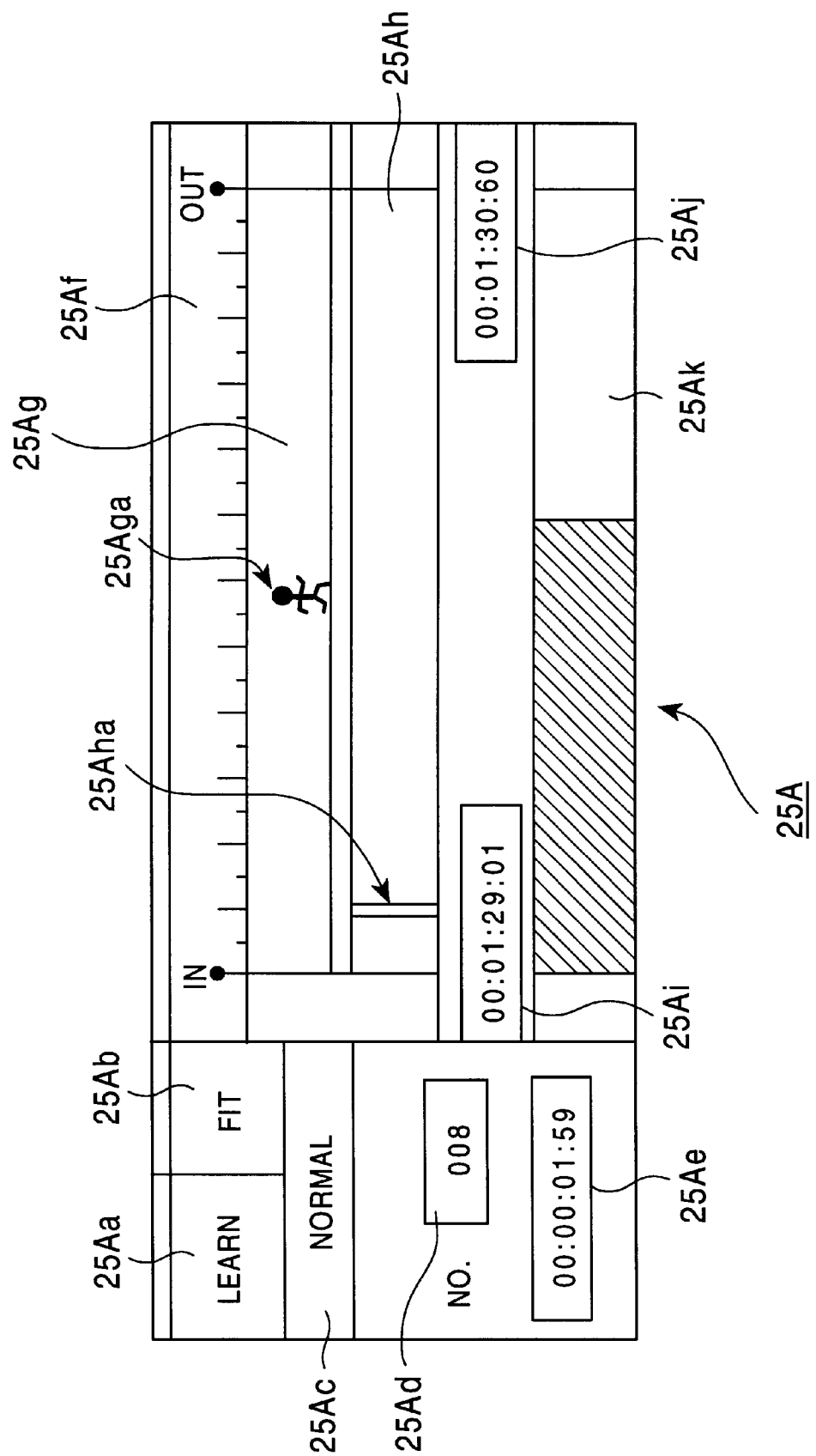
FIG. 19 is a diagram illustrating the configuration of the replay speed setting area.

This point will be described in greater detail with reference to FIG. 19. First, the replay speed setting area 25A shown in FIG. 19 can be brought up instead of the image effects setting area 25 by means of bringing up a pull-down menu by clicking the option button 22h in the timing display area 22, and operating the DMC (Dynamic Motion Control) button from it. The replay speed setting area 25A has a learn button 25Aa, a speed-fit button 25Ab, normal replay speed setting button 25Ac, event No. display portion 25Ad, event duration display portion 25Ae, time-line scale display portion 25Af, time runner display portion 25Ag, point display portion 25Ah, IN-point time code display portion 25Ai, OUT-point time code display portion 25Aj, and remaining amount indicator portion 25Ak.

The learn button 25Aa (LEARN) is a button used for setting the replay speed using the later-described dedicated controller 2e. Clicking this learn button 25Aa and then inputting replay speed information using the dedicated controller 2e stores the speed information, and sets the replay speed of the event. The speed fit button 25Ab (FIT) is a button for automatically setting the replay speed by numerical value input from the keyboard 2c of the length from the IN-point to the OUT-point (i.e., the duration). Clicking the speed fit button 25Ab and then inputting the duration value from the keyboard 2c automatically sets the optimal replay speed for the duration value.

The normal replay speed setting button 25Ac (NORMAL) is a button used for canceling the settings for replay speed. Specifying the event for which settings for replay speed have been made, then clicking the normal replay speed setting button 25Ac cancels the set replay speed, returning the replay speed to normal, i.e., 1× speed. The event No. display portion 25Ad is an area for displaying the event No. of a specified event. The displayed event No. is the same as the event No. displayed in the event No. display portion 29*d* in the event display area 29.

The event duration display portion 25Ae is an area for displaying the length from the IN-point to the OUT-point, i.e., the duration. This event duration display portion 25Ae displays the duration in increments of frames. The time-line scale display portion 25Af is an area for visually displaying increments for the duration of the specified event, i.e., for displaying the scale. The scale displayed by the time-line scale display portion 25Af is in increments of frames.

The time runner display portion 25Ag is a position display portion for displaying which portion in the event is currently set or being replayed, when replay speed is being set with the later-described dedicated controller 2*e,* or when previewing an event for which the replay speed has been set. This time runner display portion 25Ag displays an icon 25*ga* shaped like a person running, and indicates the position within the event being set or replayed by the position that the icon 25*ga* is displayed with reference to the time-line scale display portion 25Af. Accordingly, the operator can easily understand which position is being set or replayed by the position of the icon 25*ga*.

Also, in this case, the icon 25*ga* sequentially follows the scale from the IN-point toward the OUT-point in accordance with the passage of setting or replay, but the speed of movement of the icon 25*ga* at this time changes according to the replay speeds set therein, so the operator can. easily visually understand which portions are set with slow replay speed, and so forth.

The point display portion 25Ah is an area for displaying whether there are other IN-points or OUT-points between the IN-point and OUT-point of the specified event. With this point display portion 25Ah, a pointer 25*ha* is displayed at the position of any other such IN-points or OUT-points. Thus, the operator can easily visually grasp other editing points. The IN-point time code display portion 25Ai and OUT-point time code display portion 25Aj are areas for displaying the time code of the IN-point and OUT-point of the selected event.

The remaining amount indicator portion 25Ak is an area for displaying the remaining amount as to the maximum learn duration time, at the time of clicking the learn button 25Aa and setting the replay speed using the dedicated controller 2*e* to store that replay speed in the RAM 10*b* of the CPU 10. The storage area appropriated for setting the replay speed for a certain event is determined beforehand, so the remaining capacity can easily be calculated by checking the remaining capacity of the storage area. Providing such a remaining amount indicator portion 25Ak allows the user to visually understand the remaining amount of memory, thereby avoiding replay speed settings that would run over the maximum learn duration time.

<Dedicated Controller>

Figure 20:
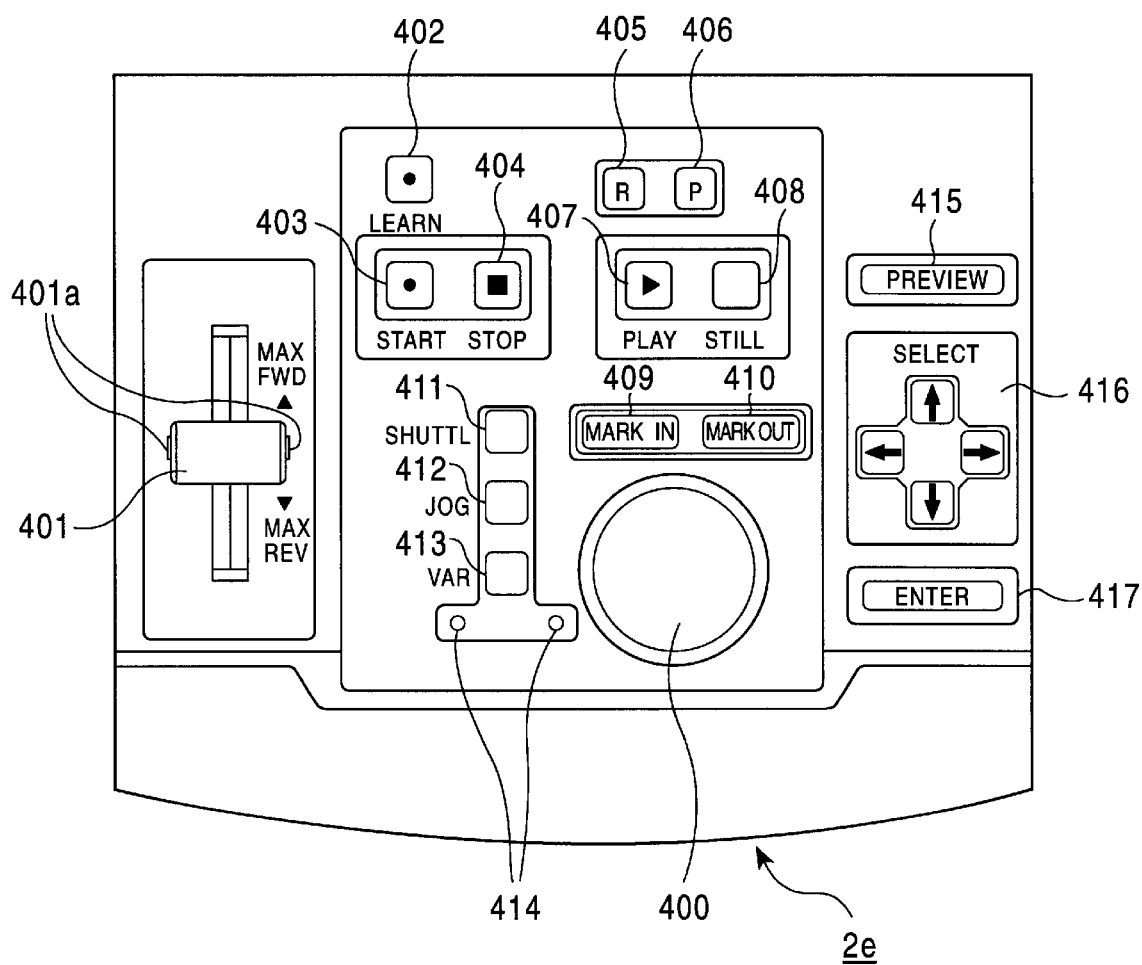
FIG. 20 is a diagram illustrating the external configuration of the dedicated controller shown in FIG. 1 or FIG. 2.

Next, description will be made regarding the dedicated controller 2*e* used for setting the replay speed, with reference to FIG. 20. As shown in FIG. 20, the dedicated controller 2*e* has a plurality of buttons and also a search dial 400 which is a rotary encoder and a motion control lever 401 which is a slide encoder. so that the operator can use these two operating units to freely input the replay speed by manual operating.

First, description will be made regarding the operating buttons provided on the operating panel face of the dedicated controller 2*e.* Provided to the upper center portion of the operating panel face are: a learn (LEARN) button 402, start (START) button 403, stop (STOP) button 404, select recording side (R) button 405, select play side (P) button 406, play (PLAY) button 407, still (STILL) button 408, mark-IN (MARK IN) button 409, and a mark-OUT (MARK OUT) button 410. Further, provided below these operating buttons are: the above-described search dial 400, shuttle (SHUTTL) button 411, jog (JOG) button 412, variable (VAR) button 413, and variable indicator 414.

On the other hand, provided to the right side of the operating panel face are: a preview (PREVIEW) button 415, cursor. button 416, and enter (ENTER) button 417, in that order from the top. On the other hand, the above-described motion control lever 401 is provided to the left side of the operating panel so as to slide vertically to the operating panel.

Of these operating buttons, the learn button 402 is a button used for setting the replay speed using the motion control lever 401 or the search dial 400, and storing it. The replay speed is stored from the time that the learn button 402 is pressed and the motion control lever 401 or the search dial 400 is operated till the time that the mark-OUT 410 button is operated. Incidentally, function-wise, this learn button 402 is almost the same as the learn button 25Aa displayed in the replay speed setting area 25A.

The start button 403 is a button operated for outputting a start recording command to the hybrid recorder 3 and recording the video signals displayed on the recorded video display area 21. Also, the stop button 404 is a button which is operated for outputting a stop recording command to the hybrid recorder 3 and stopping the recording operation of the video signals displayed on the recorded video display area 21. Incidentally, function-wise, these buttons 403 and 404 are almost the same as the recording start/stop button 31*a* displayed on the monitor 2*b.*

The select recording side button 405 and select play side button 406 are buttons for selecting the object of control by the dedicated controller 2*e.* In the event of controlling the recording side with the dedicated controller 2*e,* the recording side button 405 is pressed, and in the event of controlling the replaying side, the select play side button 406 is pressed.

The play button 407 is a button for outputting start replay commands to the hybrid recorder 3 and displaying video signals on the replay video display area. Also, the still button 408 is a button for outputting stop replay commands to the hybrid recorder 3 and stopping the displaying of video signals on the replay video display area. Pressing the still button 408 displays a still image on the replay video screen 23*a.*

The mark-IN button 409 and mark-OUT button 410 are buttons to be used for setting the respective IN-points and OUT-points. Incidentally, the buttons 409 and 410 operate in the same manner as the mark IN button 24*c* and the mark OUT button 24*f* provided to the recorded video marking area 24 while the recording side button 405 is pressed, and operate in the same manner as the mark IN button 27*c* and the mark OUT button 27*f* provided to the replay video marking area 27 while the play side button 406 is pressed.

The shuttle button 411 is a button to be pressed when operating the search dial 400 in the shuttle mode, and the jog button 412 is a button to be pressed when operating the search dial 400 in the jog mode. Also, the variable button 413 is a button to be pressed when operating the search dial 400 in the variable mode, or operating the motion control lever 401. Incidentally, pressing the variable button 416 lights the variable indicator 414 to the right and the search dial is set to the variable mode, pressing the variable button 416 again lights the variable indicator 414 to the left and the motion control lever 401 becomes available, and pressing the variable button 416 once more turns of the variable indicators 414 to the right and left, and the search dial 400 and the motion control lever become in accessible.

The preview button 415 has the same function as the preview button 45b shown in FIG. 6 and the preview button 32 shown in FIGS. 5 and 6. The preview button 415 is a button used for previewing a selected event or program. Selecting an event or program and pressing the preview button 415 outputs a start replay command for the event or program to the hybrid recorder 3, and the video signals of the event or program are displayed on the replay video screen 23a.

The cursor button 416 is comprised of four buttons, i.e., a down button, up button, left button, and right button. The cursor button 416 is used for moving the cursor when selecting clip image data in the clip display area 28, event display area 29, and program display area 30.

The enter button has two types of functions. One is a function for inputting registration commands for registering a section between an IN-point and OUT-point set in the replay video marking area 27 as a new event (the same as the new event button 33 displayed on the monitor 2b), and the other is a function for inputting sending commands for sending selected events or programs.

The search dial 400 is a rotary encoder for inputting replay speed information according to the rotating operation of the operator. As described above, this search dial 400 operates in the three modes of shuttle mode, jog mode, and variable mode, by pressing the shuttle button 411, jog button 412, and variable button 413.

First, when in the shuttle mode, replay speed information from −100× speed to +100× speed can be input by the rotation position of this search dial 400. Incidentally, in this mode, the search dial 400 operates in clicks of still image, +10× speed and −10× speed.

Also, when in the jog mode, replay speed information from −1× speed to +1× speed can be input by the rotation position of this search dial 400. Further, when in the variable mode, replay speed information from −1× speed to +3× speed can be input by the rotation position of this search dial 400. Incidentally, in this mode, the search dial 400 operates in clicks of still image and +1× speed.

As described above, the operator can select the jog mode which allows for fine speed setting by narrowing the control range, the shuttle mode which allows for settings over a wide area by rough speed settings, or the variable mode wherein the setting range on the + (plus) side has been extended, according to the replay speed that the operator desires to set, thereby freely setting the replay speed.

The motion control lever 401 is a slide encoder for inputting replay speed information according to sliding operation by the operator. Sliding the motion control lever 401 up and down allows input of replay speed from a still image to +1× speed. Incidentally, range extending buttons 401a are provided on either side of the motion control lever 401, and pressing the range extending buttons 401a extend the replay speed information which can be input from 1-× speed to +3× speed.

In this way, replay speed information from a still image to +1× speed can be input with the motion control lever 401, and the operator can freely set the replay speed within that range. Also, providing the rotation-operated search dial 400 and the slide-operation motion control lever 401 allow the operator to input replay speed information using whichever he/she feels comfortable with, thereby improving ease of use.

The command information input from the operating buttons on the dedicated controller 2e, and the replay speed information input from the search dial 400 and the motion control lever 401 are output to the CPU 10 via the pointing device interface 17. Accordingly, the CPU 10 performs action control according to the command information, and performs replay action for specified events according to the replay speed information thereof. Incidentally, in the event that the learn button is pressed, the CPU 10 stores the replay speed information thereof in the RAM 10b as the replay speed of a specified event.

Now, in the case of storing replay speed information, the information is stored according to a data format such as shown in FIG. 21, for example. that is, speed data is stored for each video frame from the IN-point of the specified event to the OUT point thereof. Incidentally, the speed data is digital data which has been output from the search dial 400 or the motion control lever 401, and decoded by the pointing device interface 17. When replaying, the CPU 10 reads the speed data stored in this format and controls the replay speed. At this time, the CPU performs calculation of v=10 (N/32−2) wherein N represents speed data and v represents the replay speed, and uses the value obtained thereby as the replay speed. Accordingly, in the event that the speed data is "64", for example, the replay speed is "1.0", and in the event that the speed data is "32", the replay speed is "0.1".

<Method for Setting Replay Speed>

Next, the setting procedures for setting the replay speed using the replay speed setting area 25A will be described.

First, regarding the method for setting the replay speed, there are three general methods. The first method involves inputting the replay speed information (speed data) from the keyboard 2c without using the dedicated controller 2e, the second involves inputting the replay speed information (speed data) using the dedicated controller 2e after specifying an event, and the third involves inputting the replay speed information using the dedicated controller 2e without specifying an event.

With the first method, the event for which the operator wishes to set the replay speed is clicked on in the event display area 29 and thus specified. Next, the option button 22h in the timing display area 22 is operated, to display the replay speed setting area 25A. The No. and duration of the specified event is displayed therein. Next, the speed fit button 25Ab of the replay speed setting area 25A is clicked. This allows the replay speed information to be input from the keyboard, so the operator inputs the replay speed information. Incidentally, in this case, what is actually input is not the replay speed information (speed data) itself, but the duration. This operation automatically sets replay speed optimal for the event according to the duration value.

In the case that the event is to be previewed later, all that is necessary is to click the preview button 32. Or, in the case that the set replay speed is to be saved, all that is necessary is to click the new event button 33 or the replace button 35.

With the second method, the event for which the operator wishes to set the replay speed is clicked on in the event display area 29 and thus specified. Next, the option button 22h in the timing display area 22 is clicked. This displays the replay speed setting area 25A, and the No. and duration of the specified event are displayed therein. Next, the learn button 25Aa of the replay speed setting area 25A is clicked. This enables setting of the replay speed, so the replay speed information is input using the search dial 400 or the motion control lever 401 of the dedicated controller 2e. This input replay speed information is sequentially stored in the RAM 10b of the CPU 10. In the case that setting of the replay speed is to be ended at this point, pressing the mark-OUT button 27f in the replay video marking area 27 or the mark-OUT button 410 on the dedicated controller 2e ends setting of the replay speed. Incidentally, in the case that the set replay speed is to be saved, all that is necessary is to click the new event button 33 or the replace button 35.

With the third method, the operator watches the replay video screen 23a on the replay video display area and presses the learn button 402 of the dedicated controller 2e at a desired position. This sets the IN-point and enables setting of the replay speed, so the replay speed information is input using the search dial 400 or the motion control lever 401 of the dedicated controller 2e. This input replay speed information is sequentially stored in the RAM 10b of the CPU 10. In the case that setting of the replay speed is to be ended at this point, pressing the mark-OUT button 27f in the replay video marking area 27 or the mark-OUT button 416 on the dedicated controller 2e ends setting of the replay speed. Incidentally, in the case that the set replay speed is to be saved, all that is necessary is to click the new event button 33 or the replace button 35.

<Pre-roll Mode>

Next, description will be given regarding the pre-roll mode provided to the editing system 1. Normally, in the case of generating an event, the operator watches the video data displayed on the recorded video screen 21a and clicks the mark-IN button 24c or mark-OUT button 24f in the recorded video marking area 24 to specify IN-points and OUT-points. Accordingly, the editing system 1 records video data between the specified IN-point and OUT-point as an event. In the case of confirming the registered event, the operator clicks on the event displayed in the event display area 29 to specify it, and then clicks on the preview button 32. This starts the replay action of that event, and the video data from the IN-point to the OUT-point of that event is displayed on the replay video screen 23a.

Now, in the case of specifying the IN-point of an event, the arrangement is such that the operator watches the video data displayed on the recorded video screen 21a and clicks the mark-IN button 24c to specify an IN-point, but there are cases in which the IN-point is specified later than the scene which should be used as an event due to clicking the mark-IN button 24c too late and so forth. For example, in the case of registering a home-run scene as an event during a live baseball game broadcast, generally the period from the time the pitcher pitches the ball to the time at which the ball that the batter has hit sails over the fence should be registered as the event, but the operator has no way of telling whether or not the ball hit by the batter will make a home-run scene until the ball actually sails over the fence, so specification of the IN-point will always be too late. The video data after such a belated IN-point is specified is of no importance, so the event must be corrected.

Accordingly, in the case of the editing system 1, a "pre-roll mode" is provided, wherein replaying action is automatically started from a point reaching back a certain amount of time before the IN-point specified by the operator, thereby facilitating ease of correction of marking points. This pre-roll mode will be described in detail below.

Figure 22:
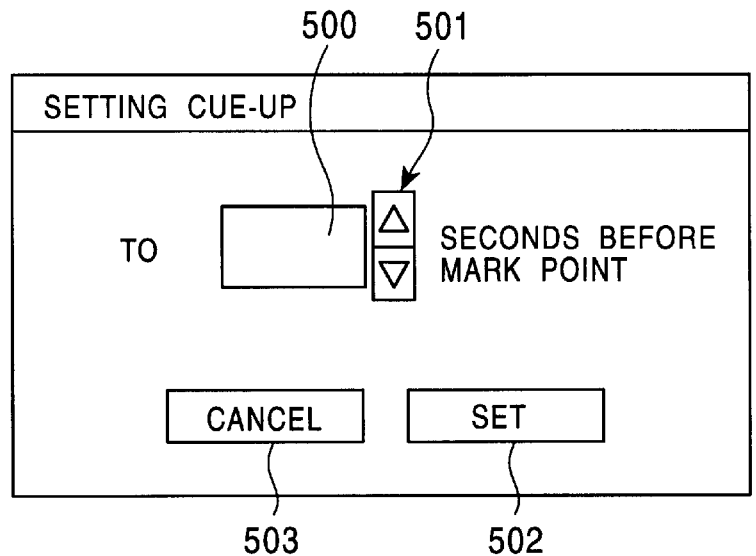
FIG. 22 is a diagram illustrating and example of display of the cue-up setting screen.

First, the time over which the pre-roll mode is used, i.e., the amount of time that the system shifts backwards from the IN-point specified by the operator to start replaying (hereafter, this time will be referred to as "cue-up time") can be freely set from the menu preference settings. In the case of setting the cue-up time, the preference settings provided to the menu are called, and the operator selects the cue-up item from therein. Selection of the cue-up item brings up a cue-up setting screen on the screen such as shown in FIG. 22. In the cue-up setting screen, clicking on the set time display area 500 and then inputting the amount of time to be set as the cue-up time from the keyboard in increments of seconds displays that time on the set time display area 500, and the cue-up time is tentatively set.

Incidentally, selecting one of the jog buttons 501 next to the set time display area 500 in the desired direction shifts the time in increments of seconds, so the cue-up time may be input using the jog buttons 501.

Once the cue-up time is thus input, the setting button 502 is clicked and the time displayed in the set time display area 500 is officially registered as the cue-up time. More specifically, the input cue-up time is stored in the storage area for preference settings data within the RAM 10b. Incidentally, clicking the cancel button 503 resets the time displayed in the set time display area 500, and the cue-up time can be entered anew. Clicking the set button 502 automatically takes the cue-up setting screen off of the screen.

Operating the pre-roll button 22e of the timing display area 22 in the state wherein the cue-up time is this set specifies activation of the pre-roll mode, so the pre-roll button 22e is lit and the pre-roll mode is activated. In order to cancel the pre-roll mode, clicking on the pre-roll button 22e once more instructs ending of the pre-roll mode, and so the pre-roll button 22e goes off and the pre-roll mode ends.

Figure 23:
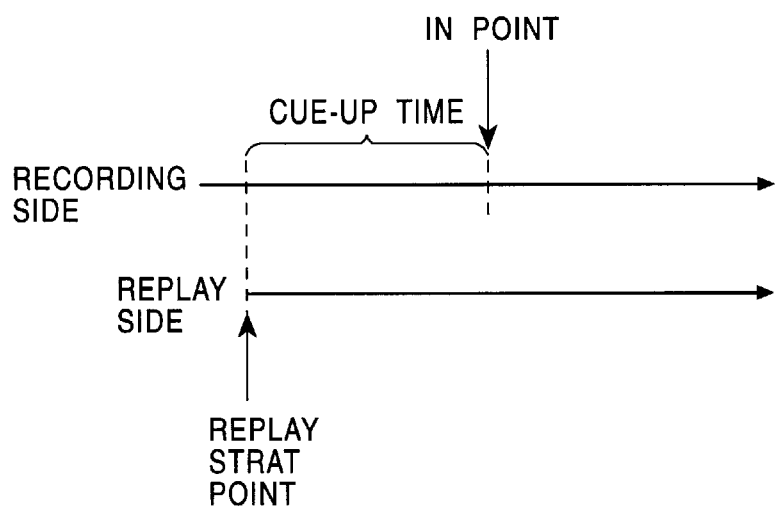
FIG. 23 is a diagram describing the pre-roll mode.

In the state wherein the pre-roll mode is activated, clicking on the mark-IN button 24c in the recorded video marking area 24 specifies the IN-point, and the clip image data specified as the IN-point is displayed on the IN-clip display area 24a. At the same time, the set cue-up time is read out, and as shown in FIG. 23, the time code of the position shifted backwards by the amount of time represented by the cue-up time from the time code of the position specified as the IN-point is calculated. Then, the editing system 1 outputs a replay command to the hybrid recorder 3 with the calculated time code position as the start replay point, whereby the replay operation is automatically started from that replay start point. The replayed video signal V3 is displayed on the replay video screen 23a via the picture effects device 6 as video signals V6, so the operator can easily correct the IN-point by watching the video data displayed on the replay video screen 23a and clicking the mark-IN button 27c in the replay video marking area 27. Incidentally, clicking the mark-OUT button 27f to specify the OUT-point and clicking on the new event button 33 registers the video data in the section between the IN-point to the OUT-point as an event.

By means of thus activating the pre-roll mode beforehand, with reference to the example of the live baseball game broadcast, even in the event that the mark-IN button 24c is clicked to specify an IN-point at the point that the ball hit by the batter goes over the fence, the replay operation is automatically performed from a position reaching back by a certain amount of time, all the operator needs to do to correct the IN-point is to watch the replay screen and click on the mark-IN button 27c on the replay side to specify an IN-point. For example, setting the IN-point and the time at which the pitcher pitched the ball allows an event including desired scenes such as the instant the batter hit the ball, etc., to be created easily in real-time.

<Work Data Folder>

Next, this section describes the work data folder. With the editing system 1, work data relating to the events and programs generated by the editing operation are generally stored in the RAM 10b, but in the event of ending the application program and ending the editing operation, the work data is downloaded to a hard disk drive 15a provided within the computer 2, and stored on a hard disk within the hard disk drive 15a. At this time, the work data is stored in a hierarchical structure called a folder.

Figure 24:
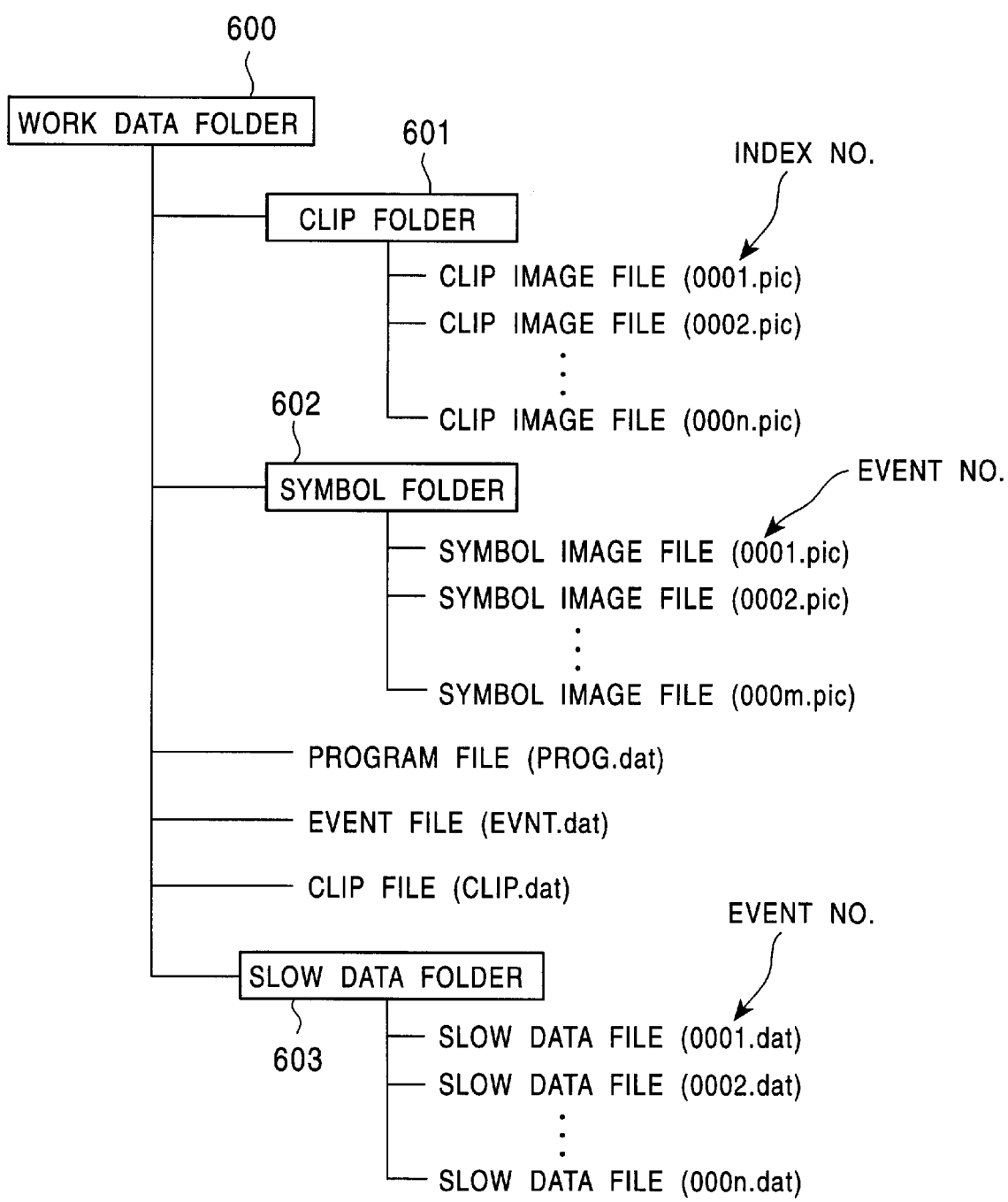
FIG. 24 is a diagram for describing the hierarchical structure for storing work data.

This point will now be described in detail with reference FIG. 24. As shown in FIG. 24, the work data relating to event and programs, etc., is stored in a hierarchical structure called a folder. This folder is generally the same as a directory in NS-DOS or the like, with the work data folder 600 as the highest tier in the hierarchy, and lower order folders 601 through 603 formed below the work data folder 600, so that each data file is stored while being managed by the hierarchical structure. Incidentally, the work data folder 600 is formed on the hard disk drive 15a by the computer 2 at the time of starting up the editing system 1.

First, the clip image data displayed in the clip display area 28 and event display area 29, or the program display area 30, is stored in units of individual pieces of clip image data as clip image files under the hierarchy of the clip folder 601 formed under the work data folder 600. The contents of the clip image files are the clip image data itself, and video data indicating a clip image is written therein. Also, the file name for each clip image file is formed by ending the index No. provided to each piece of clip image data with a suffix ".pic".

Also, the symbol image data registered as a representative clip image of an event is stored in units of individual pieces of symbol image data as symbol image files under the hierarchy of the symbol folder 602 formed under the work data folder 600. The contents of the symbol image files are video data indicating a symbol image that is written therein. Also, the file name for the symbol image file is formed by ending the No. of the event to which the symbol image belongs with a suffix ".pic".

A lower order folder is not created for work data relating to programs, but rather, such work data is directly stored as a program file under the hierarchy of the work data folder 600. Event Nos. of events making up the program are sequentially written into the program file, and making reference to the program file tells which events that the program is made of. Also, the name for the program file is the word "PROG" which indicates that this is a program file, followed with a suffix ".dat".

A lower order folder is not created for work data relating to events either, but rather, such work data is directly stored as an event file under the hierarchy of the work data folder 600. The clip Nos. of IN-points and OUT-points are sequentially written therein for each event No., and making reference to the event file tells the clip Nos. of IN-points and OUT-points of each event. Also, the name for the event file is the word "EVNT" which indicates that this is a event file, followed with a suffix ".dat".

Neither is a lower order folder created for work data relating to clip image data, but rather, such data is directly stored as an clip file under the hierarchy of the work data folder 600. The index Nos. and time codes of clip image data are sequentially written therein for each clip No., and making reference to the clip file tells which index No. image data each piece of clip image data is formed of. Also, the name for the clip file is the word "CLIP" which indicates that this is a clip file, followed with a suffix ".dat".

Also, the speed data (See FIG. 21) indicating the replay speed of an event set using the replay speed setting area 25A is stored in units of individual events as slow data files under the hierarchy of the slow data folder 603 formed under the work data folder 600. The contents of the slow data files are speed data such as show in FIG. 21, written therein in for each frame, and making reference to the slow data file tells the replay speed set for that event. Also, the file name for the slow data image file is formed by ending the No. of the event to which the slow data belongs with a suffix ".dat", as illustrated in the parenthesis.

As described above, with the editing system 1, in the event of ending an application program, the work data relating to the events and programs, etc., generated by the editing operation is stored in a hierarchical structure on a hard disk within the hard disk drive 15a. Thereby, at the time that the application program is restarted, the work data stored on the hard disk can be read out so that the same image data displayed before ending can be displayed again on the program display area 30 and event display area 29, hence returning to the state before ending the application. Also, storing work data thus allows the work data to be to be read out later to output an editing list such as an EDL (Edit Decision List).

<Description of Actions of the Computer>

This section describes the operation of the computer 2 in each process of the flowcharts. Note that the flowcharts used in the following description basically describe the actions of the CPU 10.

[Initial Operation]

First, description of the initial operation of the computer 2 will be made with reference to FIG. 25. First, in step S1, when the operator specifies execution of the application program, the CPU 10 of the computer 2 begins operations. Next, the application program is stored in a hard disk in the hard disk drive 15a, so in step S2, the CPU 10 uploads the application program to the operating RAM 10b within the CPU 10.

In the following step S3, the CPU 10 executes the application program uploaded to the RAM 10b. In the next step S4, the CPU 10 secures memory area in the RAM 10b for storing multiple clip image data, editing data, etc., generated by the yet-to-be-performed editing work. At this time, first management records for clip data, event data, and program data such as show in FIGS. 15 through 17 are generated in the RAM 10b.

In the next step S5, the CPU 10 generates a work data folder on a hard disk in the hard disk drive 15a, for storing work data relating to programs and events to be generated by the yet-to-be-performed editing work.

In the next step S6, the CPU 10 transfers graphic data to the VRAM 13b in real-time synchronously with the internal clock of the computer 2, in order to display graphics for the GUI on the monitor 2b. Thus, in the next step S7, graphics the same as the graphics data stored in the VRAM 13b are displayed on the monitor 2b.

In the next step S8, the CPU 10 judges whether or not to display the video signals V2 on the recorded video screen 21a. This judgment is made based on specification of video display by the operator. In the case that there is no specification of video display, judgment is made that no editing operation is going to be performed, so the flow proceeds to step S16, and ends the process. In normal cases, there is video display specification for performing the editing operation, so the flow proceeds to step S9 and enters the display processing for the video signals V2.

In step S9, the CPU 10 commands output of the video signals V2 to the hybrid recorder 3 by means of outputting RS-422 control commands to the hybrid recorder 3 Upon receiving the control commands, the hybrid recorder 3 adds the time code to the input video signals V1 and generates video signals V2, which are sent to the computer 2.

In the next step S10, the data conversion unit 11b extracts the time code from the input composite video signals V2, and also converts the composite video signals V2 into digital component video data. The converted video data is input to the frame memory 11c, and is temporarily stored in, increments of frames. Also, the extracted time code data is supplied to the processor controller 11a, and is sent to the CPU 10 via the processor controller 11a.

In the next step S11, the video data stored in the frame memory 11c is transferred to the VRAM 13b. The transferred video data is video data which has been reduced to 380 pixels by 240 pixels, since the number of read-out samples from the frame memory is few. Also, negotiation is conducted regarding the image data bus 5a, so image data for the GUI is transferred from the CPU 10 to the VRAM 13b, in addition to the video data. Also, by means of updating this video data stored in the VRAM 13b in real-time, real-time video data can be displayed on the monitor 2b.

In the next step S12, the image data and video data stored in the VRAM 13b is displayed on the monitor 2b in real-time. In the next step S13, the CPU 10 judges whether or not to record the video data displayed on the recorded video screen 21a with the hybrid recorder 3. This judgment is made based on clicking operation of the recording start/stop button 31a. That is, in the event that the recording start/stop button 31a is clicked, judgment is made that the video data is to be recorded, and the flow proceeds to the next step S14; conversely, in the event that the recording start/stop button 31a is not clicked, judgment is made that the video data is not to be recorded, and the flow proceeds to step S16, and the processing ends.

In step S14, the CPU 10 sends start recording commands to the external interface 18. Upon receiving the start recording commands, the external interface 18 converts the start recording commands into a communication format according to RS-422 stipulation, and sends them to the hybrid recorder 3. The hybrid recorder 3 then begins the recording operation of the input video signals V1.

In the next step S15, the recording operation has been started by the hybrid recorder 3, so the CPU 10 judges that all initial settings have been completed and ends the initial orations shown in this flowchart.

[Marking at the Recording Side]

Figure 26:
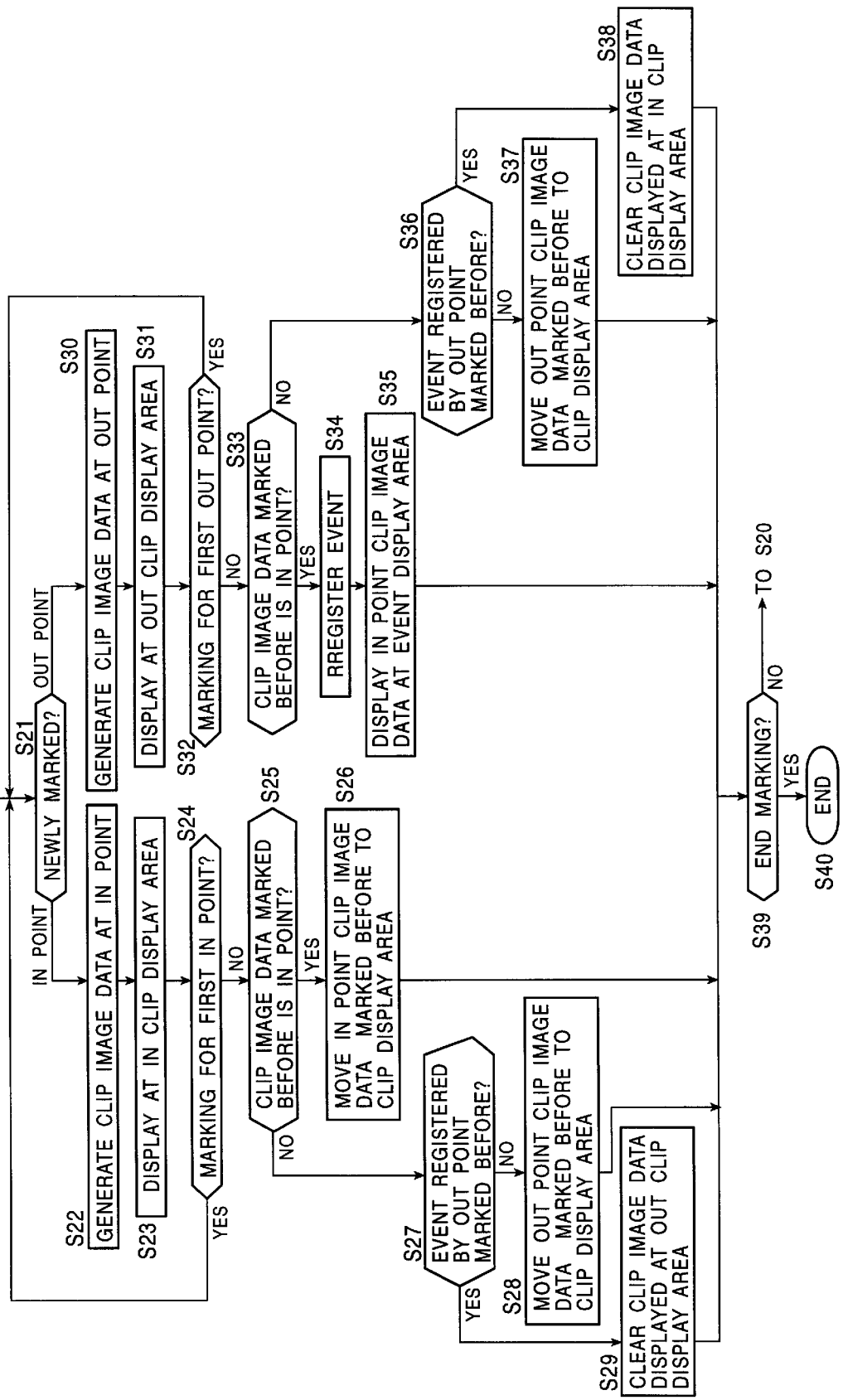
FIG. 26 is a flowchart for describing marking operation at the recording side.

Next, marking using the recorded video marking area 24 will be described with reference to FIG. 26. This marking will be understood more readily by making reference to the description of FIGS. 13 through 17.

Figure 25:
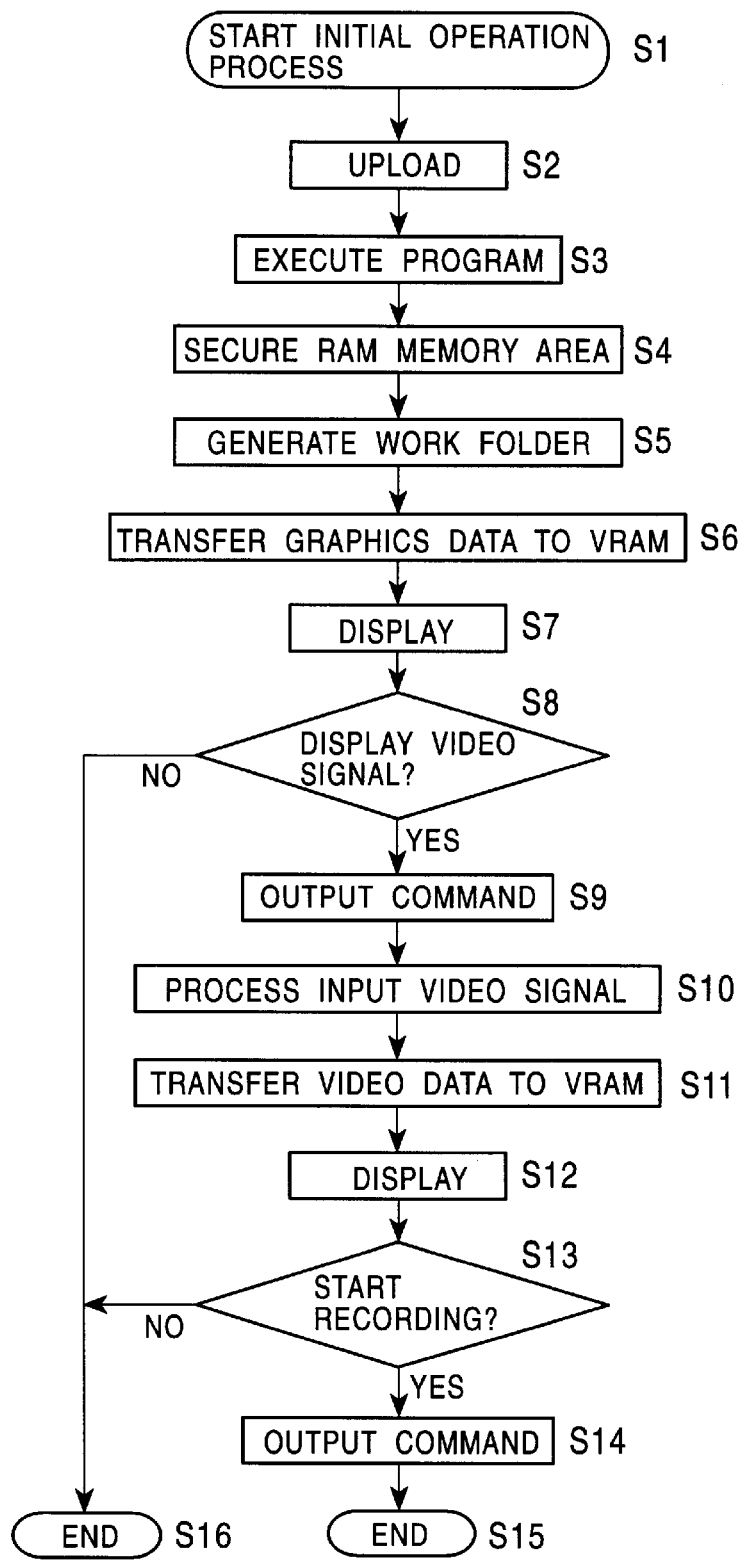
FIG. 25 is a flowchart for describing initial operation.

When the procedures of the initial operation shown in FIG. 25 are finished, the marking operation is ready to be performed, and the processing starts from step S20. In step S21, the CPU judges whether or not new marking has been performed. Judgment of whether or not new marking has been performed is performed based on whether the mouse 2d has been clicked in a state wherein the cursor is positioned within the mark-IN button 24c or mark-OUT button 24f of the recorded video marking area 24. At this time, an interruption command is generated by the clicking operation of the mouse 2d, so the CPU 10 makes judgment regarding marking according to this interruption command. In the case that the mark-IN button 24c is judged to have been clicked, judgment is made that an IN-point has been specified, and the flow proceeds to step S22; in the case that the mark-OUT button 24f is judged to have been clicked, judgment is made that an OUT-point has been specified, and the flow proceeds to step S30.

In step S22, IN-point clip image data is generated. This IN-point clip image data is generated by reading the video data stored in the frame memory 11c into the VRAM 13b. At this time, the amount of data is pruned to $1/16$ by means of reducing the number of read-out samples, so clip image data with an image size of 95 pixels by 60 pixels is generated.

In step S23, the IN-clip image data stored in the storage area for IN-display area of the VRAM 13b is read out, and displayed on the IN-display area 24a.

In step S24, the CPU 10 judges whether or not the marking in step S21 is the first IN-point marking. If the judgment results show that this is the first marking, the flow returns to step S21, and in the event that it is second orl later marking, the flow proceeds to steps S25.

In step S25, the CPU 10 judges whether or not the earlier-marked clip image data is IN-point clip image data or not. If the judgment results show that the earlier-marked clip image data is IN-point clip image data, the flow proceeds to step S26, and in the event that the earlier-marked clip image data is OUT-point clip image data, the fiow proceeds to step S27.

In step S26, the earlier-marked IN-point clip image data is moved to the clip display area 28. That is, two IN-points have been marked in a row, so the earlier-marked clip image data is not used for an event but is moved to the clip display area 28. Incidentally, at this time, second management record data for the clip image data moved to the clip display area 28 is generated, as shown in FIGS. 13 through 17.

On the other hand, in step S27, judgment is made whether or not an event was generated by the earlier-marked OUT-point clip image data. If the judgment results show that an event has been generated by the earlier marking, the flow proceeds to step S29, and in the event that an event has not been generated by the earlier marking, the flow proceeds to step S28.

In step S28, the OUT-point clip image data which had been displayed in the OUT-clip display area 24d by the earlier marking is moved to the clip display area 28. The reason is: though the OUT-point clip image data generated by the earlier marking was not used for an event, it may be used in the future, so it is kept as a marking history.

Conversely, in step S29, the OUT-point clip image data which had been displayed in the OUT-clip display area 24d is cleared. In this case, the OUT-point clip image data displayed in the OUT-clip display area 24d is already being used as the OUT-point for an event, and there is no need for further display thereof.

On the other hand, in the event that the flow has proceeded to step S30 because OUT-point marking has been detected by judgment in step S21, OUT-point clip image data is generated here. This OUT-point clip image data also is generated by reading the video data stored in the frame memory 11c into the VRAM 13b. At this time as well, the amount of data is pruned to $1/16$ by means of reducing the number of read-out samples, so clip image data with an image size of 95 pixels by 60 pixels is generated.

In step S31, the OUT-clip image data stored in the storage area for OUT-display area of the VRAM 13b is read out, and displayed on the OUT-clip display area 24d.

In step S32, the CPU 10 judges whether or not the marking in step S21 is the first OUT-point marking. If the judgment results show that this is the first marking, the flow returns to step S21, and in the event that it is second or later marking, the flow proceeds to step S33.

In step S33, the CPU 10 judges whether or not the earlier-marked clip image data is IN-point clip image data or not. If the judgment results show that the earlier-marked clip image data is IN-point clip image data, the flow proceeds to step S24, and in the event that the earlier-marked clip image data is OUT-point clip image data, the flow proceeds to step S36.

In step S34, the CPU 10 registers the section between the earlier-marked IN-point and the later-marked OUT-point as an event. Thus, with the editing system 1, marking of an IN-point and an OUT-point automatically registers this section as an event. Incidentally, at this time, second management record data for the event is generated, as shown in FIGS. 13 through 17.

In the next step S35, the IN-point clip image data of the generated event is copied to the event display area 29, and the clip image data is displayed on the event display area 29.

On the other hand, in step S36, the CPU 10 judges whether or not an event has been generated by the earlier-marked OUT-point clip image data. If the judgment results show that an event has been generated by the earlier-marked OUT-point clip image data, the flow proceeds to step S38, and if an event has not been generated by the earlier marking, the flow proceeds to step S37.

In step S37, the OUT-point clip image data generated by the earlier marking is moved to the clip display area 28. The reason is: though the OUT-point clip image data generated by the earlier marking was not used for an event, it may be used in the future, so it is kept as a marking history.

Conversely, in step S38, the IN-point clip image data which had been displayed in the IN-clip display area 24a is cleared. In this case, an event has already been generated by the clip image data displayed in the IN-clip display area 24a and by the earlier-marked OUT-point clip image data, so there is no need for further display thereof.

When the processing of step S26, step S28, step S29, step S35, step S37, or step S38 has ended, the CPU 10 proceeds to step S39, and judges here whether or not to end the marking operation. In the event that the marking operation is to be continued, the flow returns to step S20 and repeats the processing; in the event that the marking operation is to end, the flow proceeds to step S40 and ends the processing.

[Marking on the Replay Side]

Figure 27:
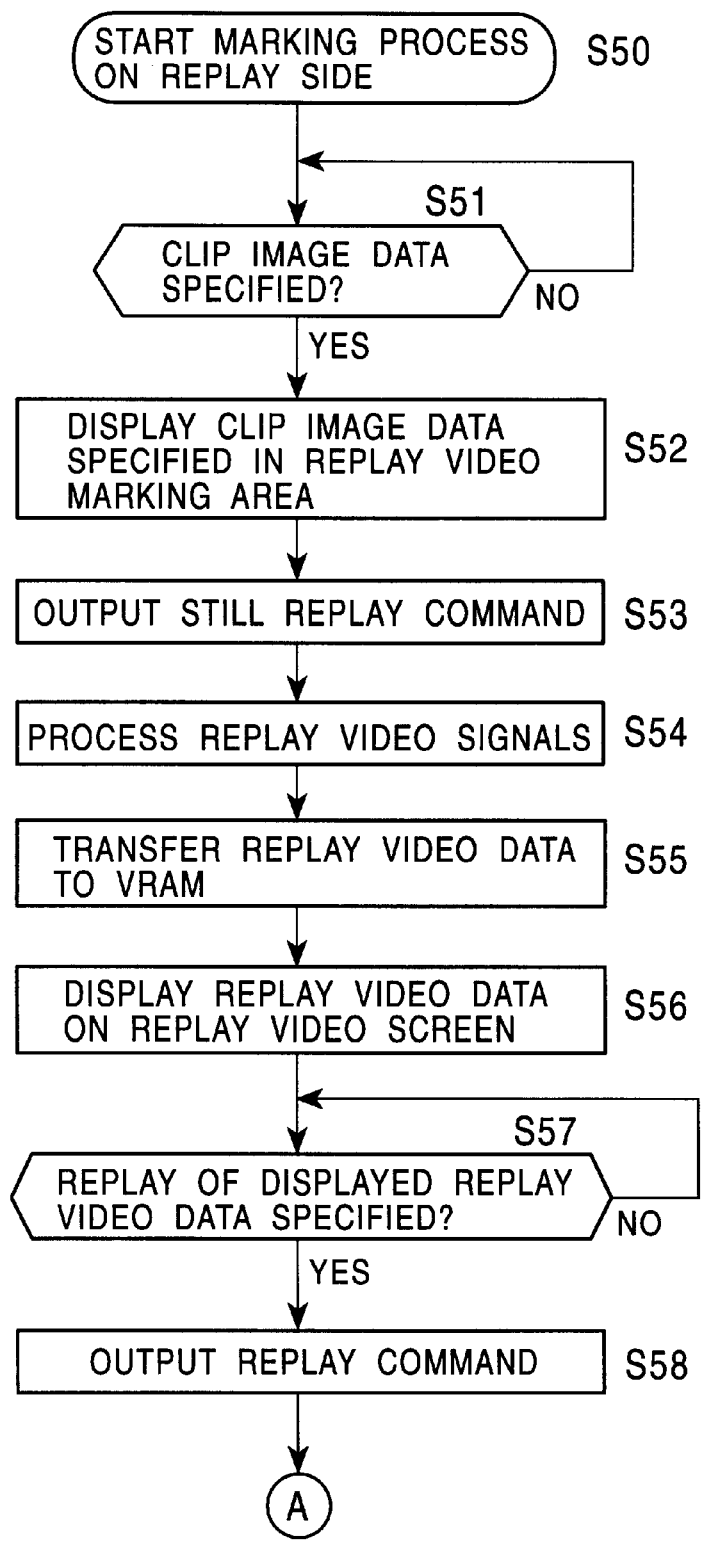
FIG. 27 is a flowchart for describing marking operation at the replay side.
Figure 28:
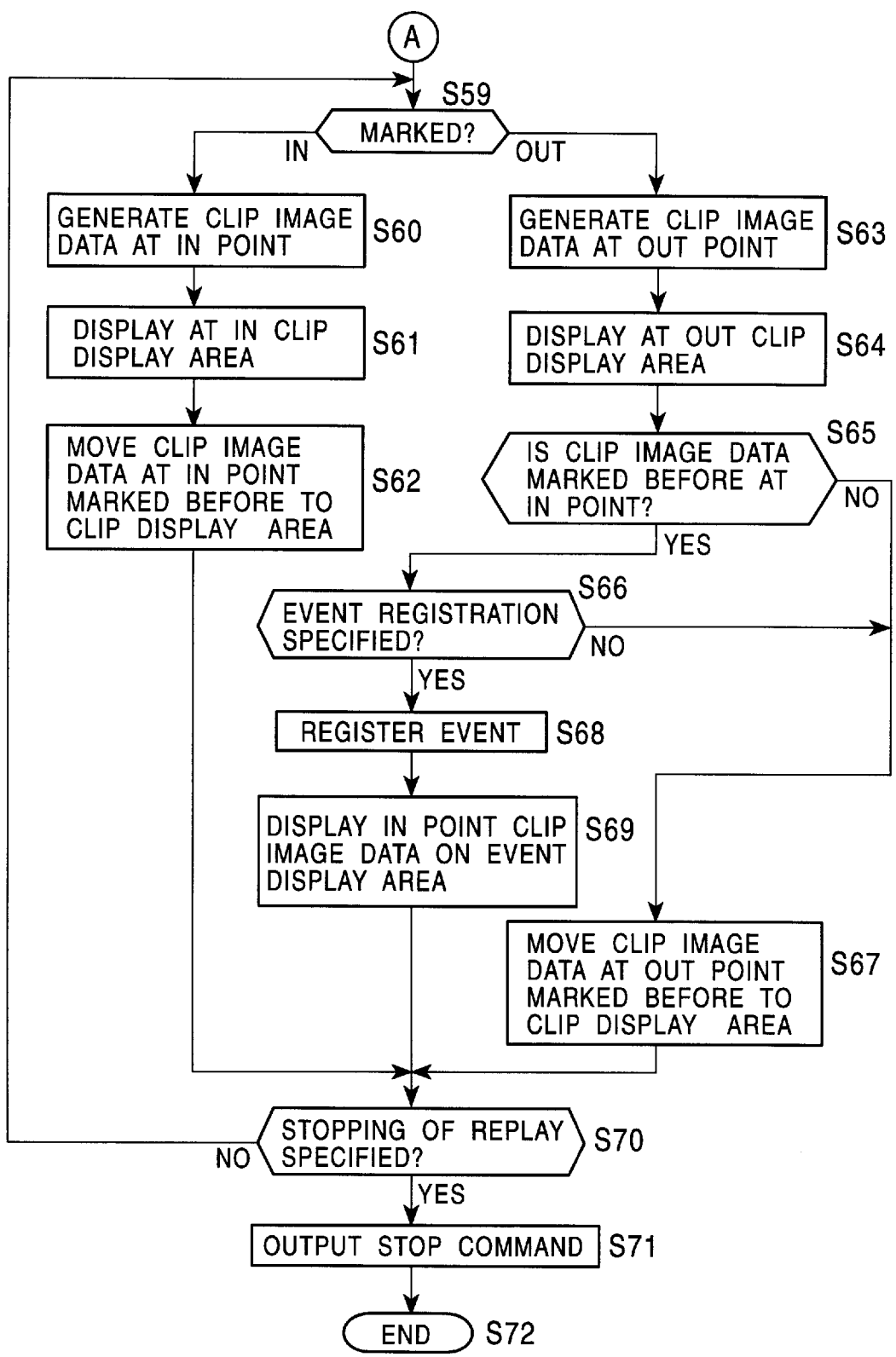
FIG. 28 is another flowchart for describing marking operation at the replay side.

Next, description will be made with reference to FIGS. 27 land 28 regarding the case of marking video signals V3 replayed from the hybrid recorder 3 using the replay video marking area 27 while watching the video signals V6 to which effects are applied as necessary with the picture effects device 6. First, this marking starts from a state wherein clip image data has already been stored. With the flow beginning at step S50, in step S51 the CPU 10 judges whether or not clip image data in the clip display area 28 has been specified. At this time, the CPU 10 judges that clip image data has been specified in the case that the mouse 2d is double-clicked (a clicking operation performed twice in succession) with the cursor in the clip image data display area 28a. If the judgment results show that clip image data has been specified, the specified clip image data is displayed on the replay video marking area 27 in the next step S52. That is, in the event that IN-point clip image data is specified it is displayed in the IN-clip display area 27a, and in the event that OUT-point clip image data is specified it is displayed in the OUT-clip display area 27d.

In the next step S53, the CPU 10 makes reference to the time code of the specified clip image data, and a control command for still replay of the video data at that time code is sent to the external interface 18. Upon receiving the control commands, the external interface 18 converts the replay commands into a communication format according to the RS-422 standard, and sends them to the hybrid recorder 3. The hybrid recorder 3 makes reference to a correlation table for time codes and recording addresses based on the received time code, and reads the video data from the recording address position, thereby replaying the specified video data. This video data is input to the picture effects device 6 as video signals V3, and further is sent out to the second video processor 12 within the computer 2 as video signals V6.

In the next step S54, the second video processor 12 extracts the time code from the video signals V6, and also converts the video signals V6 into digital component video data. The converted video data is input to the frame memory 12c within the second video processor 12, and is temporarily stored.

In the next step S55, the video data stored in the frame memory 12c is transferred to the VRAM 13b, having been reduced to 380 pixels by 240 pixels.

In the next step S56, the replay video data stored in the VRAM 13b is displayed on the replay video screen 23a. In this case, the hybrid recorder 3 does not send real-time video data, but still video data corresponding to the specified clip image data, so a still image is displayed on the replay video screen 23a.

In the next step S57, the CPU 10 judges whether or not replay has been instructed for the still video data displayed on the replay video screen 23a. At this time, in the event that the preview button 32 is clicked in that state that the still video data is displayed on the replay video screen 23a, the CPU 10 judges that replay has been instructed.

In the event that there has been a replay command, in the next step S58, the CPU 10 sends the start replay commands to the external interface 18. upon receiving these, the external interface 18 converts the start replay commands into a communication format according to the RS-422 standard, and sends them to the hybrid recorder 3. Thus, the hybrid recorder 3 reads video data in order from the recording address corresponding to the video data displayed on the replay video screen 23a, thereby generating replay video data following the video data displayed on the replay video screen 23a. The replay video data is input to the picture effects device 6 as video signals V3, and is further sent out to the second video processor 12 within the computer 2 as video signals V6.

In step S59, the CPU judges whether or not marking has been performed. Judgment of whether or not marking has been performed is performed based on whether the mouse 2d has been clicked in a state wherein the cursor is positioned within the mark-IN button 27c or mark-OUT button 27f of the replay video marking area 27. At this time, an interruption command is generated by the clicking operation of the mouse 2d, so the CPU 10 makes judgment regarding marking according to this interruption command. In the case that the mark-IN button 27c is judged to have been clicked, judgment is made that an IN-point has been specified, and the flow proceeds to step S60; in the case that the mark-OUT button 27f is judged to have been clicked, judgment is made that an OUT-point has been specified, and the flow proceeds to step S63.

In step S60, IN-point clip image data is generated. This IN-point clip image data is generated by reading the video data stored in the frame memory 12c into the VRAM 13b. At this time, the amount of data is pruned to ¹⁄₁₆ by means of reducing the number of read-out samples, so clip image data with an image size of 95 pixels by 60 pixels is generated. In the next step S61, the IN-clip image data stored in the storage area for IN-clip display area of the VRAM 13b is read out, and displayed on the IN-clip display area 27a.

In step S62, the IN-point clip image data marked earlier and displayed in the IN-clip display area 27a is moved to the clip display area 28. Incidentally, in the event that no marking has been made beforehand, and there is no clip image data displayed in the IN-clip display area 27a, this process is not performed. When the processing of this step S62 ends, the CPU 10 proceeds to step S70.

On the other hand, in the event that the flow proceeds to step S63 for OUT-point marking, OUT-point clip image data is generated here. This OUT-point clip image data also is generated by reading the video data stored in the frame memory 12c into the VRAM 13b. At this time also, the amount of data is pruned to 1/16 by means of reducing the number of read-out samples, so clip image data with an image size of 95 pixels by 60 pixels is generated. In step S64, the OUT-clip image data stored in the storage area for OUT-clip display area of the VRAM 13b is read out, and displayed on the OUT-clip display area 27d.

In step S65, the CPU 10 judges whether or not the earlier-marked clip image data is IN-point clip image data or not. If the judgment results show that the earlier-marked clip image data is IN-point clip image data, the flow proceeds to step S66, and in the event that the earlier-marked clip image data is OUT-point clip image data, the flow proceeds to step S37. In step S66, the CPU 10 makes judgment whether or not to register this as a new event. This judgment is made based on the clicking operation of the new event button 33. In the event that the new event button 33 is clicked and event registration is specified, the flow proceeds to step S68, and in the event that the new event button 33 is not clicked and event registration is not specified, the flow proceeds to step S67.

In step S68, the CPU 10 registers the section between the IN-point and the OUT-point as an event. Thus, with the editing system 1, marking of an IN-point and an OUT-point followed by the clicking operation of the new event button 33 automatically registers the section between the IN-point and the OUT-point as an event. Incidentally, at this time, second management record data for the event is generated, as shown in FIGS. 13 through 17.

In the next step S69, the IN-point clip image data of the generated event is copied to the event display area 29, and the clip image data is displayed on the event display area 29. When this process is completed, the CPU 10 proceeds to the next step S70.

On the other hand, in the event that the clip image data generated by the earlier marking was OUT-point clip image data and consequently the flow proceeded to step S67, the OUT-point clip image data generated by the earlier marking is moved to the clip display area 28. Incidentally, in the event that no marking has been made beforehand, and there is no clip image data displayed in the OUT-clip display area 27d, this process is not performed. When the processing of this step ends, the CPU 10 proceeds to step S70.

In step S70, the CPU 10 makes judgment whether or not stopping playing the video data displayed in the replay video screen 23a has been instructed. This judgment is made based on whether the still button 408 of the dedicated controller 2e has been pressed or not. In the event that stopping playing has not been instructed, the flow returns to step S59 and repeats the processing, and in the event that stopping playing has been instructed, the flow proceeds to the next step S71. In step S71, the CPU 10 sends stop replay commands to the external interface 18. Upon receiving the stop replay commands, the external interface 18 converts the stop recording commands into a communication format according to RS-422 standards, and sends them to the hybrid recorder 3. The hybrid recorder 3 then ends the reading operation of the video data, thus stopping the replay operation. When the processing of this step S71 ends, the CPU 10 proceeds to step S72 and ends the marking process.

[Trimming]

Figure 29:
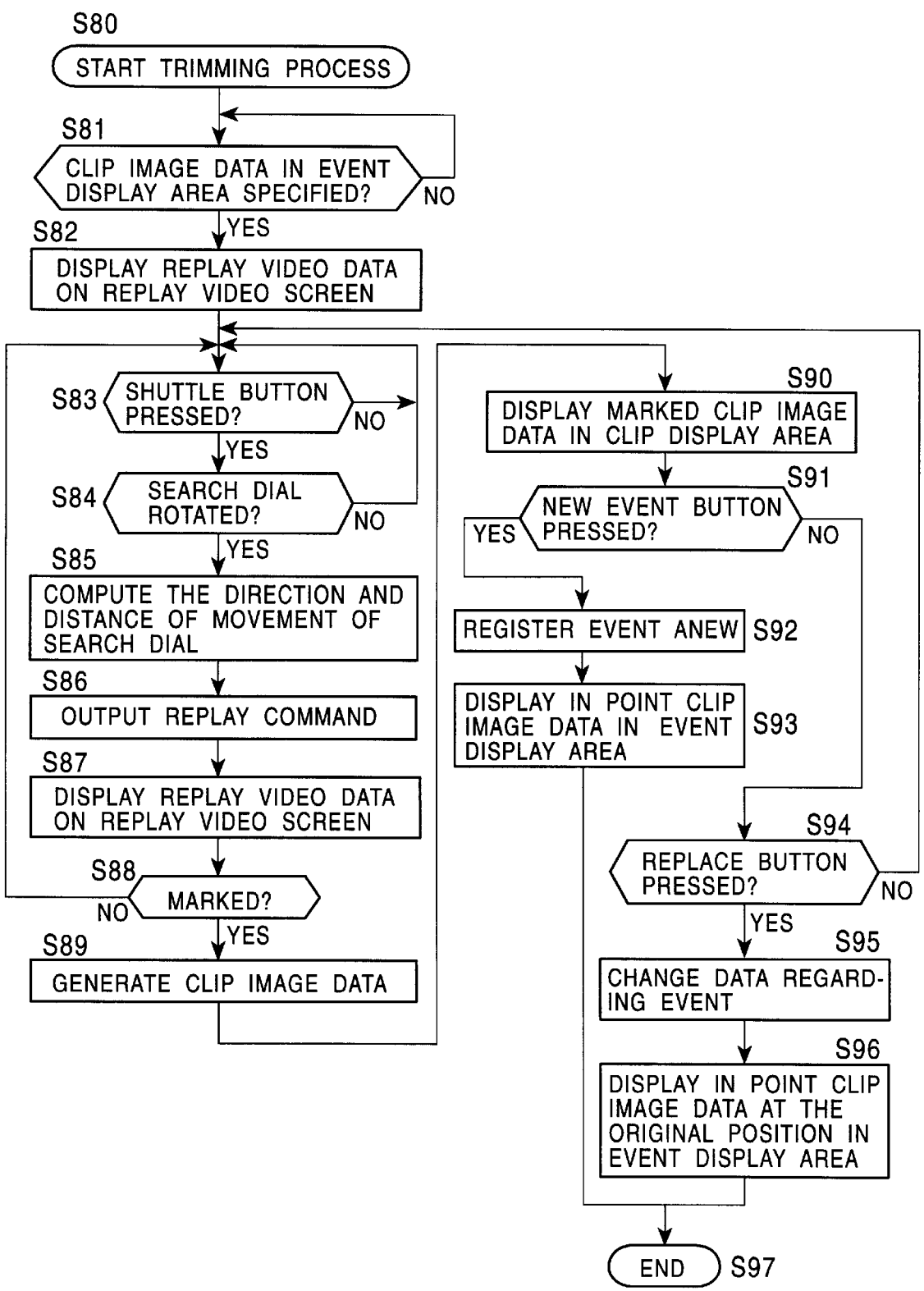
FIG. 29 is a flowchart for describing trimming operation.

Next, description will be made with reference to the flowchart shown in FIG. 29 regarding the process of specifying a generated event and changing the IN-point or OUT-point, i.e., so-called trimming. This flowchart starts from the state wherein the event is already generated.

With the flow beginning at step S80, in step S81 the CPU 10 judges whether or not clip image data in the image display area 29 has been specified. At this time, the CPU 10 judges that the clip image data has been specified in the case that the mouse 2d is double-clicked (a clicking operation performed twice in succession) with the cursor in the clip image data display area 29a. If the judgment results show that clip image data has been specified, in the next step S82 CPU 10 makes reference to the time code of the specified clip image data, and a control command for still replay of the video data at that time code is sent to the hybrid recorder 3 via the external interface 18. The hybrid recorder 3 replays the specified video data based on the replay commands, thereby generating replayed video data. Consequently, replayed video data corresponding to specified clip image data is displayed on the replay video screen 23a.

In the next step S83, the CPU 10 judges whether the shuttle button 411 of the dedicated controller 2e has been pressed or not. In the event that the shuttle button 411 has been pressed, the flow proceeds to the next step S84, and here the CPU 10 judges whether the search dial 400 of the dedicated controller 2e has been rotated or not. In the event that the search dial 400 has been rotated, the flow proceeds to step S85, and the CPU 10 calculates the direction and distance that the search dial 400 has moved. Then the CPU 10 calculates the time code of the specified video data based on the calculated direction and distance, and the time code of the video data currently displayed on the replay video screen 23a. Specifically, in the event that the direction of rotation is to the right, the time code of the specified video data is calculated by adding time code corresponding with the amount of distance to the time code of the video data currently displayed; and in the event that the direction of rotation is to the left, the time code of the specified video data is calculated by subtracting time code corresponding with the amount of distance from the time code of the video data currently displayed.

In step S86, the CPU 10 sends replay commands to the hybrid recorder 3 via the external interface 18 in order to replay the video data at the calculated time code.

In step S87, the hybrid recorder 3 replays the video data at the specified time code based on these replay commands, and thus the replay video data of the specified time code is displayed on the replay video screen 23a.

In step S88, the CPU 10 judges whether or not marking has been performed. Judgment of whether or not marking has been performed is performed based on whether the mouse 2d has been clicked in a state wherein the cursor is positioned within the mark-IN button 27c or mark-OUT button 27f of the replay video marking area 27. In the case that one of the mark-IN button 27c or mark-OUT button 27f is judged to have been clicked, the flow proceeds to step S89. If neither has been clicked, the flow returns to step S83 and repeats the processing.

In step S89, marked clip image data is generated. This clip image data is generated by reading the video data stored in the frame memory 12c into the VRAM 13b. At this time, the amount of data is pruned to 1/16 by means of reducing the number of read-out samples, so clip image data with an image size of 95 pixels by 60 pixels is generated.

In step S90, the clip image data stored in the VRAM 13b is read out, and displayed on the IN-clip display area 27a or the OUT-clip display area 27d of the replay video marking area 27. Specifically, in the event that IN-clip marking has been made, the clip image data is displayed on the IN-clip display area 27a, and in the event that OUT-clip marking has been made, the clip image data is displayed on the OUT-clip display area 27d.

In step S91, the CPU 10 judges whether or not the new event button 33 has been pressed. Judgment of whether or not the new event button 33 has been pressed is performed based on whether the mouse 2d has been clicked in a state wherein the cursor is positioned over the new event button 33. In the event that the new event button 33 has been clicked the flow proceeds to step S92, and in the event that the new event button 33 has not been clicked the flow proceeds to step S94.

In step S92, the IN-point or OUT-point is replaced with clip image data marked in step S88, and this is registered as a new event. For example, in the event that judgment is made that in step S88 an IN-point was marked, the section between that IN-point and the already-registered OUT-point are registered as a new event; in the event that judgment is made that in step S88 an OUT-point was marked, the section between that OUT-point and the already-registered IN-point are registered as a new event. Incidentally, at this time, second management record data for the event is generated, as shown in FIGS. 13 through 17.

In the next step S93, the clip image data for the new IN-point for the new event is displayed in the event display area 29. When this process is ended, the CPU 10 proceeds to the next step S97 and ends the trimming process.

On the other hand, in the event that the flow proceeds to step S94 because the new event button 33 has not been pressed, the CPU 10 judges whether or not the replace button 35 has been pressed. Judgment of whether or not the replace button 35 has been pressed is performed based on whether the mouse 2d has been clicked in a state wherein the cursor is positioned over the replace button 35. In the event that the replace button 35 has been clicked the flow proceeds to step S95, and in the event that the replace button 35 has not been clicked the flow returns to step S83 and repeats the process.

In step S95, the IN-point or OUT-point is replaced with clip image data judged to have been marked in step S88. At this time, only the contents of the second management record data for the event are replaced with the clip image data of the marked IN-point or OUT-point, so a new event is not registered, rather, the contents of the old event are simply updated.

In the next step S96, the clip image data for the IN-point for the updated event is displayed at the original position in the event display area 29. When this process is ended, the CPU 10 proceeds to the next step S97 and ends the trimming process.

[Pre-roll]

Figure 30:
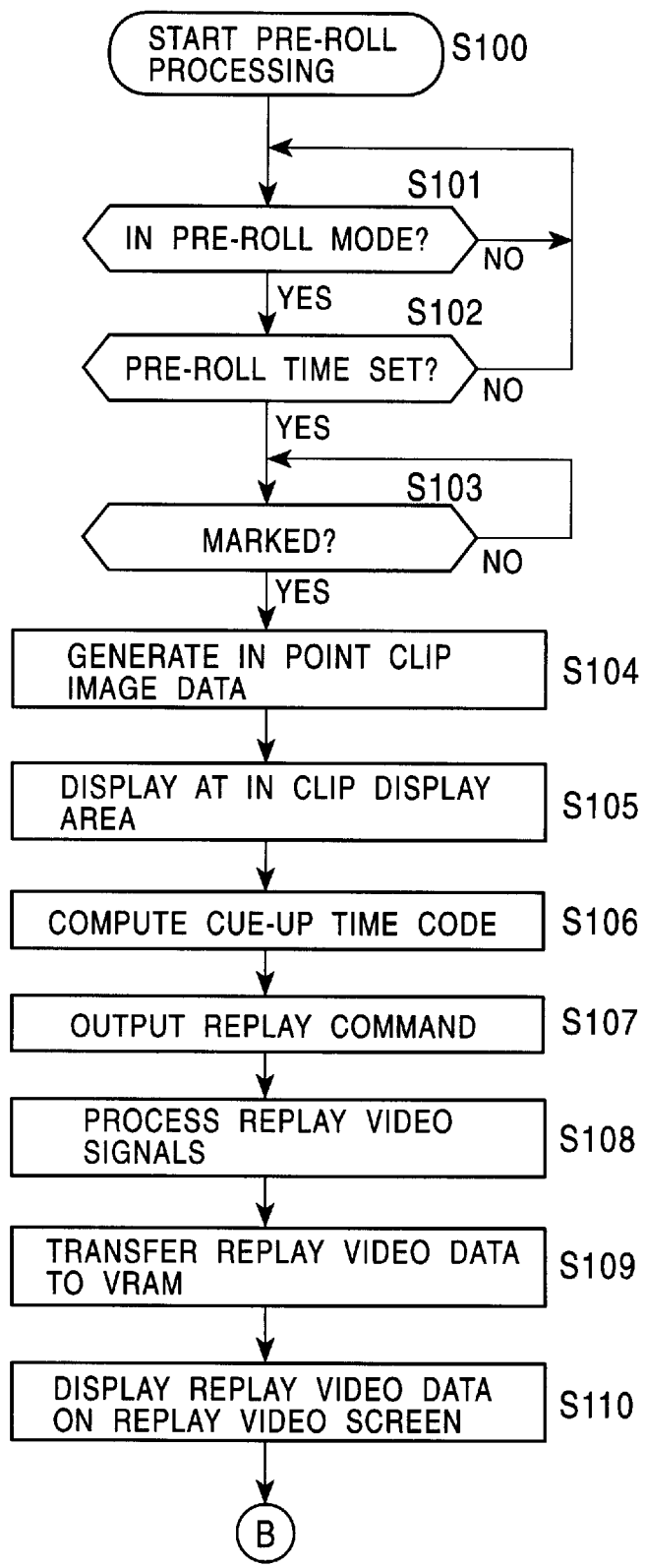
FIG. 30 is a flowchart for describing pre-roll operation.
Figure 31:
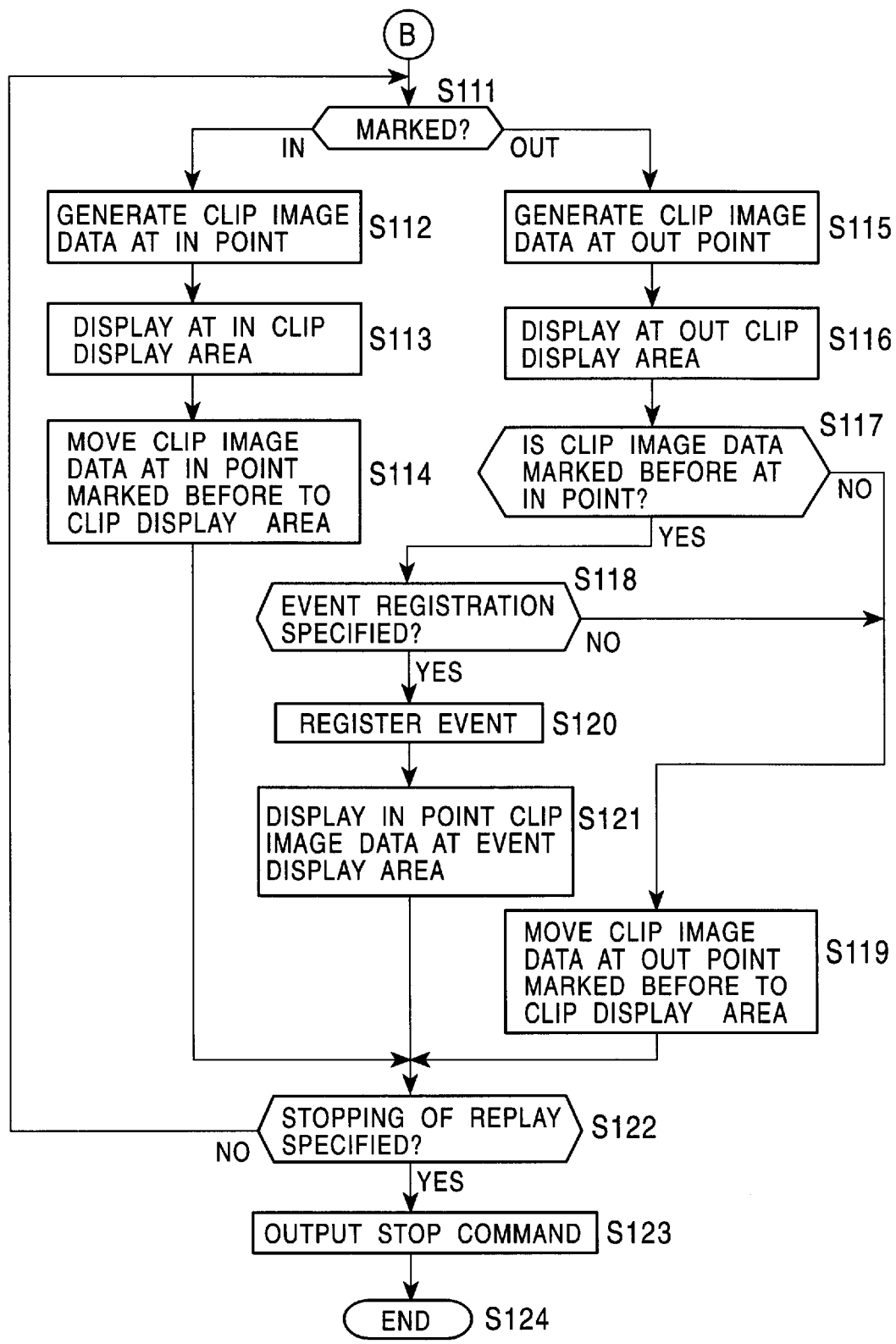
FIG. 31 is another flowchart for describing pre-roll operation.

Next, description will be made with reference to FIGS. 30 and 31 regarding the pre-rolling operation for automatically starting replay operation from a position reaching back by a certain amount of time from a specified marking point, so as to correct the marking point. Incidentally, the flowcharts start from a state wherein the hybrid recorder 3 has started the recording operation of video signals V1 and video signals V2 are displayed on the recorded video screen 21a.

First, starting with step S100, in step S101, the CPU 10 judges whether or not activation of the pre-roll mode has been set or not. This judgment is made based on whether the pre-roll button 22e in the timing display area 22 has already been clicked and activation of the pre-roll mode has been specified.

In the next step S102, the CPU 10 judges whether or not the above-described cue-up time serving as the pre-roll time has been already set in the preferences settings or not. This judgment is made based on whether cue-up time is stored in the storage area for preferences settings data in the RAM 10b or not. In the event that the judgment shows that activation of the pre-roll mode has been specified and the pre-roll time has been set, the CPU 10 proceeds to the next step S103.

In step S103, the CPU 10 judges whether or not the mark-IN button 24c in the recorded video marking area 24 has been clicked and IN-point marking has been performed. In the event that judgment is made that an IN-point has been marked, the flow proceeds to step S104 where IN-point clip image data is generated. This clip image data is generated by reading the video data stored in the frame memory 11c into the VRAM 13b. At this time, the amount of data is pruned to 1/16 by means of reducing the number of read-out samples, so clip image data with an image size of 95 pixels by 60 pixels is generated.

In step S105, the video data stored in the VRAM 13b is read out and displayed in the IN-clip display area 24a of the recorded video marking area 24. Next, in step S106, the CPU 10 calculates the time-code for cue-up. Specifically, the CPU 10 makes reference to the time code of the specified IN-point clip image data, and also makes reference to the set cue-up time, and thereby calculates the time code for a position shifted from the specified IN-point by the amount of cue-up time (i.e., the replay start position).

In the next step S107, the CPU 10 sends start replay commands for replaying the video data in real-time from the position of the calculated time code to the external interface 18. Upon receiving these, the external interface 18 converts the start replay commands into a communication format according to the RS-422 standard, and sends them to the hybrid recorder 3. Thus, the hybrid recorder 3 sequentially reads video data in order from the recording address corresponding to the specified time code, thereby generating replay video data starting from the specified time code. The replay video data is input to the picture effects device 6 as video signals V3, and is further sent out to the second video processor 12 within the computer 2 as video signals V6.

In the next step S108, the second video processor 12 extracts the time code from the video signals V6, and also converts the video signals V6 into digital component video data. The converted video data is input to the frame memory 12c within the second video processor 12, and is temporarily stored.

In step S109, the video data stored in the frame memory 12c is transferred to the VRAM 13b, having been reduced to 380 pixels by 240 pixels.

In step S110, the replay video data stored in the VRAM 13b is displayed on the replay video screen 23a. Thus, real-time replay video data starting from a position reaching back by the cue-up time from the IN-point specified by the operator is displayed on the replay video screen 23a.

In the next step S111, the CPU 10 judges whether or not marking has been performed. Judgment of whether or not marking has been performed is performed based on whether the mouse 2d has been clicked in a state wherein the cursor is positioned within the mark-IN button 27c or mark-OUT button 27f of the replay video marking area 27. In the case that the mark-IN button 27c is judged to have been clicked, judgment is made that an IN-point has been specified, and the flow proceeds to step S112; in the case that the mark-OUT button 27f is judged to have been clicked, judgment is made that an OUT-point has been specified, and the flow proceeds to step S115.

In step S112, IN-point clip image data is generated. This clip image data is generated by reading the video data stored in the frame memory 12c into the VRAM 13b. At this time, the amount of data is pruned to 1/16 by means of reducing the number of read-out samples, so clip image data with an image size of 95 pixels by 60 pixels is generated. In step S113, the video data stored in the VRAM 13b is read out and displayed in the IN-clip display area 27a. In step S114, the IN-point clip image data marked earlier and displayed in the IN-clip display area 27a is moved to the clip display area 28. Incidentally, in the event that no marking has been made beforehand, and there is no clip image data displayed in the IN-clip display area 27a, this process is not performed. When the processing of step S114 ends, the CPU 10 proceeds to step S122.

On the other hand, in the event that the flow proceeds to step S115 for OUT-point marking, OUT-point clip image data is generated. This clip image data also is generated by reading the video data stored in the frame memory 12c into the VRAM 13b. At this time also, the amount of data is pruned to 1/16 by means of reducing the number of read-out samples, so clip image data with an image size of 95 pixels by 60 pixels is generated. In step S116, the video data stored in the VRAM 13b is read out and displayed in the OUT-clip display area 27d.

In step S117, the CPU 10 judges whether or not the earlier-marked clip image data is IN-point clip image data or not. If the judgment results show that the earlier-marked clip image data is IN-point clip image data, the flow proceeds to step S118, and in the event that the earlier-marked clip image data is OUT-point clip image data, the flow proceeds to step S119.

In step S118, the CPU 10 makes judgment whether or not to register this as a new event. This judgment is made based on the clicking operation of the new event button 33. in the event that the new event button 33 is clicked and event registration is specified, the flow proceeds to step S120, and in the event that the new event button 33 is not clicked and event registration is not specified, the flow proceeds to step S119.

In step S120, the CPU 10 registers the section between the IN-point and the OUT-point as an event. Incidentally, at this time, second management record data for the event is generated, as shown in FIGS. 13 through 17. In the next step S121, the IN-point clip image data of the generated event is copied to the event display area 29, and the clip image data is displayed on the event display area 29. When this process is completed, the CPU 10 proceeds to the next step S122.

On the other hand, in the event that the clip image data generated by the earlier marking was OUT-point clip image data and consequently the flow proceeded to step S119, the OUT-point clip image data generated by the earlier marking is moved to the clip display area 28. Incidentally, in the event that no marking has been made beforehand, and there is no clip image data displayed in the OUT-clip display area 27d, this process is not performed. When the processing of step S119 ends, the CPU 10 proceeds to step S122.

In step S122, the CPU 10 makes judgment whether or not stopping playing the video data displayed in the replay video screen 23a has been instructed. In the event that stopping playing has not been instructed, the flow returns to step S111 and repeats the processing, and in the event that stopping playing has been instructed, the flow proceeds to the next step S123.

In step S123, the CPU 10 sends stop replay commands to the external interface 18. Upon receiving the stop recording commands, the external interface 18 sends them to the hybrid recorder 3. The hybrid recorder 3 then ends the reading operation of the video data, thus stopping the replay operation. When the processing of this step S123 ends, the CPU 10 proceeds to step S124 and ends the pre-roll process.

[Creating Programs]

Figure 32:
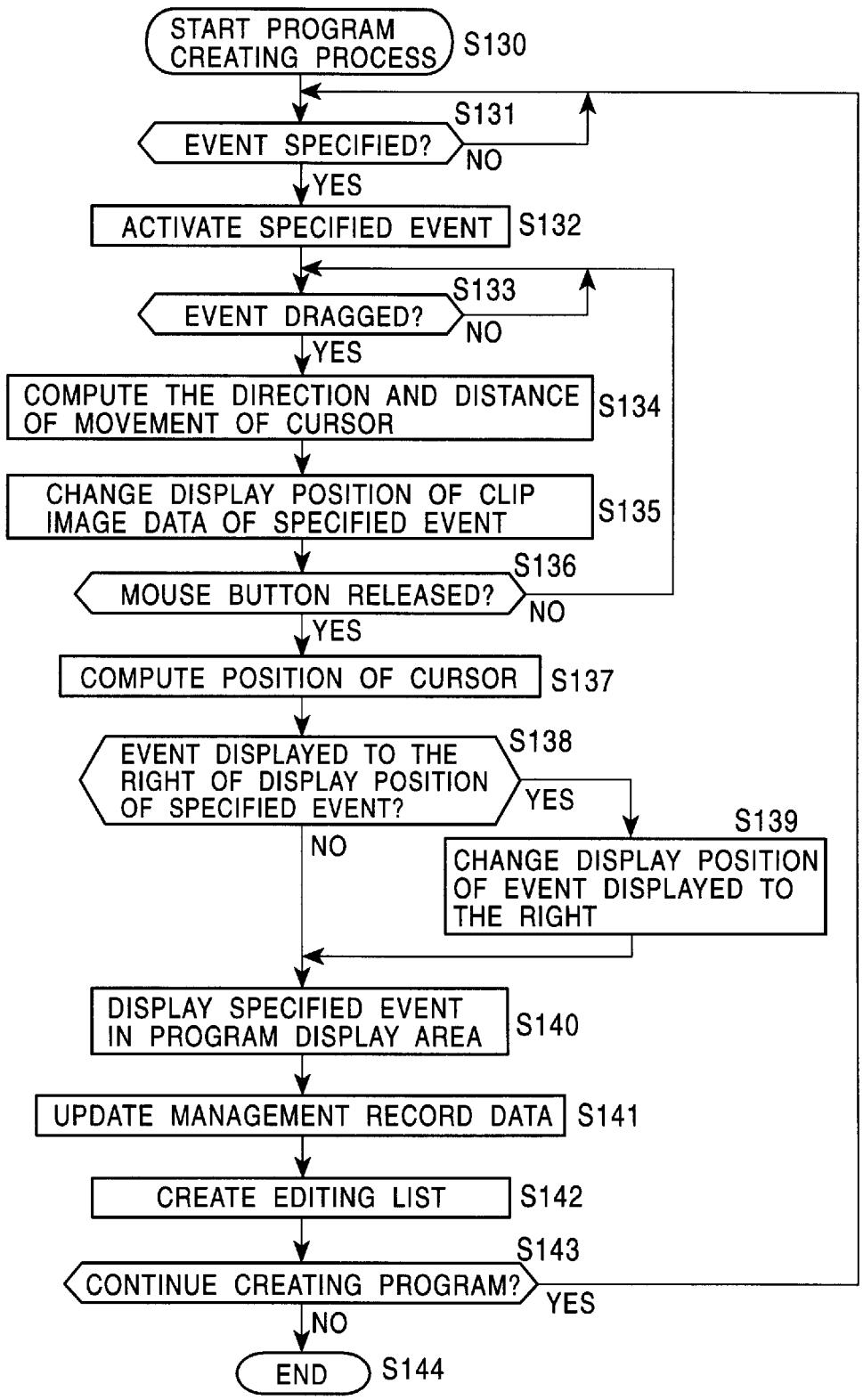
FIG. 32 is a flowchart for describing program-creating operation.

Next, description will be made with reference to the flowchart in FIG. 32 regarding the processing for using events to create a program. Incidentally, the flowcharts start from a state wherein events have already been generated. First, starting with step S130, in step S131, the CPU 10 judges whether or not an event has been specified. At this time, the CPU 10 judges that an event has been specified in the case that the mouse 2d is double-clicked (a clicking operation performed twice in succession) with the cursor in the clip image data display area 29a of the event display area.

If the judgment results show that the event has been specified, in the next step S132 the CPU 10 places the specified event in an active state, i.e., a movable state.

In the next step S133, the CPU 10 judges whether or not the cursor has been moved with the mouse 2d button clicked, i.e., whether or not it has been dragged. If the judgment results show that it has been dragged, the direction and distance of movement of the cursor is calculated in the next step S134. In the next step S135, the display position of the clip image data of the specified event is changed based on the calculated direction and distance. Incidentally, the processing from step S133 to step S135 is performed rapidly, so it appears on the monitor 2b as if the clip image data of the event is moving with the cursor.

In step S136, the CPU 10 judges whether or not the clicked button of the mouse 2d has been released or not, i.e., whether the click has been disengaged. If the judgment results show that the click has not been disengaged, the flow returns to step S133 and repeats the processing; but if the judgment results show that the click has been disengaged, the flow proceeds to step S137 and the position at which the click was disengaged is calculated.

In step S138, the CPU 10 judges whether or not there are any other events displayed to the right of the display position of the event specified by this cursor position. In the event that the judgment results show that there are other events displayed to the right, the flow proceeds to step S139, and in the event that the judgment results show that there are no other events displayed to the right, the flow proceeds to step S140.

In step S139, the CPU 10 shifts the display positions of the events displayed to the right thereof further to the right, so that the specified event can be inserted. Once this is completed, the CPU proceeds to step S140.

In step S140, the CPU 10 displays the clip image data of the specified event at the position on the program display area 30 specified by the cursor. In step 141, the CPU 10 updates the data contents of the second management record data in accordance with the insertion of the event in step S140. Specifically, the pointer portion within the second management record data linked to the data before or behind is corrected. Incidentally, there is no second management record data for a newly-inserted event, so one is newly generated.

When this processing ends, the CPU proceeds to the next step 142 and creates an editing list, further proceeds to the next step 143 and judges whether or not to continue the program creating process. In the event of continuing the program creating process, the flow returns to step S131, and in the event of ending the program creating process, the flow proceeds to step S144 and ends the processing.

Thus, in the course of arraying certain events in the program display area 30, selecting certain effects from the picture effects set-up area 25 and inserting them to the certain positions as described with reference to FIG. 14, effects can be applied to the events.

Figure 33:
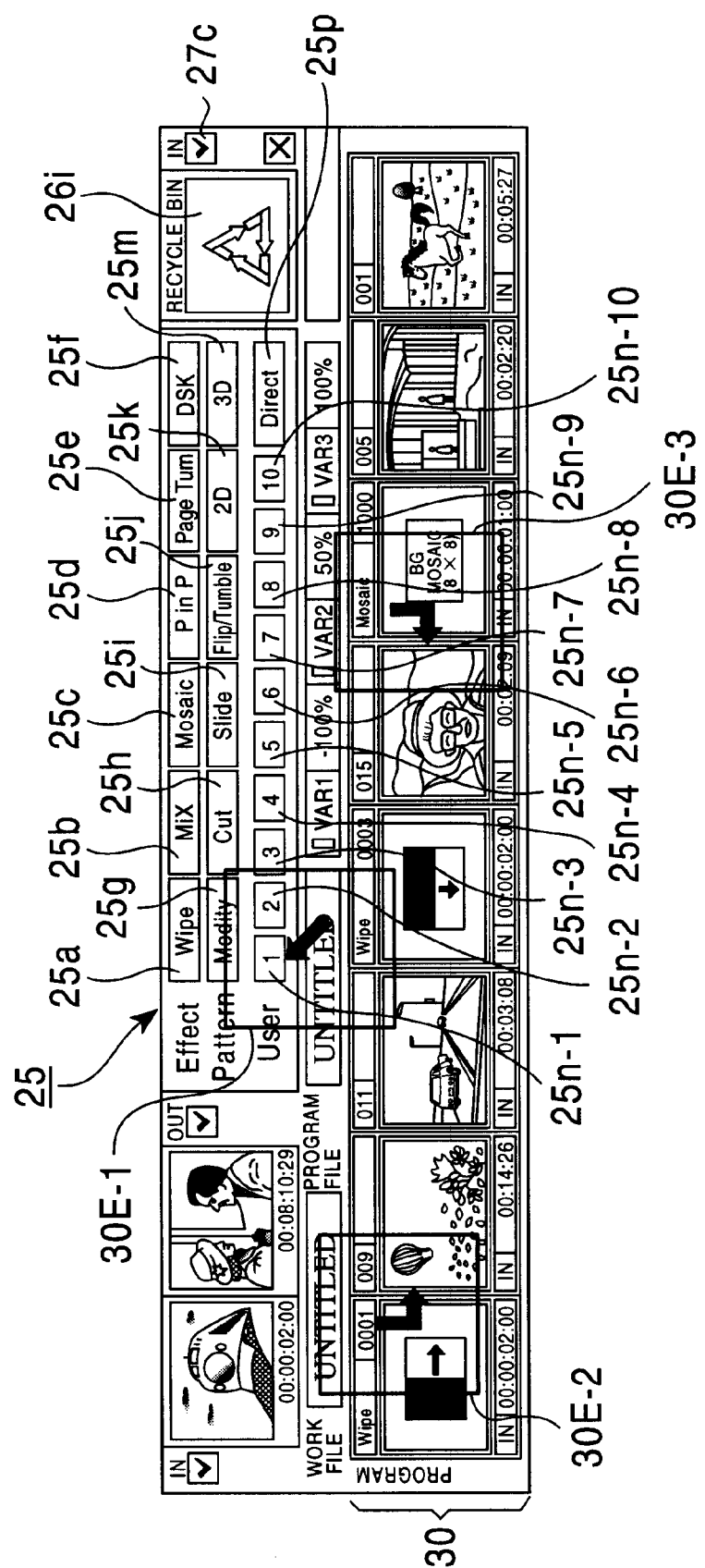
FIG. 33 is a diagram illustrating an example of display of the image effects set-up area.

Now, the picture effects set-up area 25 will be described with reference to FIG. 33. As shown in FIGS. 5, 6, and 33, the picture effects set-up area 25 has buttons 25a through 25m, buttons 25n-1 through 25n-10, and a button 25p. The buttons 25a through 25m are buttons operated when setting certain effects that have been prepared beforehand. In the present example, button 25a corresponds with the effect "Wipe", button 25b with "Mix", button 25c with "Mosaic", button 25d with "P-in-P" (Picture-in-Picture), button 25e with "Page Turn", button 25f with "DSK", button 25g with "Modify", button 25h with "Cut", button 25i with "Slide", button 25j with "Flip/Tumble", button 25k with "2-D", and button 25m with "3-D".

Wipe is an effect which erases an old image as it were being wiped away, and inserting a new image instead. Mix is an effect which fades out an old image and fades in a new one. Mosaic is an effect which gives the image a mosaic look. Picture-in-Picture is an effect which displays a reduced image within another larger image. Page Turn is an effect which switches from an old image to a new image as if turning a page. DSK is an effect for inserting characters and shapes into an image which has already been subjected to effects.

Modify is an effect which performs actions such as sectioning the image horizontally or vertically, making mirror images, enlarging one portion of the image over the entire screen, providing spotlight effects, and so forth. Cut is an effect which switches an old image with a new image instantly. Slide is an effect which slides a new image onto the screen over the old image from one side of the screen. 2-D is an effect which rotates the image two-dimensionally, and 3-D is an effect which rotates the image three-dimensionally.

The buttons 25n-1 through 25n-10 are buttons to which effects at preset values are registered beforehand by the user. Accordingly, operating a button 25n-i brings up the effects set thereto beforehand.

Figure 46:
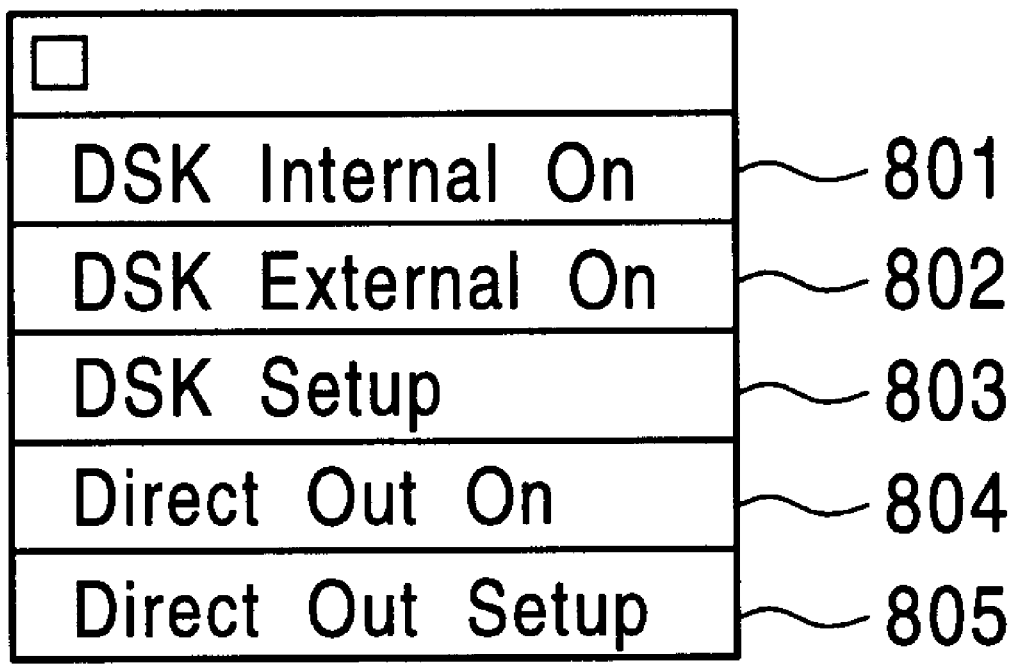
FIG. 46 is a diagram illustrating an example of display of the direct effects operating window.

The button 25p is a direct button, and pressing this button displays a pull-down direct effects operating window (described later with reference to FIG. 46).

Figure 34:
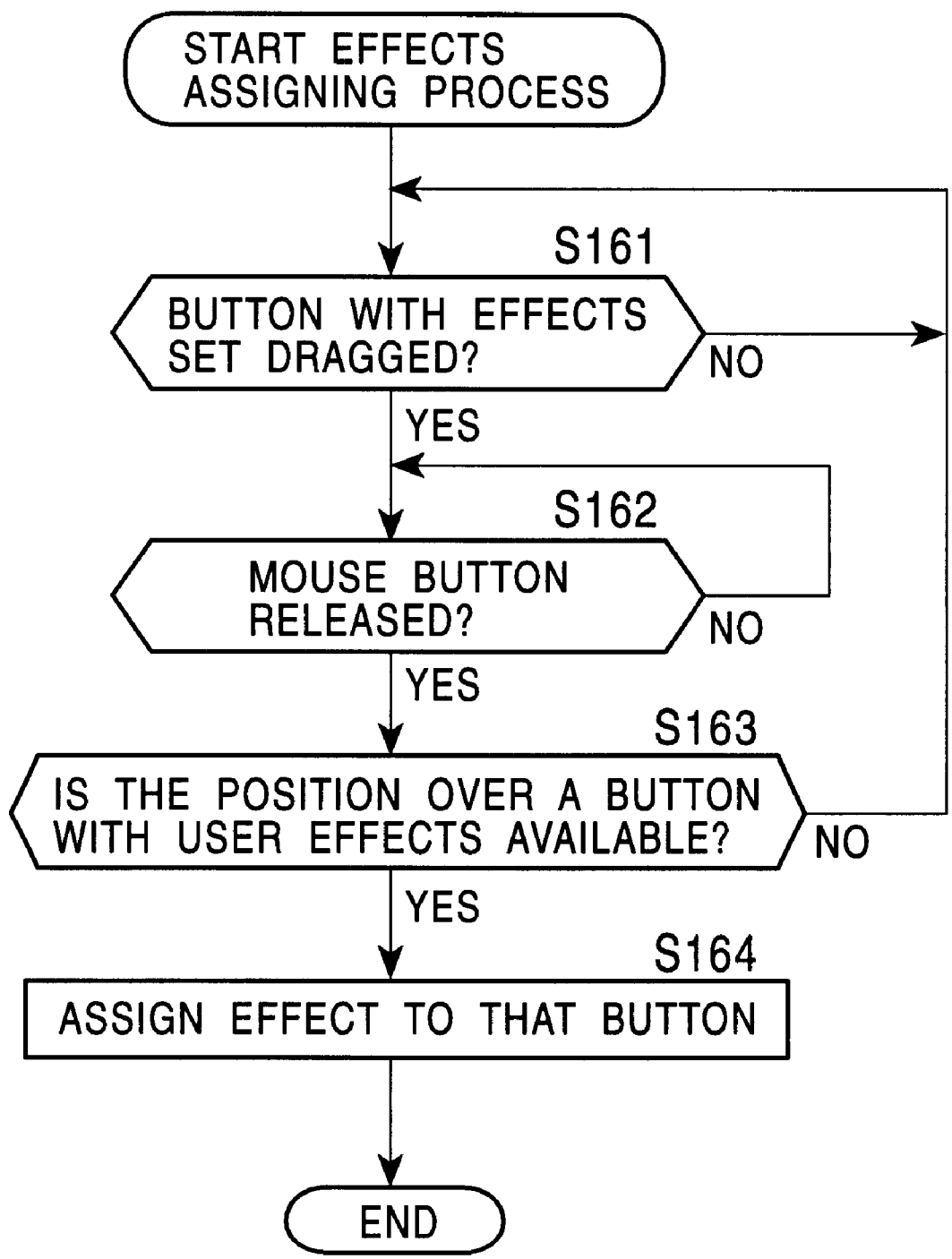
FIG. 34 is a flowchart for describing effects assigning process.

Now, making reference to the flowchart in FIG. 34, description will be made regarding the process of the user appropriating the set certain effects to the buttons 25n-1 through 25n-10. In the case of appropriating certain effects to one of the buttons 25n-1 through 25n-10, the user selects a button in the picture effects set-up area 25 for which effects have been set, and drags it for example, the Wipe button 25a can be turned on, and the parameters thereof set, as described later. In the event of using the wipe effects based on the set parameters, the button 25a is used thereafter, but in the event the user desires to use wipe effects based on parameters set to other values (i.e., in the case the user uses two or more types of wipes according to situation), the first wipe effect of which the parameter values have been set to a certain value can be appropriated to the button 25n-1, for example. Thus, in the case of using first wipe which has been set to these values, the button 25n-1 can be used. The button 25a can be used for a second wipe with the values thereof set to other values.

To this end, effects that have been set to the button 25a are appropriated to the button 25n-1 by operating the mouse 2d so as to drag and drop the button 25a on top of the button 25n-1. Accordingly, in step S161, the CPU 10 waits until the button to which the effects are registered is dragged, and in the event that it is dragged, the flow proceeds to step S162, and judges whether or not the button of the mouse 2d has been released. In the event that the button of the mouse 2d has been released, the flow proceeds to step S163, and judges whether or not the position at which the button of the mouse 2d was released is over a button to which effects can be appropriated, i.e., over one of the buttons 25n-1 through 25n-10. In the event that the button of the mouse 2d was released at a position other than over one of the buttons 25n-1 through 25n-10, the appropriating process cannot be conducted so the flow returns to step S161.

In step S163, in the event that the button of the mouse 2d was released (dropped) at a position over one of the buttons 25n-1 through 25n-10, the flow proceeds to step S164, and the effects set to the button being dragged are appropriated to the button on which it was dropped. For example in the event that button 25a is dragged and dropped on button 25n-1, the effects set to the button 25 are appropriated to the button 25n-1.

Next, description will be made with reference to the flowchart shown in FIG. 35 regarding the setting processing for dragging and dropping certain effects setting clip image data on top of the program display area 30, thereby adding effects to a certain event.

Figure 36:
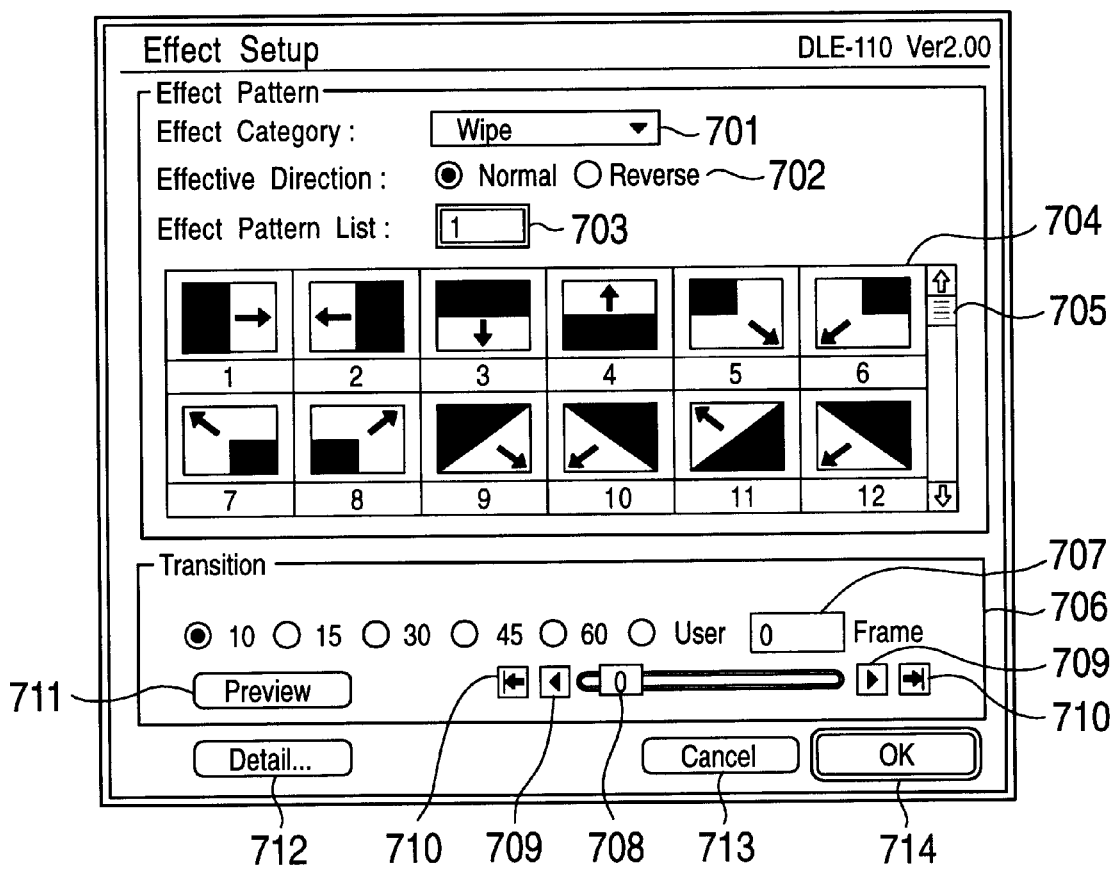
FIG. 36 is a diagram illustrating an example of display of the effects set-up dialog box.

First, in step S201, the flow waits until one of the buttons 25a through 25p or buttons 25n-1 through 25n-10 in the picture effects set-up area 25 is pressed. In step S201, in the event that judgment is made that one of the buttons in the picture effects set-up area 25 has been pressed, the flow proceeds to step S202, and the CPU 10 displays a dialog corresponding to the button operated at this time. For example, in the event that the Wipe button 25a has been operated, a pull down display of an effects set-up dialog box such as shown in FIG. 36 comes up. The display portion 701 of this dialog box displays the name of the effects corresponding to the effects set-up dialog box. In this case, the Wipe button 25a has been operated, so the word "Wipe" is displayed here. In the event that the Mix button 25b or the Mosaic button 25c had been operated, the display portion 701 of this dialog box would have displayed the word "Mix" or "Mosaic".

The display portion 702 shows the direction in which the effect is to be applied. Selecting "Normal" causes the effect to be applied following the flow of time, and selecting "Reverse" causes the effect to be applied countering the flow of time. The display portion 703 displays the No. of a pattern selected from the effect patterns displayed on the display portion 704. The display portion 704 shows 12 types of wipe patterns, in this case. Operating the slide button 705 allows the operator to display on the display portion 704 patterns not displayed here. The user selects a desired pattern by clicking on it with the mouse 2d. The No. of the pattern thus selected is displayed on the display portion 703.

The display portion 706 displays the duration of the effect (from start to end of the effect) for setting the number of frames. The user selects one of the following to directly set the number of frames: 10, 15, 30, 45, or 60. Or, the user can operate the slide button 708 and the quick buttons 709 and 710 to display an arbitrary number of frames on the display portion 707, and set this number. The preview button 711 is operated for setting the various parameters and confirming the actual change the parameters cause.

The cancel button 713 is operated when canceling the set parameters, and the OK button is operated when the setting of the parameters has been completed. The details button 712 is operated when setting even more detailed effects parameters. In the event that the details button 712 has been operated, a pull-down display of an effects detailed settings dialog box such as shown in FIG. 37 comes up.

Figure 37:
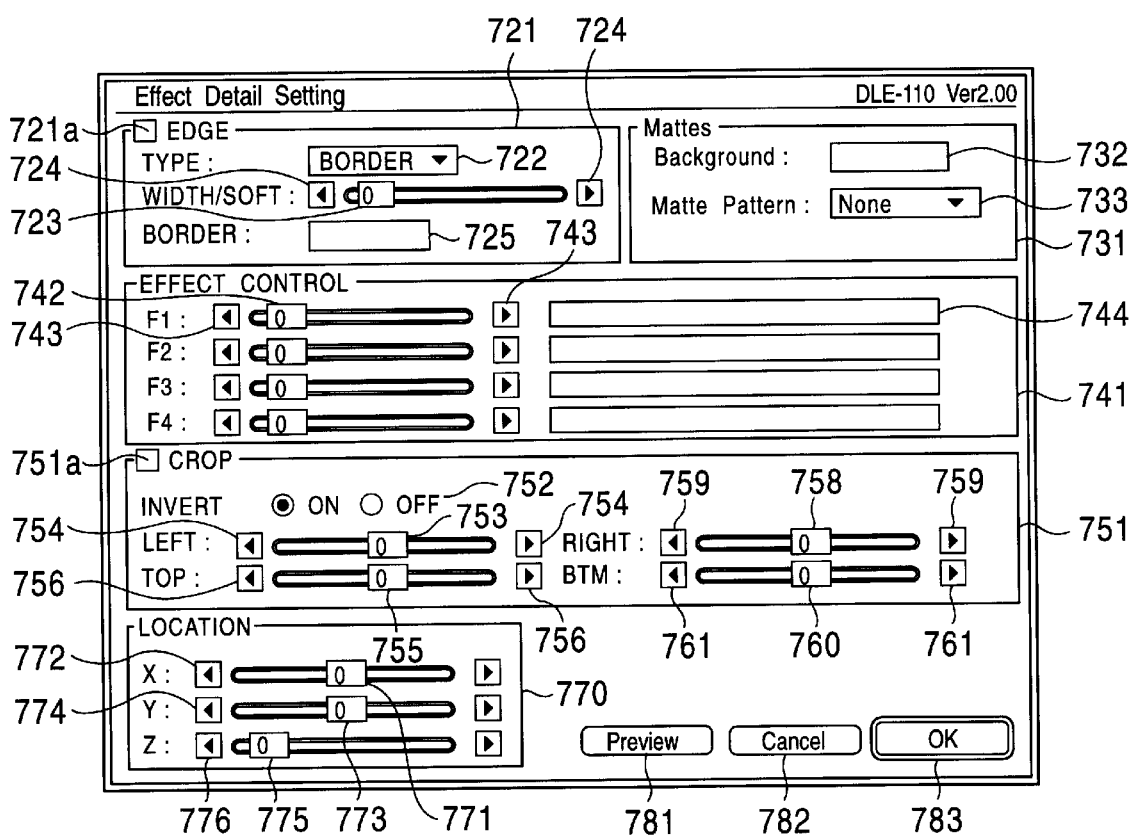
FIG. 37 is a diagram illustrating an example of display of the effects detailed settings dialog box.

The effects detailed settings dialog box shown in FIG. 37 displays parameters relating to the edge in the display portion 721. The types of edges from which selection can be made are "border" and "soft". Provided below the display portion 722 are a slide button 723 and scroll button 723. Operating these with the mouse 2*d* and positioning the slide button 723 at the certain position allows the width of the edge to be set to a certain value. The check-box 725 is used for selecting the color of the border. Checking the check-box 725 displays a Color Picker dialog box (not shown), and the user can thus select the color of the border. The check button 721*a* is operated when validating the display settings made in the display portion 721.

The display portion 731 displays parameters relating to background pattern and background color matte separate from the background or foreground at the time executing the effects. The display portion 732 displays parameters for the background, and the display portion 733 displays matte pattern Nos.

The display portion 741 displays parameters for effects control. In this example, the effect parameter names are displayed in the display portion 744, and the parameter by that name can be set to certain values by operating the slide button 742 or the scroll button 743. In this example, unique parameter settings can be made for the selected effect.

The display portion 751 displays the parameters for "Crop" which makes the picture frame smaller so that only a portion of the image is visible at the time of executing the effects, and the parameters are set here. Settings can be made in the display portion 752 regarding whether to invert (ON) the crop area or to not invert (OFF) the crop area. The left edge of the crop area can be set using the slide button 753 and the scroll button 754, the right edge of the crop area can be set using the slide button 758 and the scroll button 759, the top of the crop area can be set using the slide button 755 and the scroll button 756, and the bottom of the crop area can be set using the slide button 760 and the scroll button 761. The check button 751*a* is operated when validating the display settings made in the display portion 751.

The display portion 770 displays buttons for inputting the X-Y-Z coordinates. The X-coordinates are input using the slide button 771 and the scroll button 772, the Y-coordinates are input using the slide button 773 and the scroll button 774, and the Z-coordinates (size) are input using the slide button 775 and the scroll button 776. This input is performed in the case the selected effect pattern calls for coordinates settings.

Further, the OK button 783 is operated in the case of finalizing the set effects, the cancel button 782 is operated in the case of canceling the set parameters, and the preview button 781 is operated in the case of confirming the set parameters.

Figure 35:
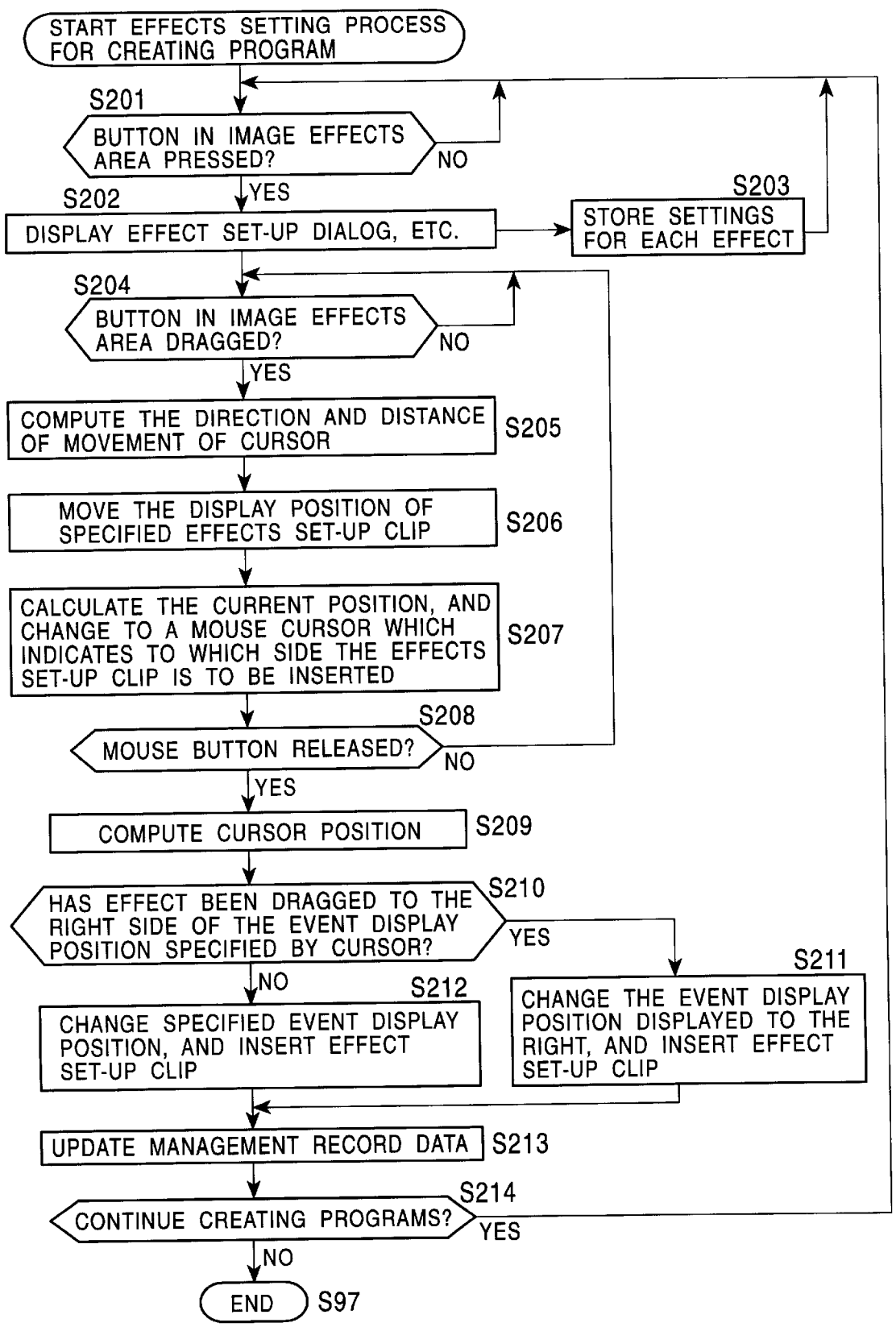
FIG. 35 is a flowchart for describing the effects set-up processing when creating a program.

Returning to the description for FIG. 35: setting the parameters as described above using the effects set-up dialog box or effects detailed settings dialog box shown in FIG. 36 and 37 stores the set parameters in the RAM 10*b* of the CPU 10 in step S203.

Also, as described above, effects corresponding to set parameters can be correlated with the button 25*n*-1 by means of, e.g., turning the wipe button on, displaying the effects set-up dialog box shown in FIG. 36, and if further necessary operating the detail button 712 to bring up the effects detailed settings dialog box shown in 37 where certain parameters are set, following which the button 25*a* is dragged to the button 25*n*-1 and dropped. Thus, the button 25*n*-1 can be dragged and dropped at positions in the program display area 30 in the same manner as the buttons 25*a* through 25*m*, thereby setting that effect on the program.

After such setting is performed, the flow waits in step S204 until a button in the picture effects setting area 25 is dragged, and when a button is operated the flow proceeds to step S250, and the direction and distance of the movement of the cursor is calculated by the CPU 10. In step S206, the CPU 10 moves the display position of the specified effects set-up clip image data.

For example, as shown in FIG. 33, in the event that the cursor is positioned over the button 25*n*-1 (the button with the number "1"), and the mouse 2*d* is clicked and dragged, a frame 30E-1 of the effects set-up clip image data is displayed around the cursor, and the frame 30E-1 moves over the positions 30E-2, 30E-3, and so forth, according to the dragging.

Figure 38:
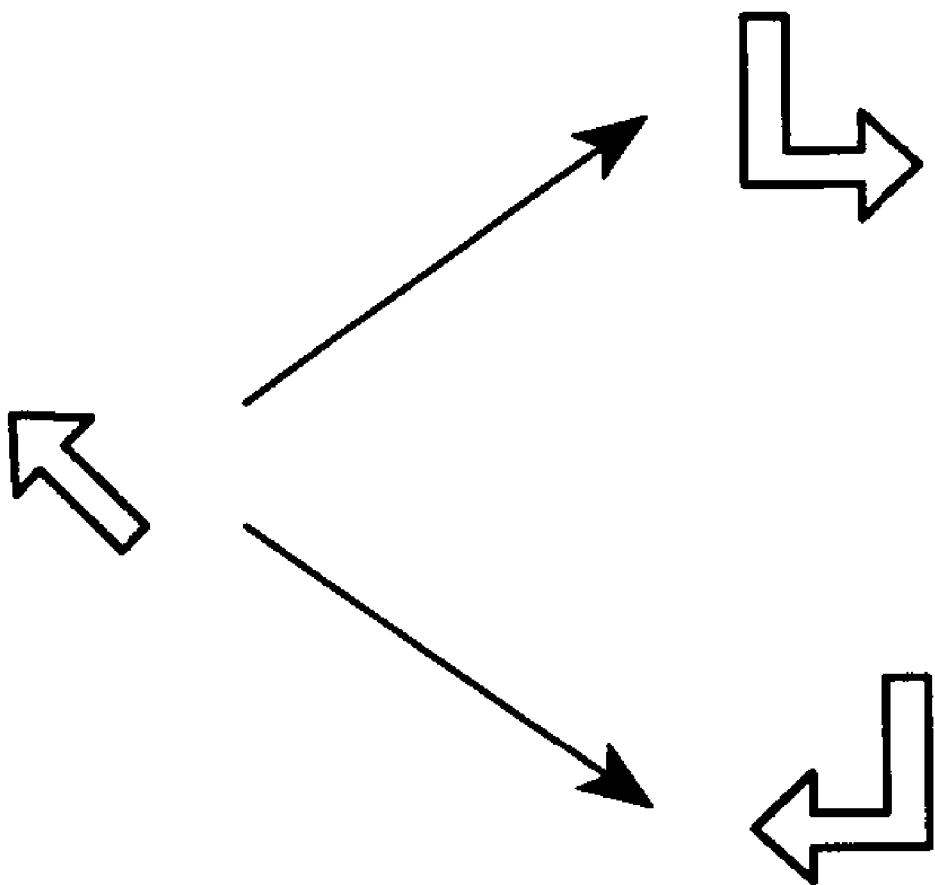
FIG. 38 is a diagram for illustrating the cursor changing.

In step S207, the current position of the cursor is calculated, and in the event that the current position is within the program display area 30, the cursor is changed to alform such as shown in FIG. 38 indicating between which pieces of clip image data on the program display area 30 that insertion is to be made.

Figure 39A:
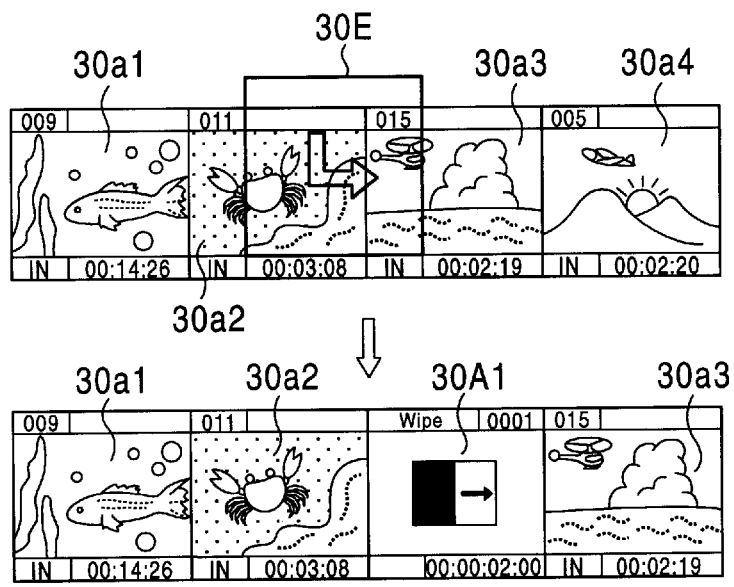
FIG. 39A–FIG. 39B are diagrams describing the insertion position of clip image data with effects set.
Figure 39B:
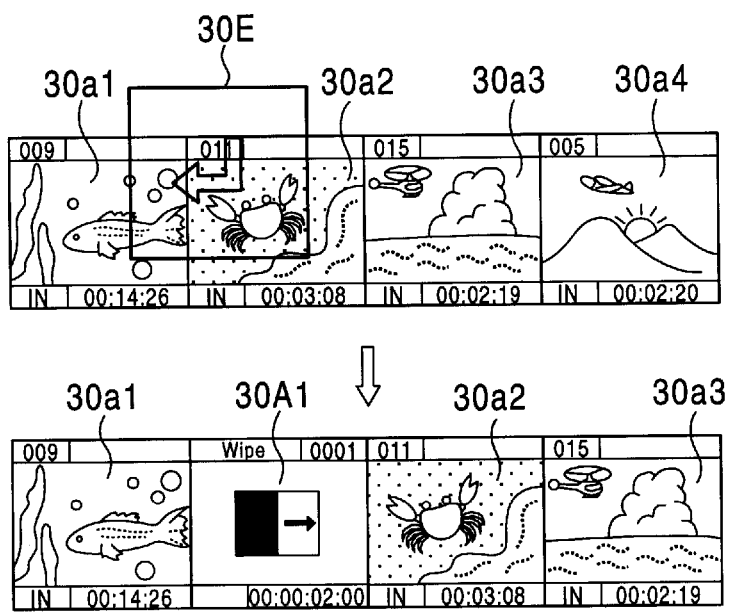

That is, as shown in FIG. 39A, in the event that the center of the frame 30E of the effects set-up clip image data corresponding to the dragged effects is closest to the border between the clip image data 30*a*2 and 30*a*3, the cursor is changed to point from the center toward the direction of the border between the clip image data 30*a*2 and clip image data 30*a*3. Conversely, as shown in FIG. 39B, in the event that the center of the frame 30E is closest to the border between the clip image data 30*a*1 and 30*a*2, the cursor is changed to point from the center toward the direction of the border therebetween.

Figure 40:
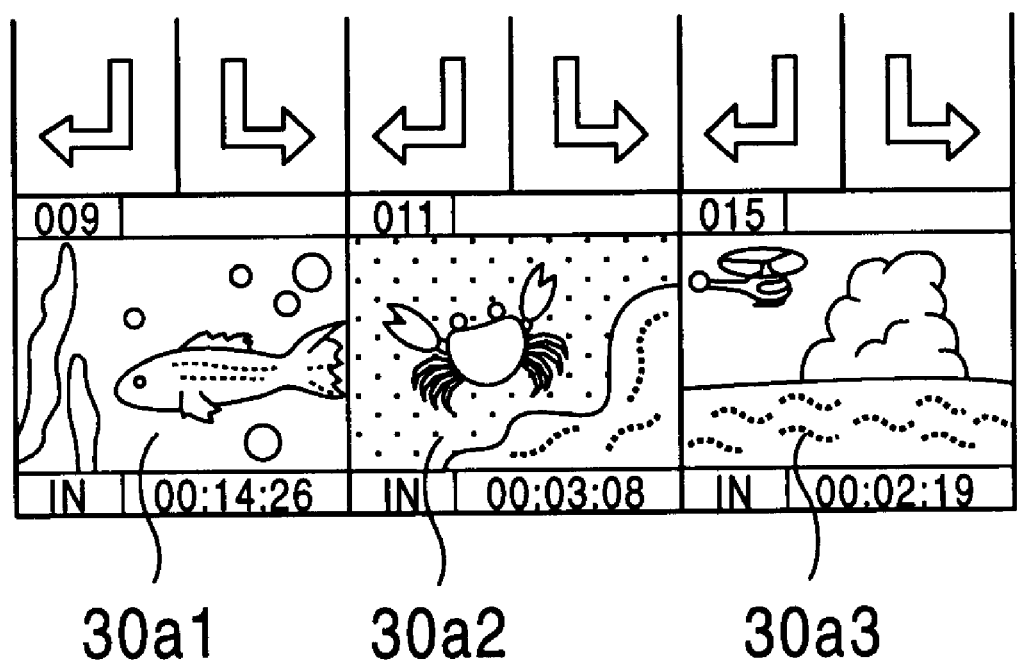
FIG. 40 is a diagram describing the principle of change of the cursor.

The above principles are summarized in FIG. 40. That is, the form of the cursor is changed so as to point from the center toward the closest border. Accordingly the user can know wherein the frame 30E will be inserted if he/she cancels the drag at that point and drops the frame 30E, i.e., whether it will be inserted between the clip image data 30*a*2 and clip image data 30*a*3 or between the clip image data 30*a*1 and clip image data 30*a*2.

Next, the flow proceeds to step S208 in S35, where judgment is made whether or not the button of the mouse 2*d* has been released; in the event that it has not been released, the flow returns to step S204 and subsequent processing is repeated. in the event that judgment is made in step S208 that the button of the mouse 2*d* has been released, the flow proceeds to step S209, where the position of the cursor at the time it was release is calculated, and in step S210, judgment is made whether or not the center of the frame 30E corresponding to the effects set-up clip image data is close to the right side border portion of the clip image data at which the center thereof is (e.g., clip image data 30*a*2 in FIG. 39).

In the event that the center of the frame 30E is close to the right side border portion of the clip image data as shown in FIG. 39A, the flow proceeds to step S211, the clip image data 30*a*3 displayed to the right side of that clip image data 30*a*2 is moved to the right by one clip, and the effects set-up clip image data corresponding to the frame 30E is inserted into the position where the clip image data had been. Conversely, in the event that the center of the frame 30E is close to the left side border portion of the clip image data as shown in FIG. 39B, the flow proceeds to step S212, the clip image data 30*a*2 is moved to the right by one clip, and the effects set-up clip image data corresponding to the frame 30E is inserted into the position where the clip image data 30*a*2 had been.

Next, the flow proceeds to step S213, and processing for updating the management record data is executed. That is, in the case of FIG. 39A, the second management record data of the effects set-up clip image data 30A1 is linked to the second management record data of the clip image data 30a2, and further, the second management record data of the clip image data 30a3 is linked to the second management record data of the effects set-up clip image data 30A1.

Conversely, in the case of FIG. 39B, the second management record data of the effects set-up clip image data 30A1 is linked to the second management record data of the clip image data 30a1, and further, the second management record data of the clip image data 30a2 is linked to the second management record data of the effects set-up clip image data 30A1.

The flow further proceeds to step S214, judgment is made whether or not to continue the program creating process, and in the event of continuing, the flow returns to step S201, and the subsequent processing is repeated. In the event that the program creating process is not to be continued, the processing ends.

Figure 41:
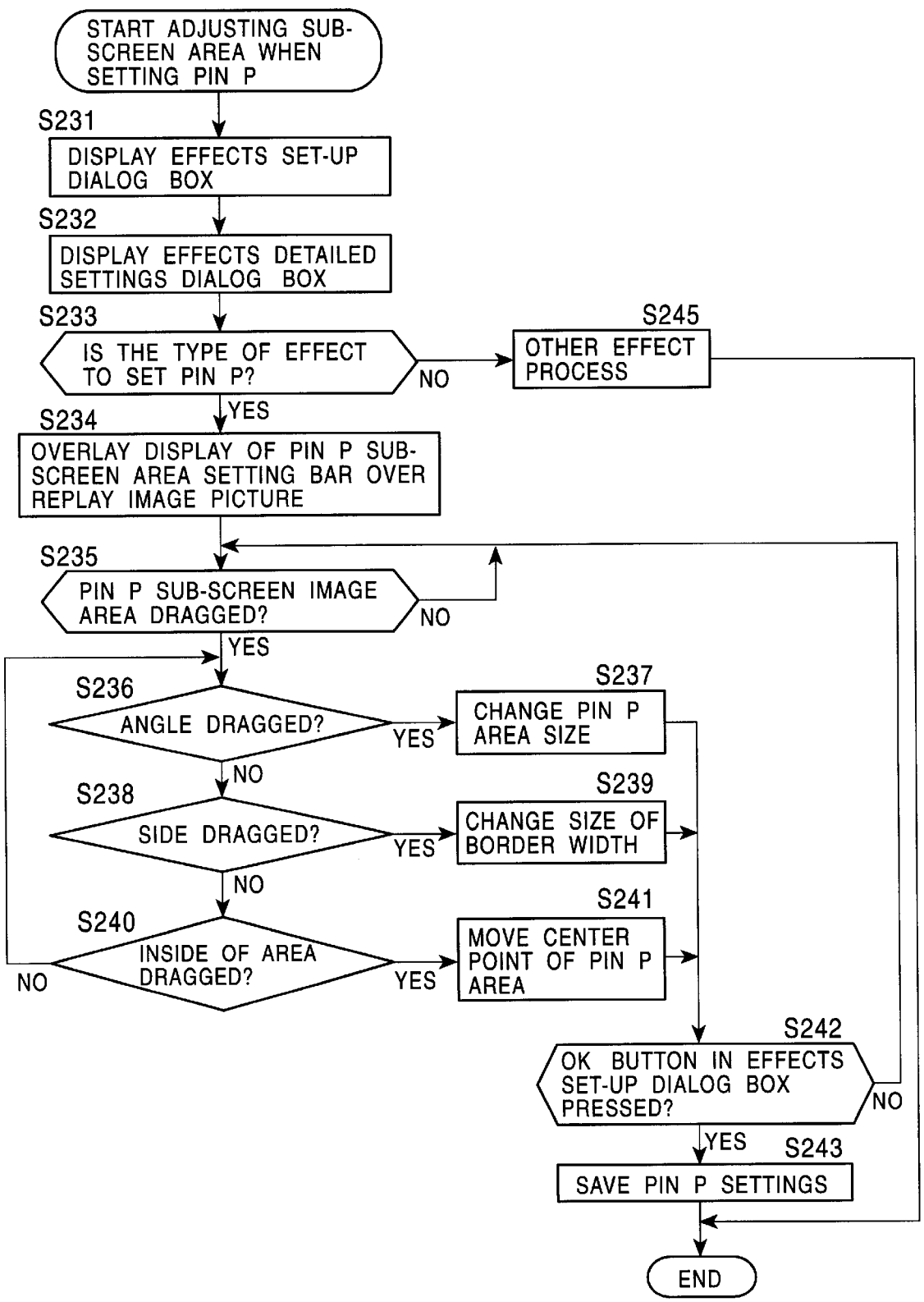
FIG. 41 is a flowchart describing the sub-image area adjusting process for when setting picture-in-picture.

Next, description will be made with reference to the flowchart in FIG. 41 regarding sub-screen area adjusting processing when making Picture-in-Picture settings, i.e., as shown in FIG. 41, regarding the process of adjusting the display position of the small sub-screen displayed at a certain position on the large main screen, within the replay video screen 23a.

First, in step S231, the user presses the Picture-in-Picture button 25d in the picture effects setting area 25, which displays an effects set-up dialog box such as shown in FIG. 36. In this case, the Picture-in-Picture button 25d has been clicked, so the word "P-in-P" is displayed in the display portion 701. Next, in step S232, the user operates the details button 712 of the effects set-up dialog box, which displays an effects detailed settings dialog box such as shown in FIG. 37.

Further, in step S233, judgment is made whether or not the effect to be set is Picture-in-Picture. In the event that the effect to be set is other than Picture-in-Picture, the flow proceeds to step S245, and the setting process of the corresponding effect is carried out.

Figure 42:
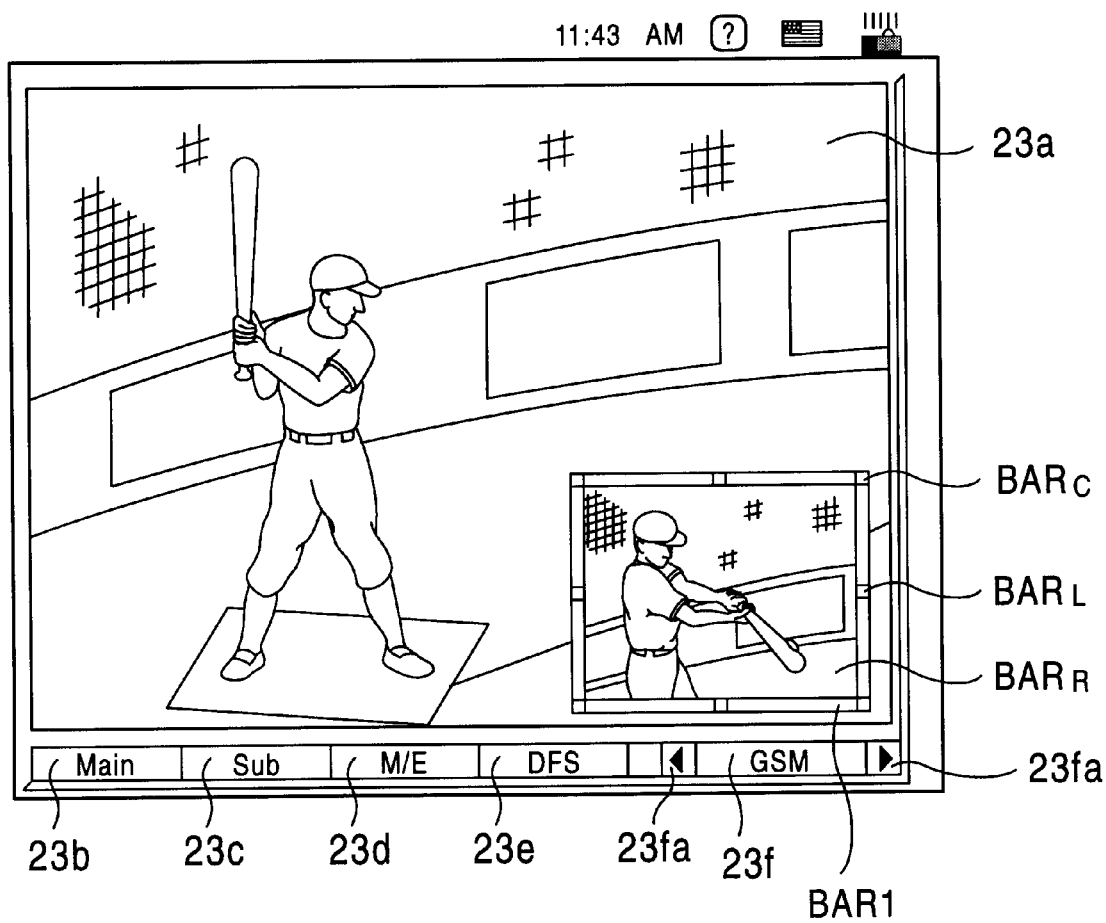
FIG. 42 is a diagram illustrating an example of display of the picture-in-picture area setting screen.

Conversely, in the event that the effect to be set is Picture-in-Picture, the user performs the setting processes as described above such as setting the display coordinates for Picture-in-Picture in the location display portion 700 and so forth, following which the OK button 783 is clicked. At this time, the CPU 10 overlays a Picture-in-Picture sub-screen area setting bar "BAR 1" on the display video screen 23a at the position corresponding to the settings, as shown in FIG. 42.

Next, the flow proceeds to step S235, and waits for the Picture-in-Picture sub-screen area within the bar "BAR 1" to be dragged. In the event that dragging is executed, judgment is made in the steps S236, S238, and S240, whether the corner $BAR_c$ has been dragged (step S236), whether the side $BAR_L$ has been dragged (step S238), or whether the internal $BAR_R$ has been dragged (step S240).

In the event that it is judged that the corner $BAR_c$ has been dragged in step S236, the flow proceeds to step S237, the coordinates of the dragged mouse cursor are calculated, and the size of the Picture-in-Picture area is changed according to the calculation results (i.e., the size of the bar "BAR 1" is changed. In the event that it is judged that the side $BAR_L$ has been dragged in step S238, the flow proceeds to step S239, and the size of the border width of the bar "BAR 1" is changed according to the calculation results of the dragged cursor. In the event that it is judged that the interior $BAR_R$ has been dragged in step S240, the flow proceeds to step S241, and the center of the area is moved according to the dragged position. In the event that what was dragged was neither the corner $BAR_c$, side $BAR_L$, nor the internal $BAR_R$, the flow returns from step S240 to step S236. That is, it is considered to be a mistaken operation, and no particular processing is executed.

Incidentally, a value input by directly operating the bar "BAR 1" with the mouse 2d is also reflected in the display of the effects detailed settings dialog box 770 in FIG. 37.

Thus, operating the effects detailed settings dialog box allows the user to change the Picture-in-Picture sub-screen area settings, but the Picture-in-Picture sub-screen area settings can also be changed by operating the cursor on the replay video screen 13a, as well. Accordingly, the user can watch the main screen and appropriately set an optimal position for the sub-screen.

After the processing in the steps S237, S239, and S241, the flow proceeds to step S242 and judges whether or not the OK button 714 in the effects set-up dialog box has been clicked or not. In the event that the OK button has not been clicked, the flow returns to step S235, and subsequent processing is repeated. In the event that the OK button has been judged to have been pressed, the flow proceeds to step S243, and a process for saving the parameter settings for Picture-in-Picture is executed. That is, these parameter values are saved in the RAM 10b of the CPU 10.

Incidentally, this processing can be applied in the later-described (with reference to FIG. 47) case of adjusting the ratio of script.

With reference to FIG. 42, operating the main button 23b or the sub button 23c allows the user to switch the image displayed as the main screen on the replay video screen 23a between the image output by the main hybrid recorder 3a and the sub main hybrid recorder 3b. In the event that the M/E button 23d is operated, post-picture effects processing images without DSK pictures are displayed as the main screen. In the event that the DFS button 23e has been operated, all post-picture effects processing images including DSK pictures are displayed. The GSM (Good Shot Marker) button 23f is operated in the case of searching for image data with a Good Shot Marker written therein, and displaying it. That is, after operating of the GSM button 23f, the user operating the scroll button 23fa searches the Good Shot Marker of the image data registered beforehand in a hard disk of the hybrid recorder 3, and images are displayed from a position reaching back from the Good Shot Marker by the cue-time.

Figure 43:
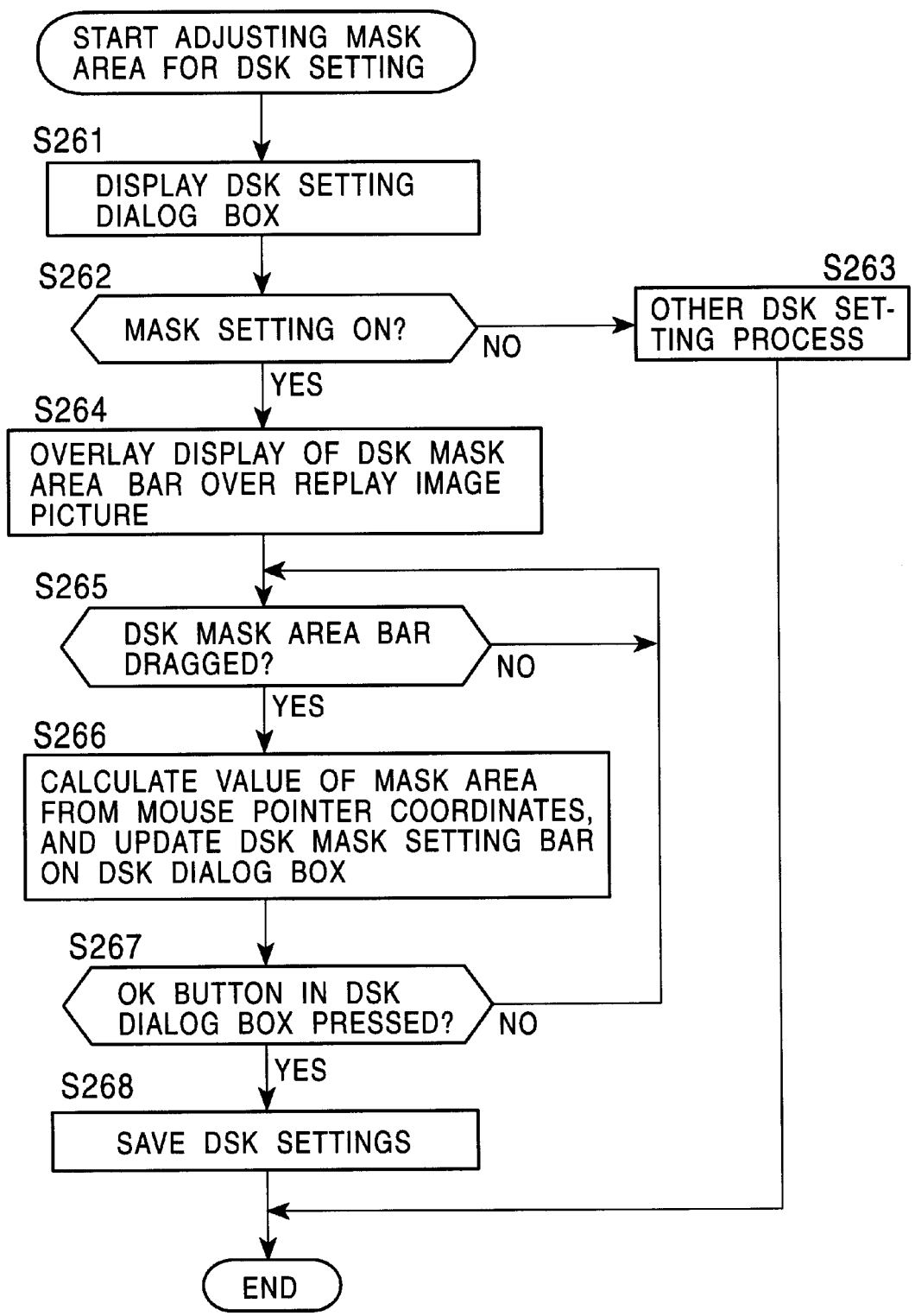
FIG. 43 is a flowchart illustrating the mask area adjusting process for when setting DSK.
Figure 44:
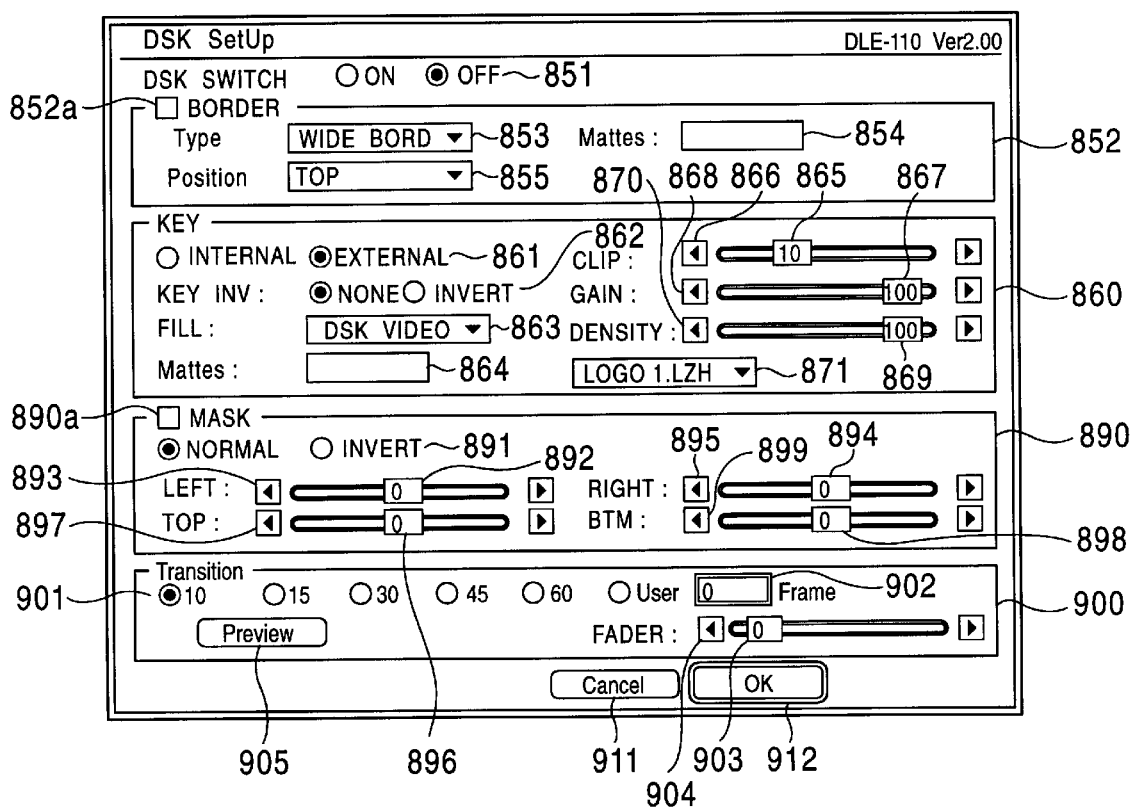
FIG. 44 is a diagram illustrating an example of the DSK set-up dialog box.

Next, with reference to the flowchart in FIG. 43, description will be made regarding the mask area adjusting process at the time of setting DSK. First, in step S261, the user operates the DSK button 25f (FIG. 33) of the image effects display area 25, and displays a DSK set-up dialog box such as shown in FIG. 44. As shown in this Figure, with this DSK set-up dialog box, the downstream key mode setting can be set to ON or OFF in the DSK switch display portion 851. In the event that the downstream key (DSK) mode has been set, characters and shapes can be further inserted into the image to which effects have been applied.

A check button 852a provided to the border display portion 852, and this check button 852a is operated when validating the parameter settings made in the border display portion 852. The display portion 853 is capable of displaying and setting the type of border. The types of borders available are: wide border, narrow border, drop border, and double border, which is a combination of e.g., a narrow border and drop border.

In the display portion 855, the border position can be selected and displayed in the event that a drop border or double border has been selected. The position is selected from the following: upper left, upper right, lower right, lower left.

The check-box 854 is clicked in the event of setting the border color. In the event that the check-box 854 is clicked, a color picker dialog box for setting various types of colors comes up. The user sets the border color as necessary, using the color picker dialog box.

The key display portion 860 can be used to perform settings regarding click key operating signals for the characters or shapes to be inserted, or key fill signals for filling in the portions cut out by the key source signals. The display portion 861 can be used to specify using internal signals or external signals for the key source signals. At the display portion 862, according to whether the key source signal is black or white (i.e., the polarity of the signal), "none" is selected in the event that white characters are to be cut out of a black background and inserted, and "invert" is selected in the event that black characters are to be cut out of a white background and inserted. The key fill signal to be used is specified at the display portion 863. As for the key fill signal, one of the following is selected and specified: DSK VIDEO (the fill signal input from the DSK FILL IN terminal shown in FIG. 4), DSK MAT (internally generated DSK matte), SELF (image data read from the floppy disk 742 shown in FIG. 4), or none (i.e., no fill signal. Only the borders of the characters or shapes are inserted).

In the event that DSK MAT is specified at the display portion 863, the check-box 864 is used for displaying the color picker dialog box and selecting the matte.

The clip slide button 865 or clip scroll button 866 are operated to adjust the clip level in the event that the outlines of the inserted characters or shapes are not clear, by positioning the clip slide button 865 at a certain position.

The gain slide button 867 and gain scroll button 868 are operated when adjusting the darkness of the inserted characters and shapes.

The density slide button 869 and density scroll button 870 are operated when adjusting the transparency of the inserted characters and shapes.

The display portion 871 is operated in the event of inserting a separate floppy disk into the computer to change the key fill signal image data, and display and setting is performed.

At the mask display portion 890, settings are performed for hiding (masking) unnecessary portions of the characters and shapes to be inserted. The check-button 890a is checked to validate the set mask. At the display portion 891, selection is made whether the outside of the area to be masked (rectangular area) is to be masked (NORMAL), or whether the inside is to be masked (INVERT). The slide buttons 892, 894, 896, 896, and the scroll buttons 893, 895, 897, 899 are operated when specifying the left, right, top, and bottom edges of the area to be masked.

At the transition display portion 900, the time from start to end of the downstream key effects can be specified in the number of frames. At the display portion 902, the user can select one of the following preset number of frames: 10, 15, 30, 45, 60. Or, in the event that "user" is selected, an arbitrary number of frames can be set to the display portion 902. The preview button 905 is operated for previewing the execution of the stream key setting effects based on this dialog box. The preview screen is displayed in the replay video screen 23a.

Operating the slide button 903 or scroll button 904 of the fader allows the user to confirm the preview screen at a certain transition position.

The cancel button 911 is operated when canceling the parameters set in this DSK set-up dialog box, and the OK button is operated in the case of validating the settings.

The user sets the parameters using the above-described DSK set-up dialog box.

Next, the flow proceeds to step S262, where the mask check-box 890a in the DSK set-up dialog box is checked, and judgment is made whether or not the mask setting is on or not. In step S262, if judgment is made that the mask setting is not on, the flow proceeds to step S263, and other setting processing is performed using the DSK set-up dialog box.

Figure 45:
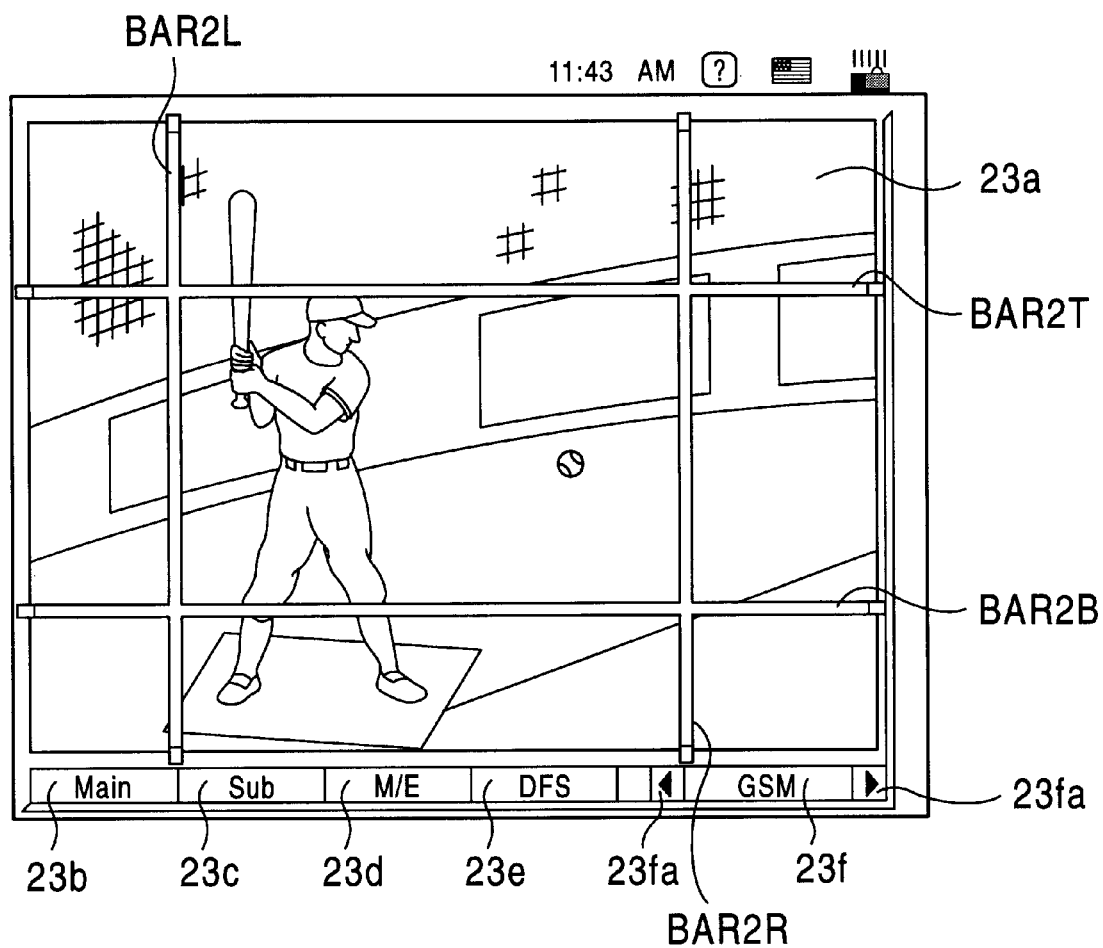
FIG. 45 is a diagram illustrating an example of the mask area set-up dialog box.

In step S262, if judgment is made that the mask setting is on, the flow proceeds to step S264, and as shown in FIG. 45, the CPU 10 displays DSK mask area bars "BAR 2L", "BAR 2R", "BAR 2T", and "BAR 2B" on the replay video display 23a, in accordance with the horizontal and vertical edge portions set in the mask display portion 890 of the DSK setup dialog box.

In step S265, the flow waits until the bars "BAR 2L" through "BAR 2B" are dragged by the mouse 2d. In event that one is dragged, the flow proceeds to step S266, the new position of the bar is calculated from the coordinates of the mouse pointer, and the bar is moved to and displayed at the new position. For example, in the event that the bar "BAR 2L" is dragged to the right or left of the present position, the bar "BAR 2L" is moved to and displayed at the new position to which it has been dragged. Also, for example, in the event that the bar "BAR 2T" is dragged upwards or downwards from the present position, the bar "BAR 2T" is moved to and displayed at the new position to which it has been dragged. Thus, not only can the user use the DSK set-up dialog to set the mask area, but can operate the mouse 2d while watching the actual display screen to set the mask area. Accordingly, even more appropriate setting can be performed.

Further, even in the event that the user directly operates the bars "BAR 2L" through "BAR 2B" while watching the screen in step S266 to set the mask area, that setting position is reflected at the mask display portion 890 in the DSK set-up dialog box.

Next, the flow proceeds to step S267, and judgment is made whether or not the OK button 912 in the DSK set-up dialog box has been turned on; in the event that it has not been turned on, the flow proceeds to step S268, and the parameters set using the DSK set-up dialog box are saved in the RAM 10b.

This system is particularly adept at handling live footage, and is arranged so as to be able to provide effects in real-time to live footage (to apply effects to live pictures of presently unfolding events). However, the effects which can be applied to live footage are, besides DSK processing, limited to Picture-in-Picture or Split processing that is used at a high frequency for live pictures.

In the case of applying effects to live pictures, the direct button 25p in the picture effects setting area 25 is operated. Operating this direct button 25p displays the direct effects operating window shown in FIG. 46. The DSK internal ON button 801 is operated for starting or ending DKS processing by key signals or fill signals read in from the floppy disk 742 of the picture effects device 6 shown in FIG. 4. The DSK external button 802 is operated for starting or ending DKS processing by DSK fill signals input from the DSK FILL IN terminal 701 or DSK key signals input from the DSK KEY IN terminal 702 shown in FIG. 4.

The DSK set-up button 803 is a button which is turned on in order to display the above-described DSK set-up dialog box shown in FIG. 44, for setting up for executing the above-described DSK processing.

Figure 47:
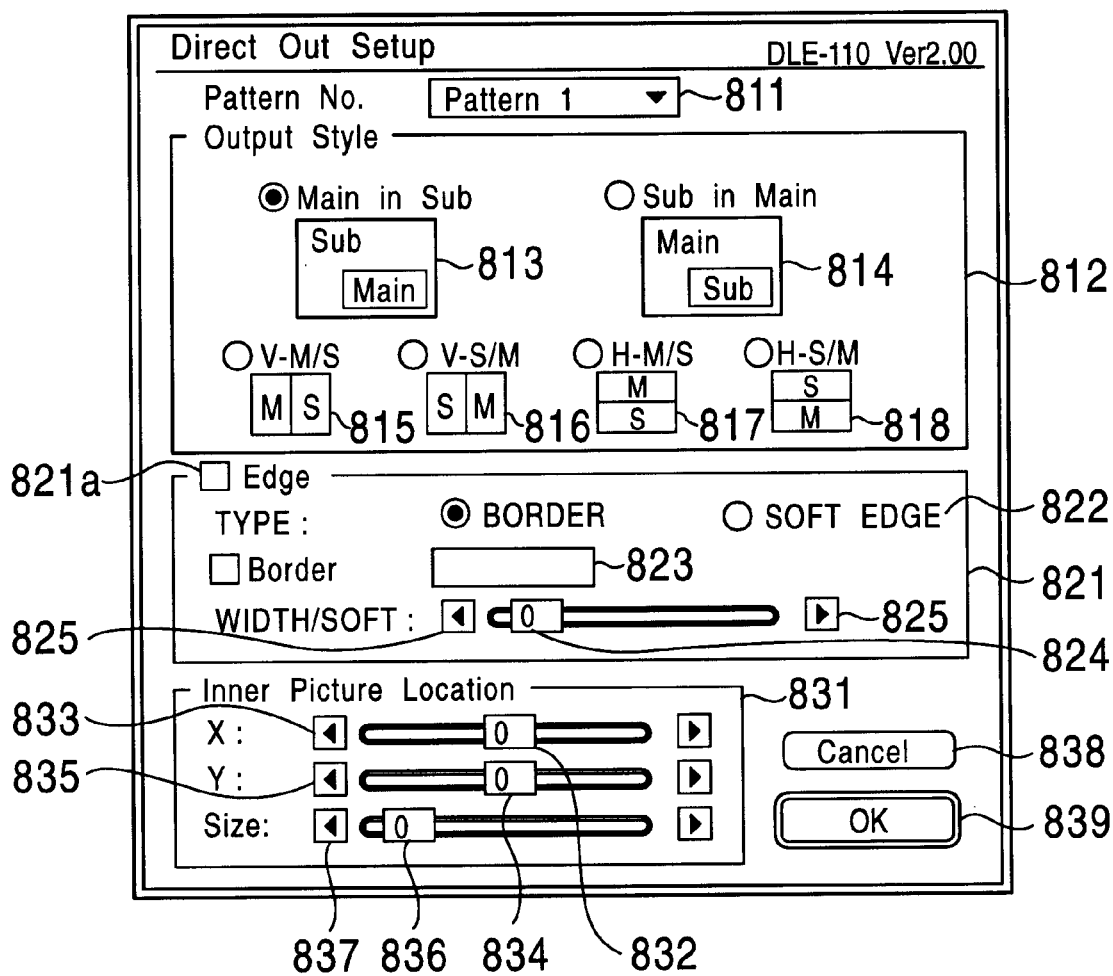
FIG. 47 is a diagram illustrating an example of display of the direct effects set-up dialog box.

The direct OUT set-up button 805 is a button operated for displaying the direct effects set-up dialog box shown in FIG. 47, and the direct OUT ON button 804 is a button operated for operating the OUT set-up button 805 to display direct effects set-up dialog box when stating or ending the screen display based on the set parameters. For example, a picture can be output with the sub-screen displayed at an adjusted position by operating the direct OUT ON button 804 following adjusting of the position of the sub-screen in Picture-in-Picture to a certain position, as described above.

As shown in FIG. 47, in the event of setting new effects in the display portion 811 in the direct effects set-up dialog box, or when calling already-set effects, a pattern No. can be specified.

At the output style display portion 812, the user can select from a total of six types of direct effect patterns, i.e., two Picture-in-Picture effects and four split effects. Selecting the main-in-sub display portion 813 executes Picture-in-Picture effects wherein the main screen is inserted into the sub-screen. Selecting the sub-in-main display portion 814 executes Picture-in-Picture effects wherein the sub-screen is inserted into the main screen. Selecting the V-M/S display portion 815 displays a split screen which splits the screen into right and left, with the main screen to the left and the sub-screen to the right. Selecting the V-S/M display portion 816 displays a split screen which splits the screen into right and left, with the main screen to the left and the sub-screen to the right. Selecting the H-M/S display portion 817 displays a split screen which splits the screen into top and bottom, with the main screen to the top and the sub-screen to the bottom. Selecting the H-S/M display portion 818 displays a split screen which splits the screen into top and bottom, with the sub-screen to the top and the main screen to the bottom.

At the edge display portion 821, edge setting is performed for the effect patterns selected at the output style display portion 812. The check-button 821a is checked to provide an edge to the effect pattern. With the display portion 822, either a border or a soft edge can be selected for the edge. Checking the check-box 823 selects one or the other of the border or soft edge. Operating the slide button 824 or the scroll button 825 at the WIDTH/SOFT display portion allows the user to select the width of the border edge or soft edge.

At the inner picture location display portion 831, in the event that Picture-in-Picture is selected at the output style display portion 812, the size and position of the screen to be inserted (i.e., the sub-screen) can be specified. X represents the X-coordinates of the center point of the sub-screen, and Y represents the Y-coordinates thereof. Also, Size is used to set the sub-screen to a certain size by operating the slide button 836 or scroll button 837 so as to position the slide button 836 at a certain position.

The cancel button 838 is operated for canceling the parameters set in this direct effects set-up dialog box, and the OK button 839 is operated for validating the settings.

Figure 48:
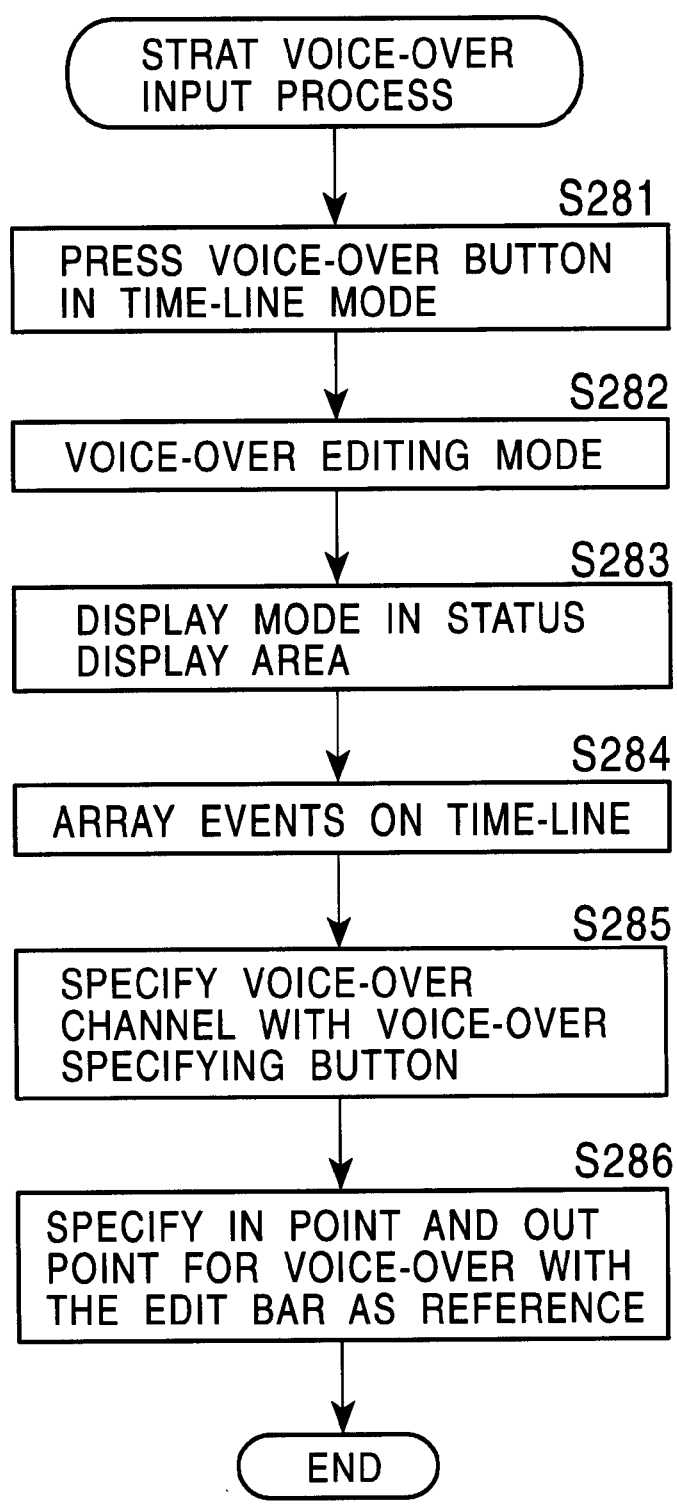
FIG. 48 is a flowchart describing the voice-over input process.

Also, the present system has voice-over functions for changing audio signals into other audio signals and outputting them. Next, description will be made regarding the voice-over functions with reference to the flowchart shown in FIG. 48.

First, in step S281, the user operates the mode button 22b in the timing display area 22 and sets the time-line mode. Then, the user turns the voice-over button 21d on. At this time, the CPU 10 proceeds to step S282, and sets the voice-over editing mode. Then, in step S283, the CPU 10 displays the phrase "VOICE OVER" on the display portion 26j serving as the status display area in FIG. 6.

Next, in step S284, the user executes a process to array events on the video track 40d within the time-line display area 40. This can be carried out by operating the mouse 2d to drag and drop the clip image data displayed in the program display area 30, for example.

Figure 49:
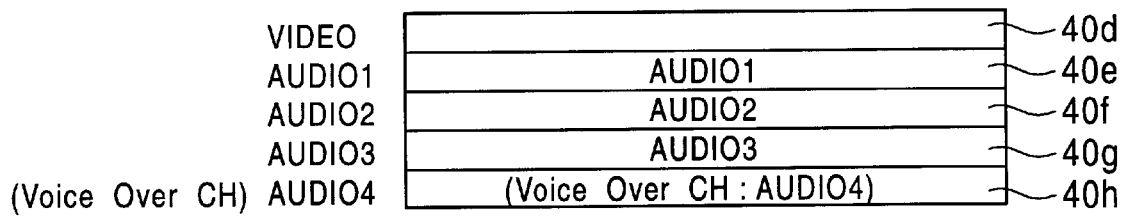
FIG. 49 is a diagram describing the voice-over channel.

Next, the flow proceeds to step S285, and the user operates the voice-over channel specifying button 45c to specify a voice-over channel from the four channels. FIG. 49 shows the time-line display area 40 wherein No. 4 channel has been specified from the four channels as the voice-over channel. As shown in the same Figure, in this case, only the No. 4 channel is used as the voice-over channel, and new audio signals are recorded there.

Next, the flow proceeds to step S286, and the user specifies the IN-point and OUT-point for voice-over with the edit bar 40k of the time-line display area 40 as a reference. This specification is performed by turning the search button 40m of the time-line display area 40 shown in FIG. 7, or the scroll buttons 40i and 40j on, and operating the mark-IN button 27c and the mark-OUT button 27f while watching the image displayed in increments of frames on the replay video screen 23a.

Figure 50:
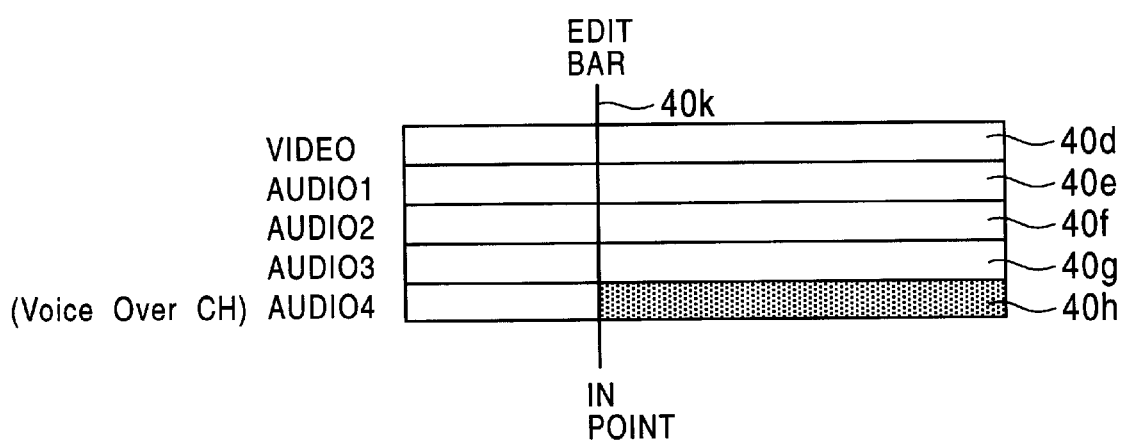
FIG. 50 is a diagram describing the IN point for voice-over.
Figure 51:
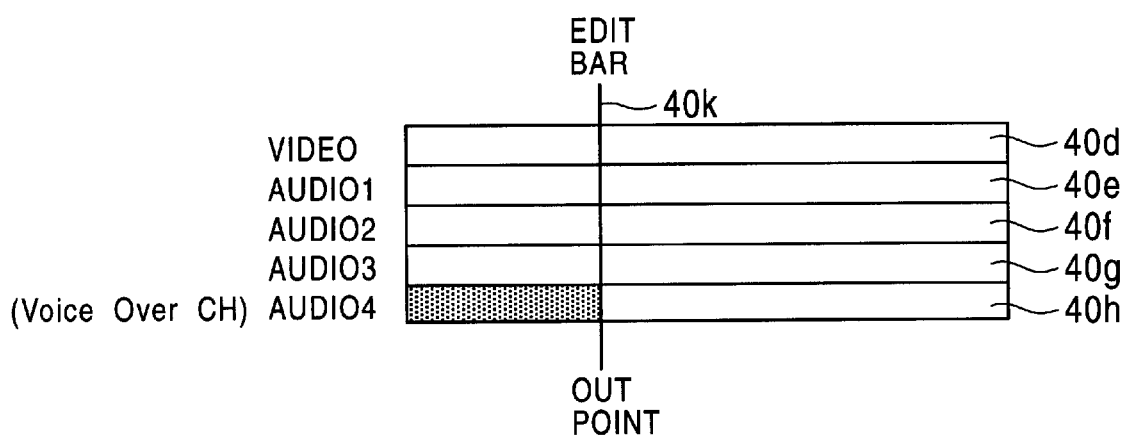
FIG. 51 is a diagram describing the OUT point for voice-over.
Figure 52:
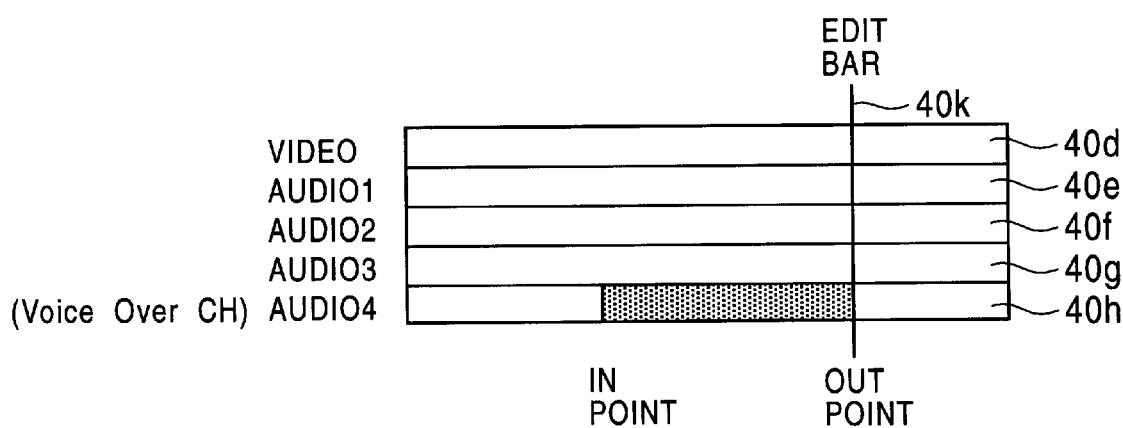
FIG. 52 is a diagram describing the range for voice-over.

FIG. 50 illustrates an example of display on the time-line display area 40 in the event that the IN-point has been specified first. As shown in the Figure, in the event that the IN-point is specified, the range of the audio track 40h that follows time-wise is shaded. Conversely, in the event that the OUT-point is specified first, the range that precedes the edit bar 40k time-wise is shaded. When both the IN-point and OUT-point have been specified, as shown in FIG. 52, the range between the IN-point and OUT-point is shaded. The user can thus visually confirm the range for voice-over.

When the voice-over range has been set as described above, the user can then preview to confirm the set range. The processing in this case will be described with reference to the flowchart in FIG. 53.

Figure 54:
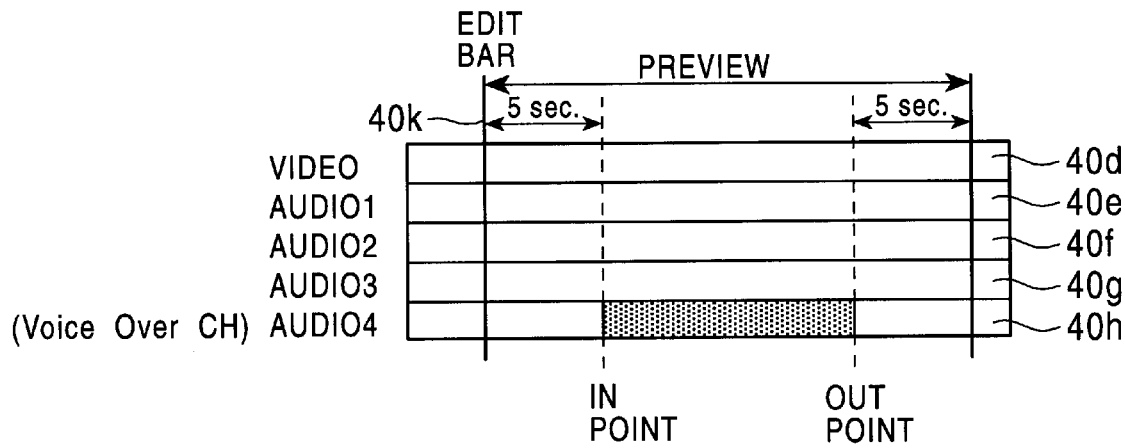
FIG. 54 is a diagram describing the replay range in the preview operation.

When starting the preview, first, in step S301, the user turns the preview button 45b shown in FIG. 6 on. At this time, in step S302, the CPU 10 controls the hybrid recorder 3 via the RS-422, and executes preview replaying. At this time, as shown in FIG. 54, the CPU starts replaying from a position reaching back by a certain amount of time (e.g., 5 seconds) from the IN-point of the voice-over, and continues replaying until a position past the OUT-point of the voice-over by a certain amount of time (e.g., 5 seconds). In the case of this example, the range of playing before the IN-point and after the OUT-point is 5 seconds each, but this time of 5 seconds can be set to an arbitrary value.

Figure 55A:
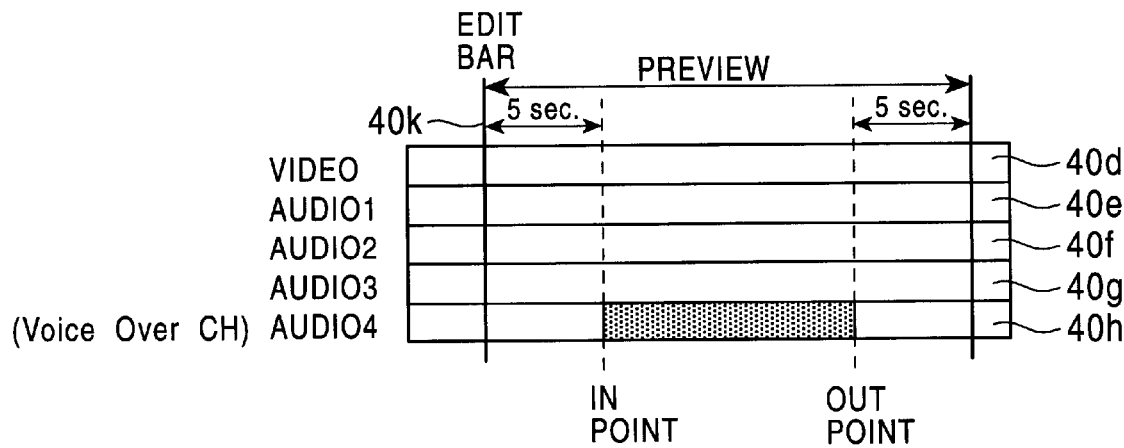
FIG. 55A–FIG. 55B are diagram describing the decay of audio signals in the preview operation.
Figure 55B:
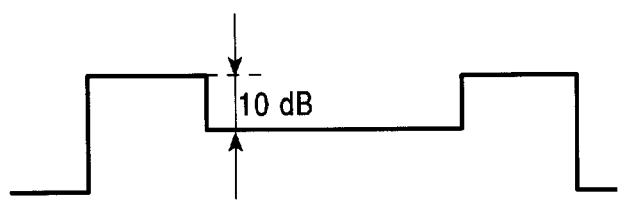

Also, in step S303, the CPU 10 issues commands to the CPU 303 of the hybrid recorder 3 and controls the audio data control unit 317 (FIG. 18) such that, as shown in FIG. 55, replay output is made from the HDD 300 for the 5 seconds before the voice over IN-point, and the audio signals of the voice-over channel (in this case, the No. 4 channel) are output from the speaker 320 at a normal level, but the audio signals are decayed by 10 dB during the IN-point and OUT-point of the voice-over. Then, and the audio signals of the voice-over channel are again output from the speaker 320 at a normal level for the 5 seconds following the voice over OUT-point. Thus, the user can audibly confirm the voice-over range.

It is needless to say that the corresponding video image is displayed on the replay video screen 23a during preview replaying.

Thus, following conducting preview replay, the user decides in step S304 whether or not there is any need to correct the voice-over range. In the case that judgment is passed that there is need for correction, the flow proceeds to step S305 and executes voice-over input processing. Then, following the voice-over input processing shown in FIG. 48, the flow returns to step S301, and repeats the subsequent processing.

In the case that judgment is passed in step S304 that there is no need for correction, the flow proceeds to step S306, where the user judges whether or not there is any need to delete the once-set voice-over range. In the event that there is a need to delete this, the flow proceeds to step S307, and the user operates the delete button 36. At this time, the CPU 10 proceeds the step S308 and executes the process for deleting the once-set voice-over range. In the case that judgment is passed in step S306 that there is no need to delete the once-set voice-over range, the preview processing ends.

Thus, following confirming the set voice-over range by previewing, and then actually executing the voice-over, new audio signals can be recorded in the No. channel. Next, the voice-over recording process in this case will be described with reference to the flowchart in FIG. 56.

Figure 57:
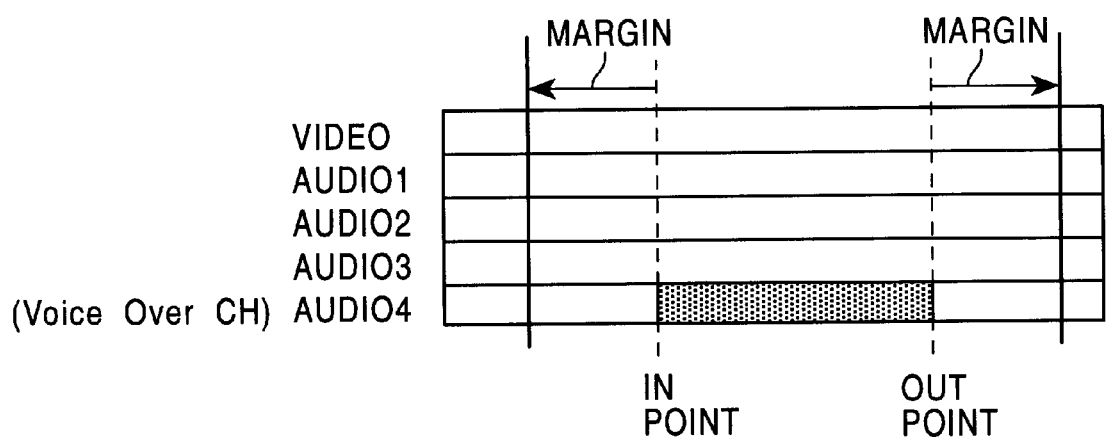
FIG. 57 is a diagram describing the recording range when conducting voice-over recording.
Figure 58:
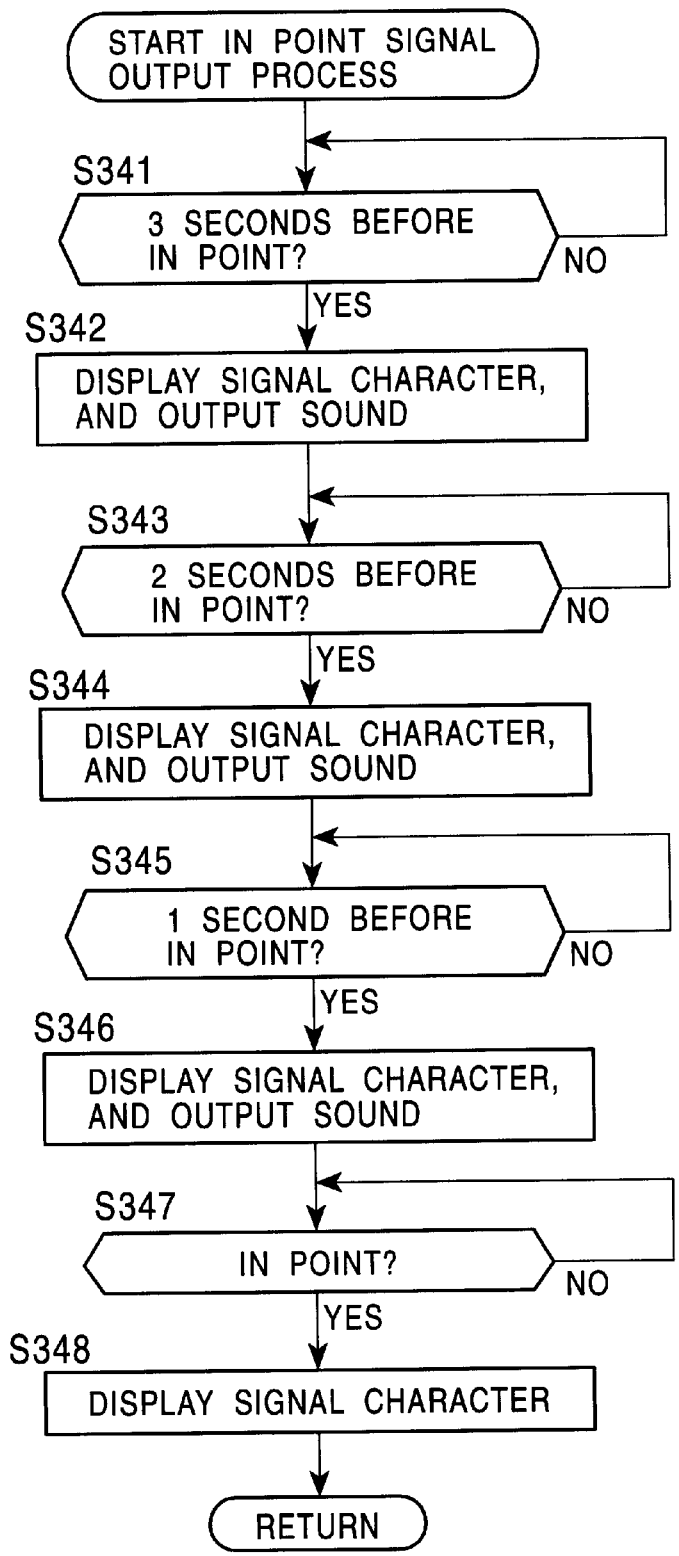
FIG. 58 is a flowchart describing the IN point signal output process.
Figure 59:
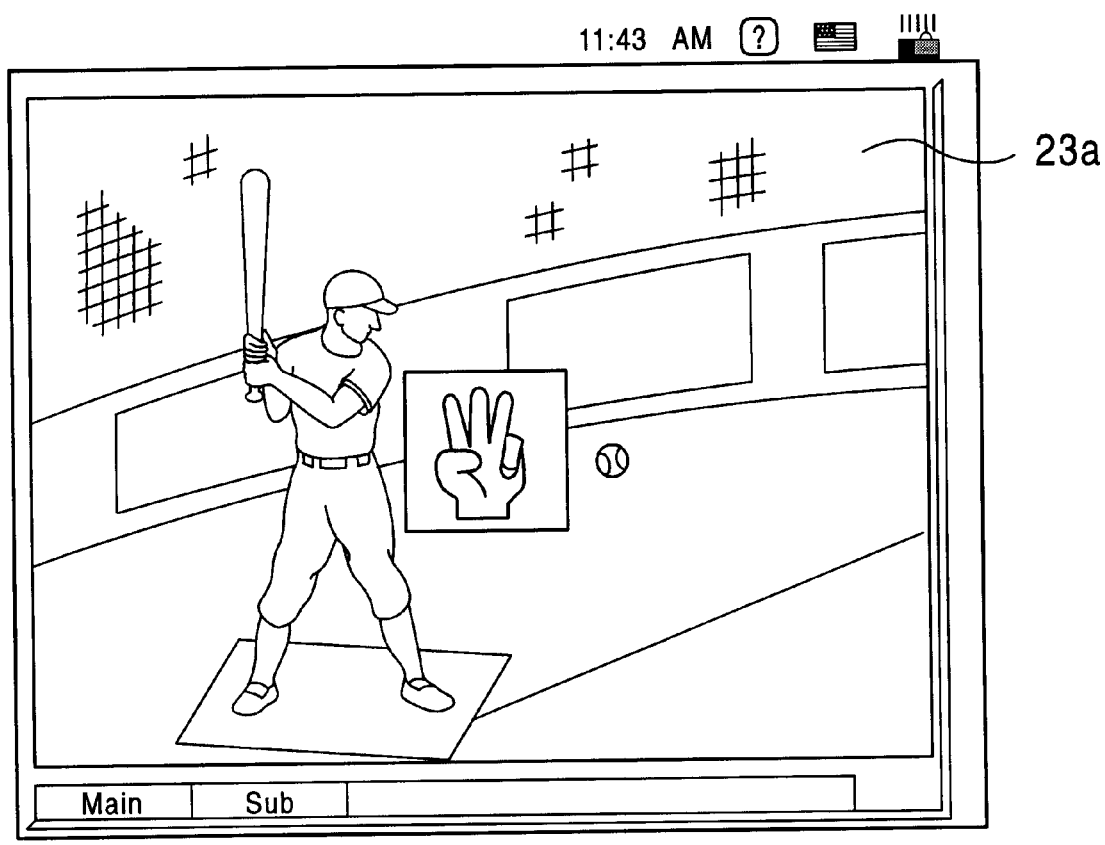
FIG. 59 is a diagram illustrating an example of display in step S342 in FIG. 58.

First, in step S321, the user turns the recording start/stop button 31a on. When this button 31a is turned on, the flow proceeds to step S322, where the CPU 10 controls the hybrid recorder 3 via the RS-422, and starts the replaying and recording operation. At this time, the CPU 303 of the hybrid recorder 3 controls the HDD 300, and as shown in FIG. 55, causes it to replay the same range as the previewed range. However, as shown in FIG. 57, recording of the audio signals for voice-over starts from a point reaching back before the IN-point by a preset margin. Then the flow proceeds to stet S323, where the CPU 10 executes the IN-point sign output processing. Details of the IN-point sign output processing are shown in FIG. 58.

That is, in the IN-point sign output processing, first, in step S341, the flow waits till 3 seconds before the IN-point for voice-over, and when this point has been reached, the flow proceeds to step S342, where a character indicating that the time is 3 seconds before the IN-point is displayed, and an audio signal is also output. Specifically, the CPU 10 displays a shape representing a hand holding up three fingers (see FIG. 60A) on the display video screen 23a. Also, the CPU 10 controls the audio data control unit 317 via the CPU 303 so as to output an audio signal "beep" indicating that the time is 3 seconds before the IN-point from the speaker 320, as shown in FIG. 61.

In the next step S343, the flow waits till 2 seconds before the IN-point, proceeds to step S342, where a signaling character is displayed, and an audio signal is also output. Specifically, the CPU 10 displays a shape representing a hand holding up two fingers (see FIG. 60B) on the display video screen 23a. Also, the CPU 10 outputs an audio signal "beep" from the speaker 320 indicating that the time is 2 seconds before the IN-point, as shown in FIG. 61.

In the next step S345, the flow waits till 1 second before the IN-point, and when this point has been reached, the flow proceeds to step S346, where a signaling character is displayed, and an audio signal is also output. In this case, the CPU 10 displays a shape representing a hand holding up one finger (see FIG. 60C) on the display video screen 23a. Also, the CPU 10 outputs an audio signal "beep" from the speaker 320 indicating that the time is 1 second before the IN-point, as shown in FIG. 61.

Next, in step S347, the flow waits till the IN-point, and when this point has been reached, the flow proceeds to step S348, where a signaling character is displayed. Specifically, in this case, the CPU 10 displays a shape representing a hand signaling the start of voice-over (see FIG. 60D) on the display video screen 23a. Thus, the announcer can grasp the timing for starting speaking for the voice-over.

In this way, when the flow reaches the voice-over point, the CPU 10 controls the CPU 303 of the hybrid recorder 3 in step S324 so as to control the CPU 303 of the hybrid recorder 3, and decays the level of the replay audio signals. In response to the commands, the CPU 303 controls the audio data control unit 317, decays the level of the audio signals by 10 dB, and outputs the signals from the speaker 320.

Also, the announcer to input the audio signals for voice-over starts inputting the voice-over audio signals from the microphone 8 at the timing of the shape shown in FIG. 60D being displayed on the replay video screen. The audio signals are input to the audio data control unit 317 via the switch 315 and A/D converter 316, and are superimposed onto the audio signals replayed from the HDD 300 in the audio data control unit 317. In the above example, the audio signals replayed by the HDD 300 were decayed by 10 dB and synthesized with the audio signals input from the microphone 8, but in the event that the audio signals replayed by the HDD 300 are completely decayed, the audio signals replayed by the HDD 300 can be essentially replaced with the audio signals input from the microphone 8.

The audio signals output from the audio data control unit 317 are input to the video tape recorder 301 via the decoder 305, first switch 304, and encoder 306, where they are recorded, and also input to the HDD 300 via the second switch 307 and buffer 308, and recorded in an AA area (later-described with reference to FIG. 66) on the hard disk that is reserved for audio signals.

Figure 56:
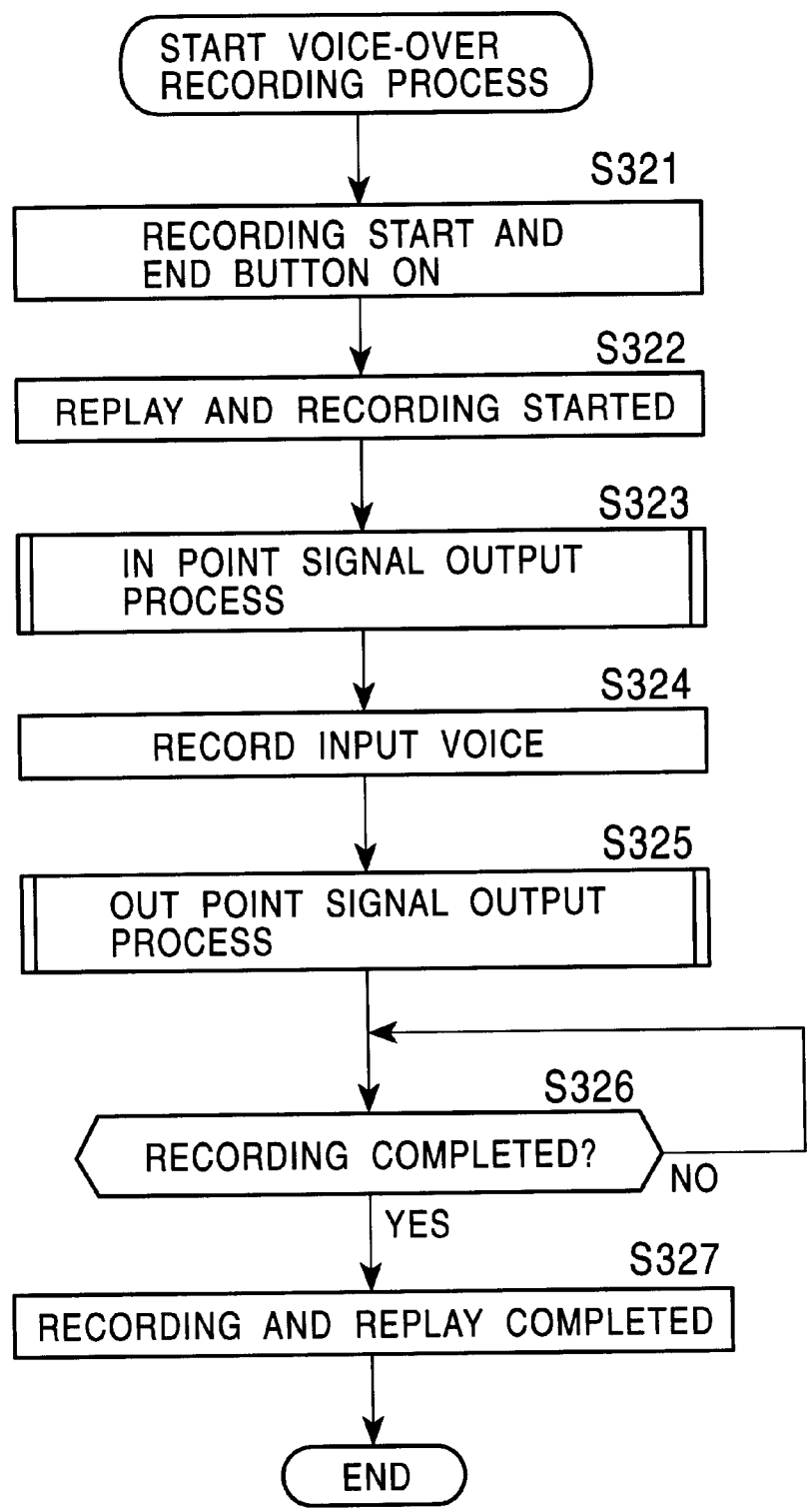
FIG. 56 is a flowchart for describing the voice-over recording process.
Figure 62:
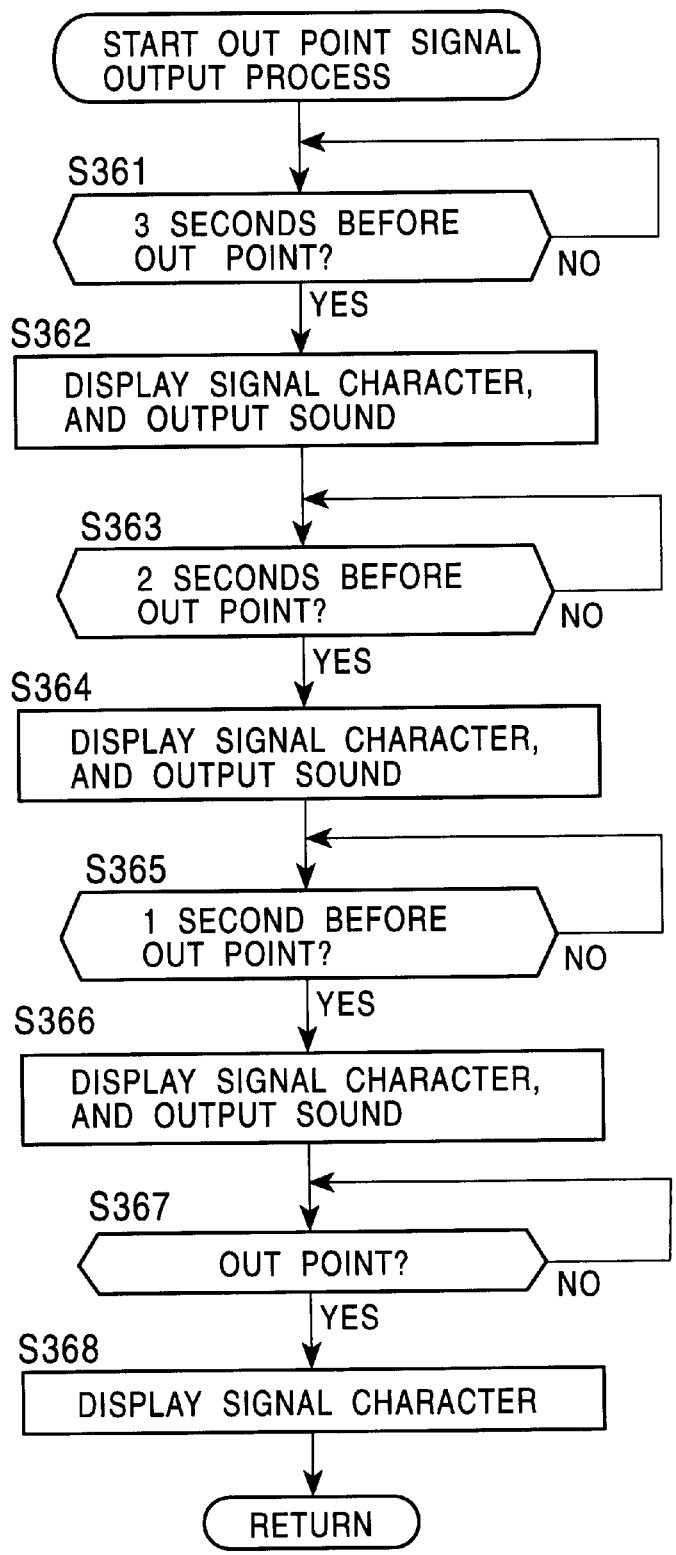
FIG. 62 is a flowchart describing the OUT point signal output process.

Next, the flow proceeds to step S325 in FIG. 56, and executes OUT-point sign output processing. The details of OUT,-point sign output processing are described in FIG. 62. The processing performed in steps S361 through S368 is basically the same as the processing performed in steps S341 through S348 for IN-point sign output processing as shown in FIG. 58. In this case, the shape shown in FIG. 60A is displayed on the display video screen 23a 3 seconds before reaching the OUT-point, the shape shown in FIG. 60B is displayed 2 seconds before reaching the OUT-point, the shape shown in FIG. 60C is displayed 1 second before reaching the OUT-point, and the shape shown in FIG. 60D is displayed at the OUT-point. Also, as shown in FIG. 1, audio signals "beep" are output 3, 2, and 1 second before reaching the OUT-point.

Thus, the announcer can grasp the timing to end the audio signals for voice-over.

Figure 63:
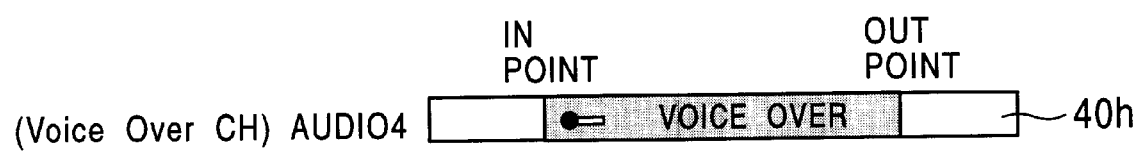
FIG. 63 is a diagram illustrating an example of display at the time of completion of voice-over recording.

Returning the FIG. 56, after the OUT-point sign output processing is completed, the flow proceeds to step S326, and waits till the recording ends. This recording also continues past the OUT-point of voice-over until the amount of margin time elapses, as shown in FIG. 57. In step S326, at the point that judgment is made that the amount of margin time from the OUT-point has elapsed, the flow proceeds to step S327, and the cording process ends. However, replaying is performed along the same range as the preview range shown in FIG. 55. When the recording processing ends thus, as shown in FIG. 63, the shape of a microphone representing "recording completed" is displayed at the head of the voice-over setting range of the No. 4 channel in the time-line display area 40, and the phrase "VOICE OVER" is displayed on the voice-over section.

Thus, the range of voice-over recording is from the position reaching back from the IN-point by a range set as a protection margin to the position past the OUT-point by a range set as a protection margin. The protection margins can be set to certain values beforehand. Incidentally, these protection margins are defined separately from the five-second period for previewing.

Figure 64:
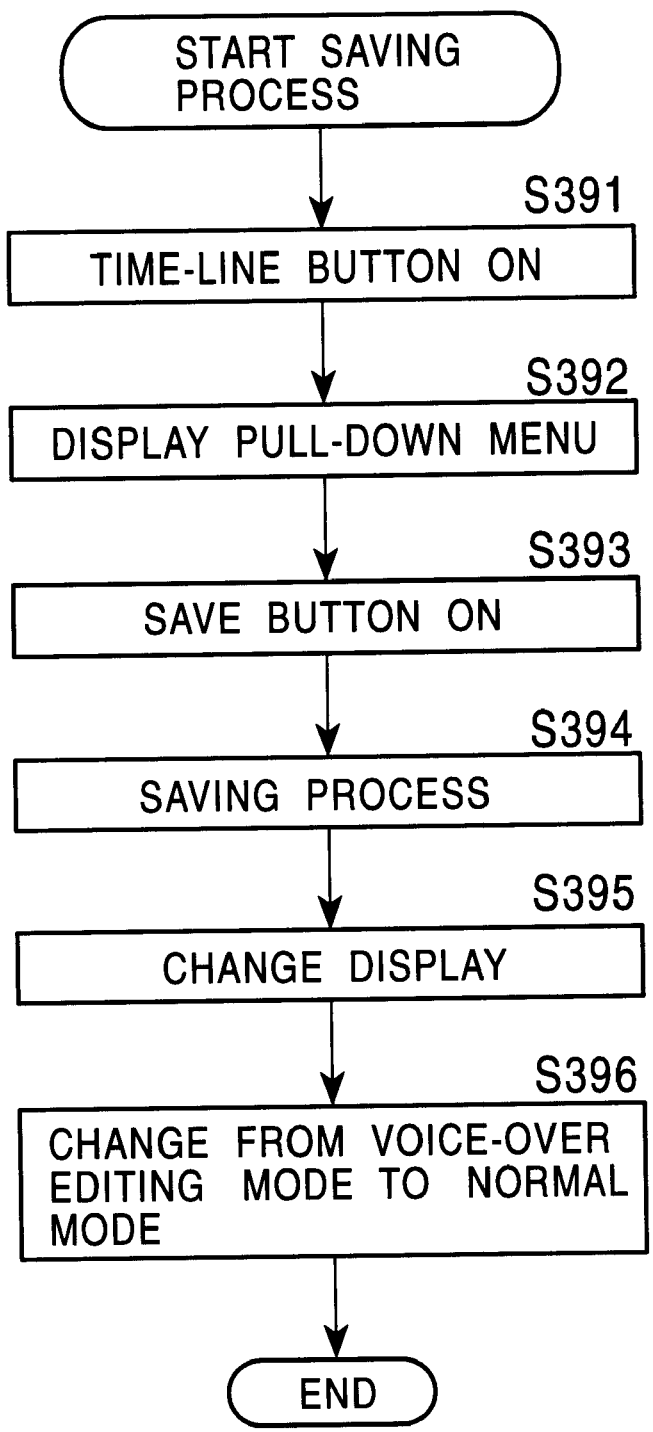
FIG. 64 is a flowchart describing recording processing.

In this way, once voice-over recording has been completed, previewing is performed again, and the work can be confirmed. When the work has been confirmed, processing is performed for saving the various voice-over parameters as a time-line file. FIG. 64 represents the saving process at this time.

Figure 65:
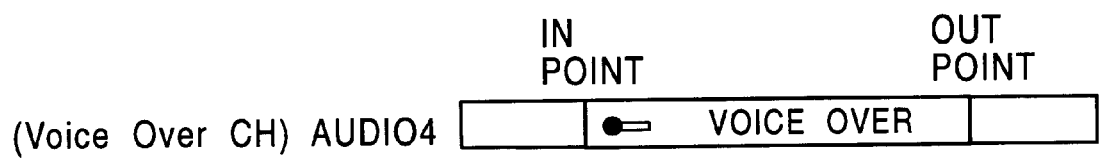
FIG. 65 is a diagram illustrating an example of display after ending of the saving process.

First, in step S391, the user turns the Time Line button on the menu bar 20 (see FIG. 6) on. At this time, a pull-down menu is displayed in step S392, so the user selects the "save" button from the pull-down menu in step S393, and turns it on. At this time, in step S394, the CPU 10 saves the voice-over parameters in the RAM 10b. Next, the flow proceeds to step S395, and the CPU 10 erases the shading on the voice-over section of the No. 4 audio channel, as shown in FIG. 65, thereby notifying the user that the saving process has been completed. Further the flow proceeds to step S396, where the CPU 10 ends the voice-over editing mode, and executes processing to go to the normal mode.

Figure 66:
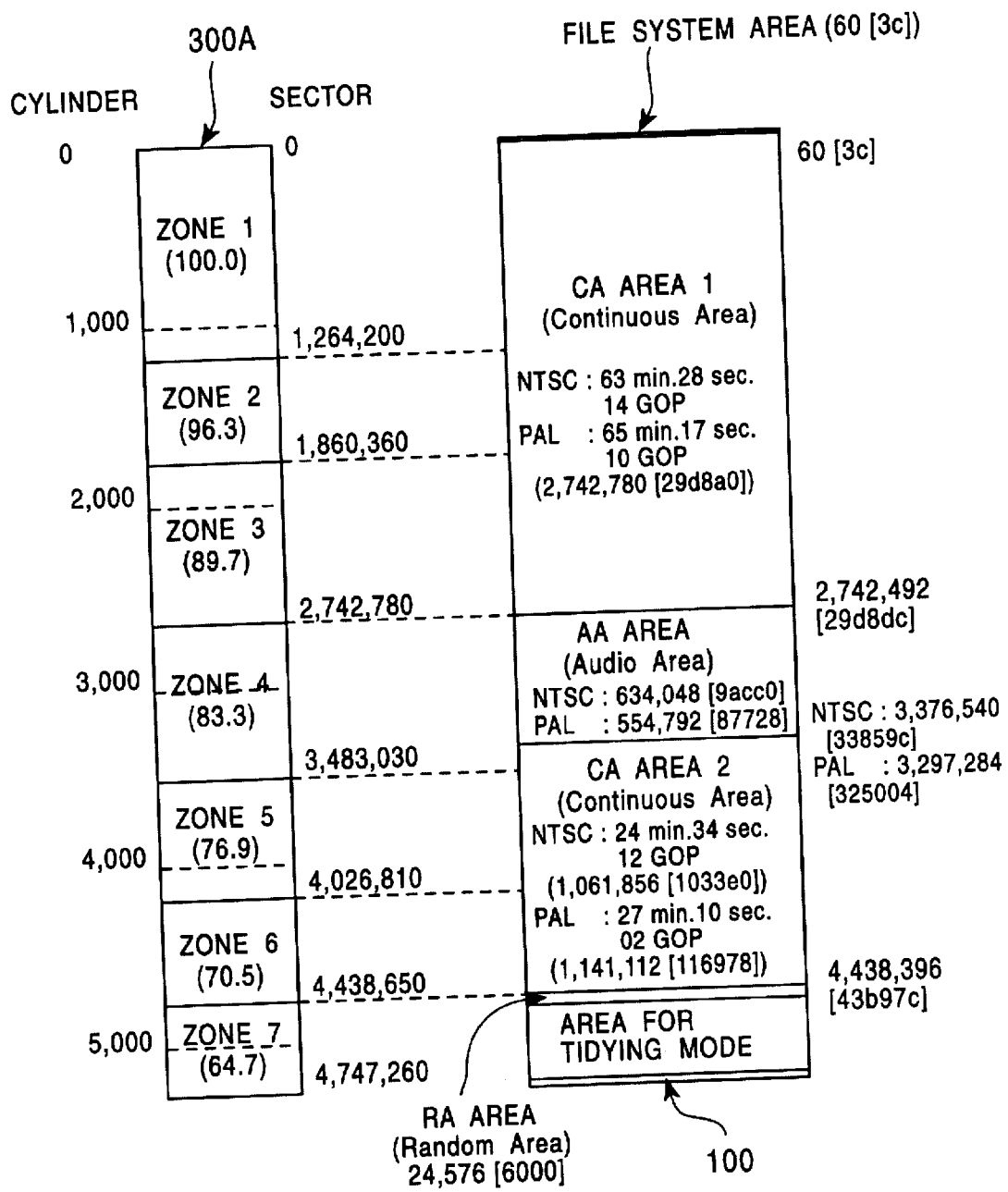
FIG. 66 is a diagram describing the recording area of the hard disk driven by the HDD shown in FIG. 18.

FIG. 66 is a model representation of the recording area of the hard disk 300A driven by the HDD 300 of the hybrid recorder 3 which executes the above voice-over processing. As shown in the Figure, the hard disk 300A is sectioned into Zone 1 through Zone 7. A file system area is formed of the cylinder Nos. or sector Nos. in ascending order, then next a CA (Continuous Area) 1 for recording video data and audio data is formed, and then next an AA (Audio Area) for recording only audio data is formed. The aforementioned voice-over data is stored in this AA area. After the AA area is formed a CA area 2 for recording both audio data and video data. In the following RA area, Edit Decision List (EDL) data, programs relating to the button processing for the panel of the hybrid recorder, etc., are stored. Further, the next area for tidying mode is used for temporary data saving. Recorded in the final self-diagnosis area is programs and data for performing initial operation.

As described above, with the editing system shown in FIG. 2, a maximum of five devices can be connected to the computer 2. Further, the computer 2 is capable of synchronously operating a maximum of five devices. The operation for this synchronous action will be described below.

When controlling the synchronous operation of the connected devices, the user turns the option button 22h in the timing display area 22 on, to display the pull-down menu. The user selects the multi-control panel from the pull-down menu, and the CPU 10 then displays a multi-control panel as shown in FIG. 67. The display portion 901 of the multi-control panel displays the status of the five video tape recorder devices.

In the case of this example, the main tape recorder and the sub tape recorder are stopped, so the word STOP is displayed on the corresponding display portion 901.

Also, the display portion 902 displays information relating to the devices connected to the five ports of the personal computer 2. In the case of this example, the recorder connected to the control port with the smallest No. is used as the main recorder, and is displayed as MAIN. The recorder connected to the control port with the next smallest No. is used as the sub recorder, and is displayed as SUB. Recorders other than the main recorder and sub recorder are displayed as SYNC. DISCONNECT is displayed for ports to which the device is not connected. EFFECTER is displayed for the port to which the picture effects device 6 is connected.

The display unit 903 displays five control port buttons 903a through 903E. The single-play button 904 is operated when locking or unlocking the synchronous control settings for the plurality of devices connected to the ports. Locking the single-play button 904 lights the indicators 903a through 903e of the five control port buttons 903A through 903E green. At this time, the five devices operated synchronously.

Figure 68:
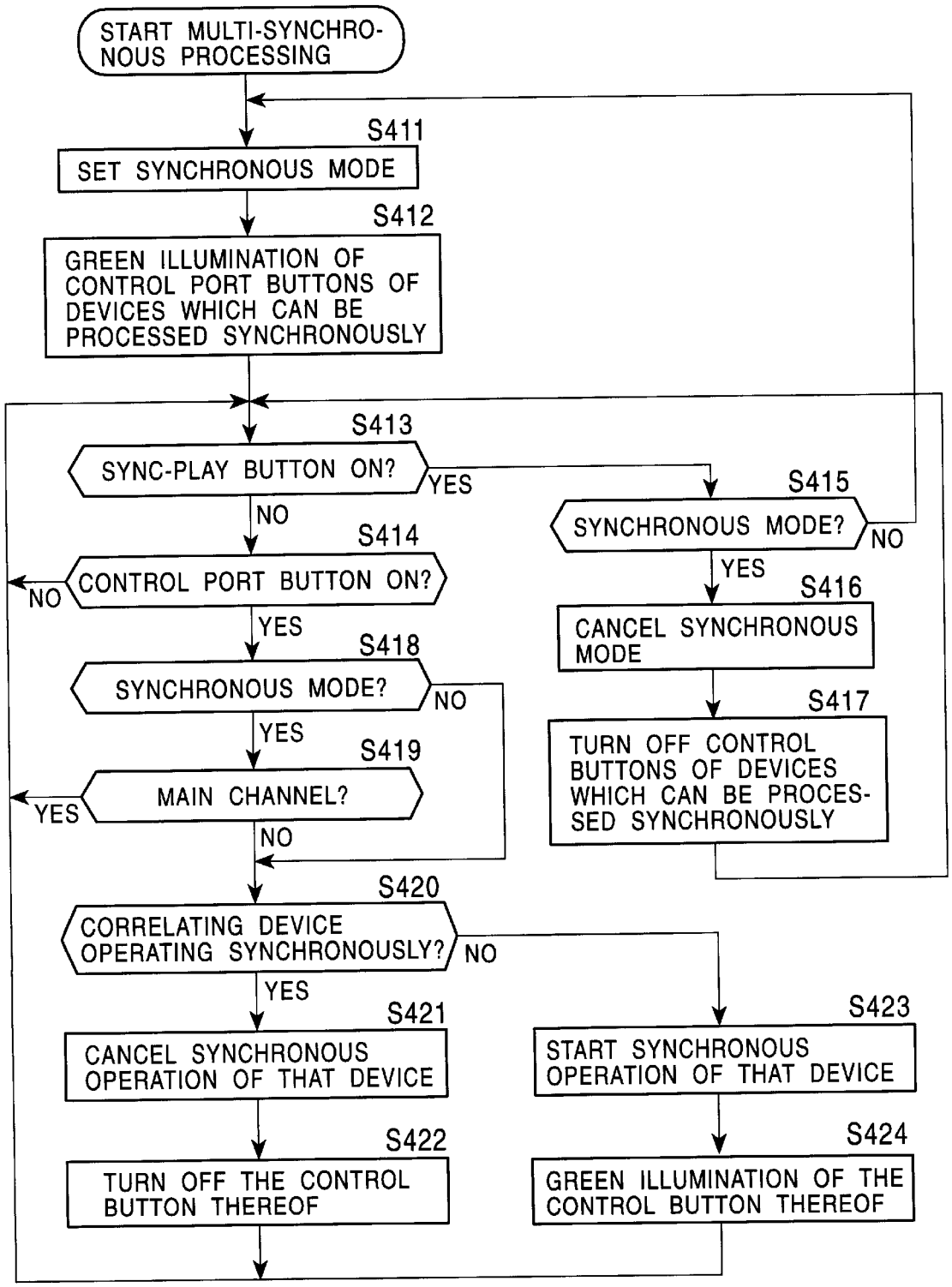
FIG. 68 is a flowchart illustrating multi-synchronous processing.

FIG. 68 illustrates a process example of operating the multi-control panel shown in FIG. 97 to perform multi-synchronous processing.

First, in step S411, the CPU 10 sets the synchronous mode as a default. That is, the default setting is the state in which the single-play button 904 is turned on. In this case, of the devices connected, the indicators 903a through 903e of the control port buttons 903A through 903E to which synchronously-operable devices are connected are lit green in step S412.

Next, in step S413, judgment is made in step S413 whether or not the single play button 904 has been turned on, andlin the event that it has been turned on, the flow proceeds to step S415, and judgment is made whether or not the synchronous mode is currently set. In the event that the synchronous mode is not currently set, the flow returns to step S411, sets the synchronous mode, and in step S412, the indicators of the control port buttons to which synchronously-operable devices are connected are lit green.

In step S415, if judgment is made that the current mode is not the synchronous mode, the flow proceeds to step S416, and processing for canceling the synchronous mode is executed. Then, in step S417, the indicators of the control port buttons to which synchronously-operable devices are connected are turned off. Subsequently, the flow returns to step S413.

In step S413, if it is judged that the single play button 904 is not on, the flow proceeds to step S414, and judges whether or not the control port buttons 903A through 903E are on. In the event that the control port buttons 903A through 903E are not on, the flow returns to step S413, and the subsequent processing is repeated.

In step S414, in the event that it is judged that the control port buttons 903A through 903E are on, the flow proceeds to step S418, and judgment is made whether the synchronous mode is set for the control port buttons. In the event that an operated control port buttons is set to the synchronous mode, the flow proceeds to step S419, and judgment is made whether or not that control port button is the main channel control port button 903A. In the event that that control port button is the main channel control port button 903A, the synchronous mode cannot be canceled, so the flow returns to step S413, and the subsequent processing is repeated.

In step S418, in the event that judgment is made that a channel corresponding to the control port button that was just operated is not set to the synchronous mode, and that the channel of the control port button that was just operated is not the main channel, the flow proceeds to step S420. In step S420, judgment is made whether or not the device corresponding to the operated control port button is synchronously operating. In the event that it is judged that the corresponding device is synchronously operating, the flow proceeds to step S421, and the synchronous operation of that device is canceled. Then, in step S422, the indicator is turned off. In step S420, in the event that it is judged that the corresponding device is not synchronously operating, the flow proceeds to step S423, and the device is operated synchronously. Then, the flow proceeds to step S424, and the indicator thereof is lit green. Then, following the processing of step S422 and step S424, the flow returns to step S413.

In this way, in the event that there is a device that the user desires to remove from synchronous control, the user clicks on the control port button of the corresponding No., and turns the indicator of that button off. However, clicking on the control button cannot remove the main recorder for the main channel from the synchronous control. In order to remove the main channel from synchronous control, the single play button 904 is clicked, the synchronous control settings are put in the unlocked state, following which the control port button of the main channel is clicked to turn the indicator off.

Figure 69:
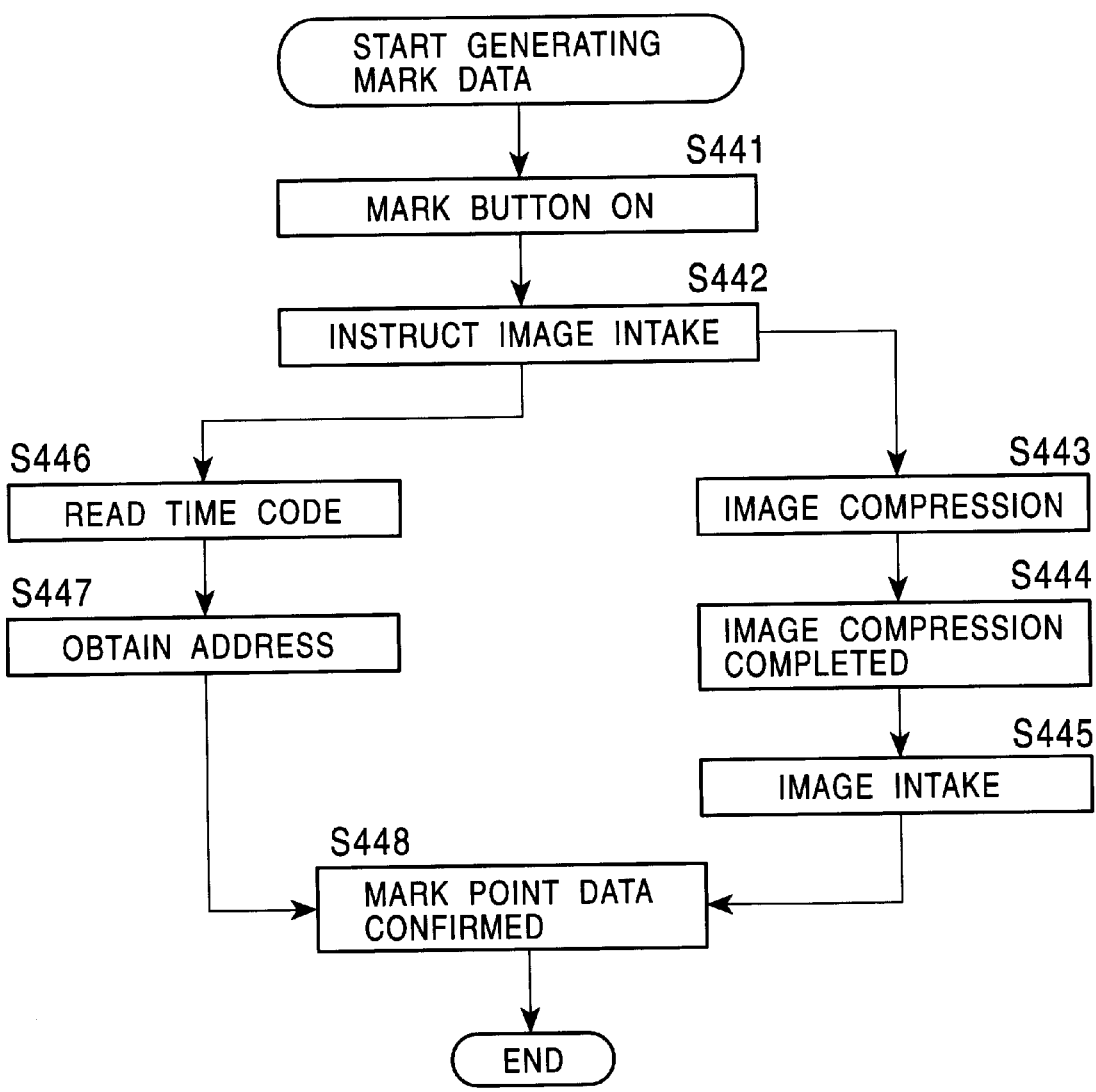
FIG. 69 is a flowchart describing processing for generating mark data.

Next, processing for synchronously operating a plurality of devices (hybrid recorder 3) will be described below. Now, description will be made regarding processing for identifying an image displayed on the replay video screen 23a in a case wherein the mark-IN button has been operated. First, with reference to the flowchart in FIG. 69, description will be made regarding the mark data generating processing in response to the mark-IN button 27c being operated.

In step S441, when the mark-IN button 27c is operated, the CPU instructs the first video processor 11 in step S442 to take in an image. The CPU 10 proceeds to step S443, performs image compression processing at the timing that the mark-IN button 27c was operated, and when the image compressing process is completed in step S444, the image data intake processing is executed in step S445.

On the other hand, the CPU, having instructed image intake in step S442, reads the time code of the compressed image in step 446. Then, further, in step S447, the CPU 10 the address of the hard disk of the hybrid recording corresponding with the time code is obtained from the built-in correlation table.

Thus, the compressed image is read in step S445, and the address where the image corresponding to that compressed image is stored is obtained in step S447, whereby the process of establishing the mark point data is executed in step S448. That is to say, subsequently, the CPU 10 can operate the mark-IN button 27c to obtain specified images from this mark point data, as needed.

Figure 70:
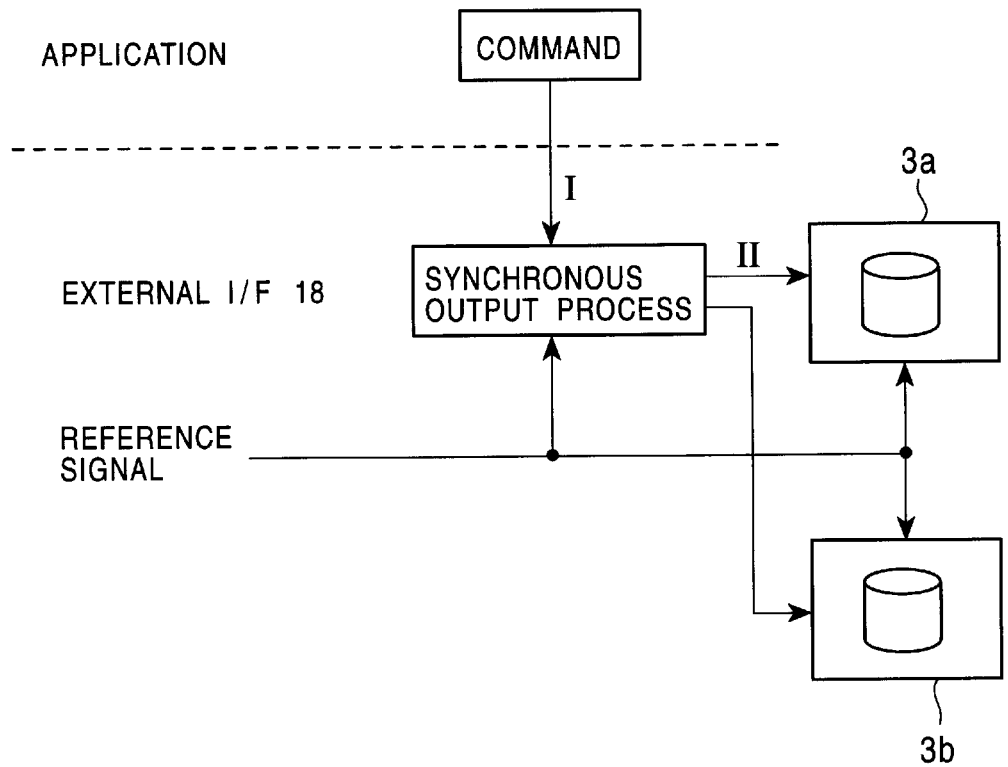
FIG. 70 is a diagram describing synchronous processing.

In this way, e.g., the main channel image can be specified at a certain timing, but a sub-channel image for example with the same timing can be displayed simultaneously as described above, as a Picture-in-Picture image. Accordingly, as shown in FIG. 70, when the CPU 10 outputs a command to the external interface 18 at a certain timing, this command is synchronized with certain reference signals, and is simultaneously sent to the hybrid recorder 3a and hybrid recorder 3b at a second timing from the external interface 18 via the RS-422 cable.

Figure 71:
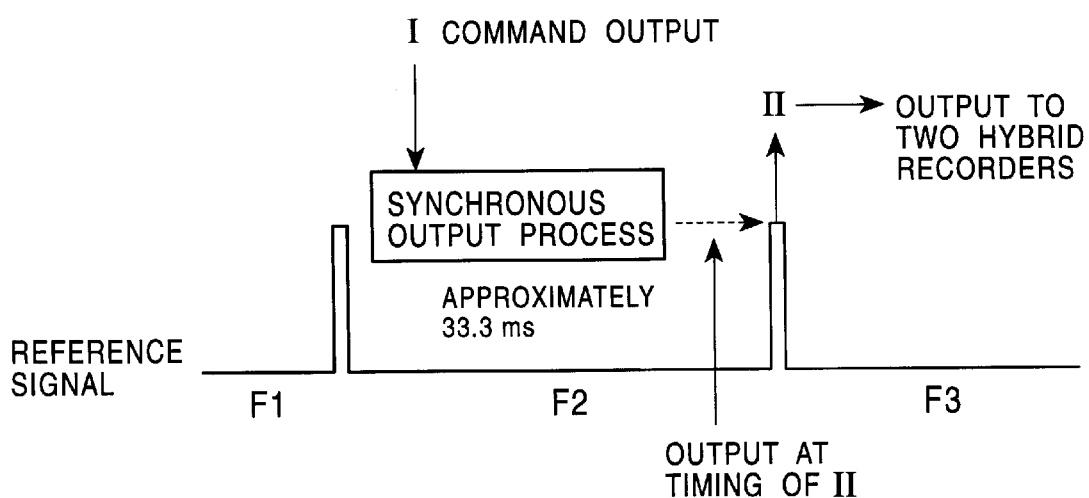
FIG. 71 is a diagram describing the timing of signal output.

That is, as shown in FIG. 71, in the event that a command is issued at the timing of the frame F2, this command is synchronized with the reference signal that occurs immediately afterwards, and the command is thus simultaneously set to both the hybrid recorder 3a and hybrid recorder 3b at the second timing. The hybrid recorders 3a and 3b are both operating synchronously with the reference signals. Accordingly, image signals with the same timing can be obtained from the two hybrid recorders 3a and 3b.

In the above configuration, two graphics modes are provided to the editing system 1 for GUI purposes. One is the picture mode wherein the operator watches IN point and OUT point screens of registered events, and rearranges the order of the events to edit the program, and the other is the time-line mode wherein the operator rearranges the order of the events to edit the program while watching the time-length of the registered events. With this editing system 1, the operator can easily switch between these two modes by clicking on the mode button 22b, so the user can select the GUI with greater ease-of-use depending on the object of editing. Accordingly, useability in editing work with this editing system 1 is improved over known editing systems.

In the events such as where there are no time restrictions on the program, the user can select the picture mode and watch IN point and OUT point clip image data to conduct editing, and thereby proceed with the editing wok while confirming what sort of events the program to be generated is comprised of. In the event that there is time restriction on the program, the time-line mode can be selected, wherein the display area of each event changes depending on the length of the event, so the user can easily generate a program of the desired length by watching the time line while inserting events or overwriting events.

Also, with this editing system 1, a program view area 42 is provided for the time-line mode, and the IN-point clip image data for each event making up the program is displayed by the program view area 42. Thus, event in the time-line mode the user can easily confirm what sort of events the generated program is comprised of.

Also, with this editing system 1, a pre-roll mode is provided wherein, in the event that an IN-point is specified by operating the mark-IN button 42c, replay action is automatically started from a point backed up from the IN-point by a certain amount of time. Accordingly, if such a pre-roll mode is activated beforehand, in the case of live broadcasting of a baseball game, for example, even in the case that the mark-IN button 42c is clicked at the point in time that the ball hit by the batter flies over the fence to specify the IN-point, replay is automatically started from a point backed up from the IN-point by a certain amount of time, so the user can easily correct the IN-point position by watching the replay screen and clicking the mark-IN button 27c on the replay side. In this way, events including desired scenes such as the instant of the batter hitting the ball-can be easily created in real-time.

Also, in the case of this editing system 1, the replay speed stetting area 25a is used so that the replay speed of the event can be set to an arbitrary speed. Accordingly, in the case of live broadcasting of a baseball game, for example, slow-motion replay can be set for the event consisting of the batter hitting the home-run, thereby providing the audience with a picture of the movement of the batter and the flight of the ball in an even more realistic representation.

Also, in the case of this editing system 1, a hybrid recorder 3 which can perform recording and replaying simultaneously is used, so recording and replaying can be performed simultaneously for real-time editing. Further, in the case of this editing system 1, video signals V2 from the source side, video signals V6 obtained by replaying editing events and programs, clip image data representing events and programs, etc., are displayed on a single monitor 2b, so there is no need to provide a plurality of monitors as with known arrangements, and editing work can be carried out sufficiently even in on-location environments with little space, besides simplifying the configuration of the overall system.

According to the above configuration, both the time-line display area which displays the time-wise length of the events making up the generated program by the size of the display area, and the program view area 42 which displays the events making up the program by clip image data of the IN-points or OUT-points of the events, are displayed on the monitor 2b, so the user can look at the program view area 42 and easily tell what sort of events make up the program. Also, a hybrid recorder 3 which can perform recording and replaying simultaneously is used, so recording and replaying can be performed simultaneously for real-time editing. Such an arrangement realizes an editing system 1 with improved ease-of use capable of high-speed real-time editing.

Now, in the above embodiment, an arrangement using a hybrid recorder 3 comprised of a hard disk drive 300 and video tape recorder 301 has been described, but a recording/replaying device comprised simply of a hard disk drive may be used. In brief, advantages similar to the above-described embodiment can be obtained by using any recording/replaying device capable of simultaneous recording and replaying, so long as is consists of storing means for storing the source video data to a storing medium, replaying means for replaying the source video data stored within the storing medium while recording the source video data to the storing medium, and output means for outputting the recorded source video data and replayed source video data.

Also, in the above embodiment, an arrangement is described wherein a keyboard 2c, mouse 2d, of a dedicated controller 2e are used for inputting of various types of commands and information to the editing system 1, but other input devices may be used for the inputting of various types of commands and information; in brief, all that is necessary is user interface means for inputting the various types of commands and information from the operator to the editing system 1.

Further, in the above embodiment, description was made of an arrangement wherein the display of the time-line display area 40 and program view area 42 on the monitor 2b is controlled by the CPU 10 and display controller 13; however, these two control means may be formed into a single control means for controlling the display of the time-line display area and program view area on the display means.

As described above, an editing system with improved useability, which realizes special effects while also realizing high-speed real-time editing, is thus provided.

What is claimed is:

1. An editing system for editing source video data, said system comprising:
   a recording/replaying device for recording said source video data onto a randomly accessible recording medium, and replaying said source video data recorded onto said recording medium;
   an effects device for generating effect video data by means of applying effects specified by the editing operator to said replayed video data output from said recording/replaying device; and
   a computer which is programed by user interface means and said editing operator with editing software, said computer displaying a graphical user interface corresponding with said editing software program on a display;
   wherein said computer generates desired editing programs by re-arranging in a desired order a plurality of clip images representing a plurality of editing events and clip images having graphics representing said effects on said display, based on editing processing controlled by said editing operator;
   and wherein a final edited video program is generated by controlling said recording/replaying device and said effects device, based on said editing programs.

2. The editing system according to claim 1, wherein said computer is programmed to display the following windows on said display:
   a video display window for displaying video data replayed from said recording/replaying device as a dynamic image;
   a program display window for displaying a plurality of clip images representing said plurality of editing events and a plurality of clip images representing said plurality of effects, and also generating said editing program by means of re-arranging said clip images in a desired order; and
   an effects set-up window for setting effects parameter values relating to said effects.

3. An editing system for editing source video data, said system comprising:
   a recording/replaying device for recording said source video data onto a randomly accessible recording medium, and replaying said source video data recorded onto said recording medium;
   an effects device for generating effect video data by means of applying effects specified by the editing operator to said replayed video data output from said recording/replaying device; and
   a computer which is programmed by user interface means and said editing operator with editing software, said computer displaying a graphical user interface corresponding with said editing software program on a display, said computer generating desired editing programs by re-arranging in a desired order a plurality of clip images representing a plurality of editing events and clip images representing said effects on said display, based on editing processing by said editing operator, wherein a final edited video program is generated by controlling said recording/replaying device and said effects device, based on said editing programs;
   wherein said computer is programmed to display the following windows on said display:
   a video display window for displaying video data replayed from said recording/replaying device as a dynamic image;
   a program display window for displaying a plurality of clip images representing said plurality of editing events and a plurality of clip images representing said plurality of effects, and also generating said editing program by means of re-arranging said clip images in a desired order; and
   an effects set-up window for setting effects parameter values relating to said effects;
   wherein, in the event of inserting effects set in said effects set-up window between editing events displayed on said program display window, said computer is programmed to point to the insertion position of said effects by changing the form of a pointing device displayed on said display.

4. The editing system according to claim 3, wherein said computer is programmed to insert effects between said events by dragging and dropping buttons representing said effects between said events.

5. The editing system according to claim 4, wherein said computer is programmed to determine the insertion position of said effects according to the position for dropping the cursor representing said effects in said clip image display area where said events of said effects are displayed.

6. The editing system according to claim 5, wherein a plurality of effect buttons for setting desired effects are provided in said effects set-up window.

7. The editing system according to claim 6, wherein, in the event that desired effect parameter values differing from the default values are to be set for effects displayed in said effects set-up window, said computer opens an effects set-up dialog box for setting detailed effect parameter values relating to the specified effects on the display;

and wherein the effect parameter values set in said effects set-up dialog box are stored in storing means;

and wherein said effects device is controlled based on said recorded effect parameter values.

8. The editing system according to claim 6, wherein, in the event that desired effect parameter values are to be set for effects displayed in said effects set-up window, said computer sets said effects position in said video display window;

and wherein effect parameter values corresponding to said set effects position are stored in storing means;

and wherein said effects device is controlled based on said recorded effect parameter values.

9. The editing system according to claim 7, wherein said computer is programmed to appropriate the effect parameter values stored in said storing means to user buttons other than said certain effect buttons, and call desired effect parameter values stored in said storing means by selecting said user buttons.

10. The editing system according to claim 9, wherein said computer is programmed to appropriate the effect parameter values stored in said storing means to user buttons other than said certain effect buttons, by dragging and dropping said certain effect buttons on said user buttons.

11. The editing system according to claim 7, wherein said computer is programmed to appropriate a plurality of effect parameter values that have been set in the past by said effects set-up dialog box to user buttons other than said certain effect buttons displayed in said effects set-up window, and call desired effect parameter values stored in said storing means by selecting said user buttons.

12. The editing system according to claim 11, wherein said computer has management record data for managing clip image data displayed in said program display area.

13. The editing system according to claim 12, wherein, in the event of changing the display order of clip images displayed in said program display area, said computer does not change the storage address of the clip image displayed in said program display area, but rather changes said management record data corresponding with the changed clip image.

14. The editing system according to claim 13, wherein said computer manages the clip images displayed on said program display area by using a link structure for linking said plurality of pieces of management record data.

15. The editing system according to claim 14, wherein said management record data is comprised of management record data having information relating to said editing events, and management record data having information relating to said effects.

16. The editing system according to claim 15, wherein said management record data relating to said editing events has time code for editing points of said editing events, storing addresses which store clip images of said editing points, and pointer data pointing to management records linking to management record data relating to said editing events;

and wherein said management record data relating to said effects has effect types indicating the type of said effects, effect times representing the execution time of said effects, and pointer data pointing to management records linking to management record data relating to said editing events;

and wherein said computer controls said recording/replaying device and said effects device according to the parameters set in said management record data relating to said editing events and said management record data relating to said effects.

17. An editing device according to claim 16, wherein, in the event that a first editing event, a second editing event, and a first effect inserted between said first and second editing events are set on said program display area, said editing device said recording/replaying device and said effects device so as to:

replay video data relating to said first editing event from said recording/replaying device based on the time code data of the IN-point set in the management record data corresponding to said first editing event;

control the effects processing timing for the video data relating to said first editing event according to the time code data of the OUT-point set in the management record data corresponding to said first editing event, and according to the effects time set in the management record data corresponding to said first effect;

control the effects processing timing for the video data relating to said second editing event according to the time code data of the IN-point set in the management record data corresponding to said first editing event, and according to the effects time set in the management record data, corresponding to said first effect; and ending the replaying of video data relating to said first editing event from said recording/replaying device based on the time code data of the OUT-point set in the management record data corresponding with said first recording event.

18. An editing method for editing source video data, said method comprising the steps of:

recording said source video data on to a randomly accessible recording medium, and replaying said source video data recorded onto said recording medium;

generating effect video data by means of applying effects specified by an editing operator to said replayed video data;

controlling said recording and replaying with the use of a computer to perform editing operations for generating a final video program by editing said source video data;

generating, via said computer, desired editing programs by re-arranging in a desired order a plurality of clip images representing a plurality of editing events and clip images having graphics representing said effects on said display, based on editing processing controlled by an editing operator; and generating a final edited video program by controlling said recording, replaying and effects generating based on said editing programs.

19. An editing device for editing source video data recorded in a recording/replaying device and source audio data corresponding to said source video data, said editing device comprising:

means for setting a start point and stop point for performing voice-over processing to said source audio data;

means for replaying source video data and source audio data for at least a period including the voice-over period defined by the start point and stop point of said voice-over processing; and control means for lowering the level of the source audio data replayed from said recording/replaying device from a certain time before the start point of said voice-over processing to a certain time after the end point of said voice-over processing, and also for controlling recording of voice-over audio data supplied as audio data subjected to voice-over processing for said source video data with said recording/replaying device.

20. An editing device according to claim 19, wherein, during the replaying of said source video data and source audio data, said control means displays the timing of the start point and stop point for performing voice-over processing on the display.

21. An editing method for editing source video data recorded in a recording/replaying device and source audio data corresponding to said source video data, said editing method comprising the steps of:

setting a start point and stop point for performing voice-over processing to said source audio data;

replaying source video data and source audio data for at least a period including the voice-over period defined by the start point and stop point of said voice-over processing; and lowering the level of the source audio data replayed from said recording/replaying device from a certain time before the start point of said voice-over processing to a certain time after the end point of said voice-over processing, and also recording voice-over audio data supplied as audio data subjected to voice-over processing for said source video data with said recording/replaying device.

22. The editing system according to claim 1, wherein said effects include a wipe effect, and said graphics include a graphic representing said wipe effect composed of a rectangle with one side appearing different from another side to indicate the direction that said wipe effect is to be implemented on said source video data.

23. The editing system of claim 22 wherein said graphic further includes an arrow indicating the direction that said wipe effect is to be implemented.

\* \* \* \* \*